(12) United States Patent
Anderson et al.

(10) Patent No.: US 8,311,372 B2
(45) Date of Patent: Nov. 13, 2012

(54) LIQUID CRYSTAL WAVEGUIDE HAVING REFRACTIVE SHAPES FOR DYNAMICALLY CONTROLLING LIGHT

(75) Inventors: Michael H. Anderson, Lyons, CO (US);
Scott D. Rommel, Lakewood, CO (US);
Scott R. Davis, Denver, CO (US)

(73) Assignee: Vescent Photonics, Inc., Denver, CO (US)

( * ) Notice: Subject to any disclaimer, the term of this patent is extended or adjusted under 35 U.S.C. 154(b) by 0 days.

(21) Appl. No.: 11/774,514

(22) Filed: Jul. 6, 2007

(65) Prior Publication Data
US 2008/0008413 A1    Jan. 10, 2008

Related U.S. Application Data

(62) Division of application No. 10/963,946, filed on Oct. 12, 2004.

(60) Provisional application No. 60/539,030, filed on Jan. 22, 2004.

(51) Int. Cl.
G02F 1/295    (2006.01)
G02F 1/133    (2006.01)
G02B 6/26    (2006.01)
G02B 6/42    (2006.01)

(52) U.S. Cl. .................. 385/4; 385/8; 385/27; 385/30; 349/21; 349/33

(58) Field of Classification Search .............. 385/30, 385/4; 349/21, 33
See application file for complete search history.

(56) References Cited

U.S. PATENT DOCUMENTS 3,963,310 A    6/1976    Giallorenzi et al.
(Continued)

FOREIGN PATENT DOCUMENTS

EP    1186940    3/2002
(Continued)

OTHER PUBLICATIONS

International Search Report for Int. Application No. PCT/US2005/001758 dated Aug. 31, 2006, 2 pp.

(Continued)

*Primary Examiner* — Uyen Chau N Le
*Assistant Examiner* — Kajli Prince
(74) *Attorney, Agent, or Firm* — Mark D. Trenner; Trenner Law Firm, LLC

(57) ABSTRACT

Liquid crystal waveguides for dynamically controlling the refraction of light. Generally, liquid crystal materials may be disposed within a waveguide in a cladding proximate or adjacent to a core layer of the waveguide. In one example, portions of the liquid crystal material can be induced to form refractive or lens shapes in the cladding that interact with a portion (e.g. evanescent) of light in the waveguide so as to permit electronic control of the refraction/bending, focusing, or defocusing of light as it travels through the waveguide. In one example, a waveguide may be formed using one or more patterned or shaped electrodes that induce formation of such refractive or lens shapes of liquid crystal material, or alternatively, an alignment layer may have one or more regions that define such refractive or lens shapes to induce formation of refractive or lens shapes of the liquid crystal material. In another example, such refractive or lens shapes of liquid crystal material may be formed by patterning or shaping a cladding to define a region or cavity to contain liquid crystal material in which the liquid crystal materials may interact with the evanescent light.

8 Claims, 27 Drawing Sheets

U.S. PATENT DOCUMENTS

| | | | |
|---|---|---|---|
| 4,737,014 A * | 4/1988 | Green | 385/123 |
| 4,896,325 A | 1/1990 | Coldren | |
| 5,044,712 A | 9/1991 | Soref | |
| 5,132,079 A | 7/1992 | Stewart et al. | |
| 5,291,567 A | 3/1994 | Revelli, Jr. et al. | |
| 5,317,446 A | 5/1994 | Mir et al. | |
| 5,319,668 A | 6/1994 | Luecke | |
| 5,347,377 A | 9/1994 | Revelli, Jr. et al. | |
| 5,388,169 A | 2/1995 | Kobayashi et al. | |
| 5,499,256 A | 3/1996 | Bischel et al. | |
| 5,504,772 A | 4/1996 | Deacon et al. | |
| 5,513,196 A | 4/1996 | Bischel et al. | |
| 5,596,671 A | 1/1997 | Rockwell, III | |
| 5,766,974 A | 6/1998 | Sardella et al. | |
| 5,789,776 A | 8/1998 | Lancaster et al. | |
| 5,837,613 A | 11/1998 | Kalnitsky et al. | |
| 6,041,071 A | 3/2000 | Tayebati | |
| 6,215,928 B1 | 4/2001 | Friesem et al. | |
| 6,324,204 B1 | 11/2001 | Deacon | |
| 6,330,388 B1 | 12/2001 | Bendett et al. | |
| 6,373,872 B2 | 4/2002 | Deacon | |
| 6,449,084 B1 * | 9/2002 | Guo | 359/315 |
| 6,470,036 B1 | 10/2002 | Bailey et al. | |
| 6,480,513 B1 | 11/2002 | Kapany et al. | |
| 6,546,163 B2 | 4/2003 | Thackara | |
| 6,559,921 B1 | 5/2003 | Leslie et al. | |
| 6,603,902 B1 | 8/2003 | So | |
| 6,650,822 B1 | 11/2003 | Zhou | |
| 6,661,936 B2 | 12/2003 | Noe | |
| 6,763,047 B2 | 7/2004 | Daiber et al. | |
| 6,768,856 B2 | 7/2004 | Akwani et al. | |
| 6,816,140 B2 | 11/2004 | Fujieda | |
| 6,816,516 B2 | 11/2004 | Daiber | |
| 6,853,654 B2 | 2/2005 | McDonald et al. | |
| 6,859,567 B2 | 2/2005 | Galstian et al. | |
| 6,859,572 B2 | 2/2005 | Ishibashi | |
| 6,920,159 B2 | 7/2005 | Sidorin et al. | |
| 7,079,724 B2 | 7/2006 | Thackara | |
| 7,315,665 B1 | 1/2008 | Anderson | |
| 7,403,678 B2 | 7/2008 | Thapliya et al. | |
| 2001/0033400 A1 | 10/2001 | Sutherland et al. | |
| 2002/0031299 A1 | 3/2002 | Hatakoshi | |
| 2002/0041726 A1 | 4/2002 | Thackara | |
| 2002/0131694 A1 * | 9/2002 | So et al. | 385/27 |
| 2002/0140879 A1 | 10/2002 | Fujieda | |
| 2002/0154878 A1 | 10/2002 | Akwani et al. | |
| 2003/0059148 A1 * | 3/2003 | Nishizawa et al. | 385/8 |
| 2003/0086448 A1 | 5/2003 | Deacon | |
| 2003/0103708 A1 | 6/2003 | Galstian et al. | |
| 2003/0108273 A1 | 6/2003 | Kowalczyk et al. | |
| 2003/0137999 A1 | 7/2003 | Spiegelberg et al. | |
| 2003/0142262 A1 | 7/2003 | Leslie et al. | |
| 2003/0169958 A1 | 9/2003 | Ridgway et al. | |
| 2003/0214700 A1 | 11/2003 | Sidorin et al. | |
| 2003/0219197 A1 | 11/2003 | Kawamoto | |
| 2003/0231279 A1 | 12/2003 | Wessel et al. | |
| 2004/0208412 A1 | 10/2004 | Miyazaki et al. | |
| 2005/0135439 A1 | 6/2005 | Chapman et al. | |
| 2005/0180713 A1 | 8/2005 | Heideman et al. | |

FOREIGN PATENT DOCUMENTS

| | | |
|---|---|---|
| JP | 59052219 | 3/1984 |
| JP | 63244004 | 10/1988 |

OTHER PUBLICATIONS

Written Opinion for Int. Application No. PCT/US2005/001758 dated Aug. 31, 2006, 3 pp.

International Search Report for Int. Application No. PCT/US2005/001586 dated Sep. 21, 2006, 3 pp.

Written Opinion for Int. Application No. PCT/US2005/001586 dated Sep. 21, 2006, 3 pp.

Desmat, et al., "Silicon-on-Insulator Optical Waveguides with Liquid Crystal Cladding for Switching and Tuning", Proceedings of the European Conference on Optical Communication (ECOC) 2003, vol. 3, p. 430-431.

Mormile, et al., "A Basic Element for Integrated Electro-Optical Devices Based on Liquid Crystal Waveguides", Proc. SPIE 4078, (2000), p. 779-785.

Kobayashi, et al., "2×2 Optical Waveguide Matrix Switch Using Nematic Liquid Crystal", IEEE Journal of Quantum Electronics, vol. QE-18, No. 10, 1982.

Casson, et al., "Near-IR Turnable Laser with an Integrated LiTaO3 Electro-Optic Deflector", Applied Optics, vol. 41, No. 30, Oct. 20, 2002.

Hermann, "Integrated Optics with Liquid Crystals", University of Technology, 2000.

Clark, et al., "Surface-Stabilized Ferroelectric Liquid-Crystal Electro-Optic Waveguide Switch", Applied Physics Letter 57(18), Oct. 29, 1990.

Coppola, et al., "Optoelectronic Router in Glass Waveguide with a Liquid Crystal Cladding", SPIE, vol. 4829, 2003.

Gialorenzi, et al., "Lighting Scattering from Smectic Liquid-Crystal Waveguides", Journal of Applied Physics, vol. 47, No. 5, May 1976.

Karpierz, "Nonlinear Properties of Waveguides with Twisted Nematic Liquid Crystal", Acta Physica Polonica A, vol. 99, 161-176, 2001.

Maune, et al., "Electronically Tunable Ring Resonators Incorporating Nematic Liquid Crystals as Cladding Layers", Applied Physics, vol. 83, No. 23, 2003.

Okamura, et al., "Low Voltage Driving in Nematic Liquid Crystal Overlayered Waveguide" Journal of Lightwave Technology, vol. LT-4, No. 3, Mar. 1986.

Sirleto, et al., "Optical Multimode Interference Router Based on a Liquid Crystal Waveguide", Journal of Optics A: Pure Appl. Opt. 5, 2003;.

Sirleto, et al., Electro-Optical Switch and Continuously Tunable Filter Based on a Bragg Grating in a Planar Waveguide with a Liquid Crystal Overlayer, Opt. Eng. 41(11), Nov. 2002.

Valera, et al., "Bistability and Switching in Thin-Film Waveguides with Liquid-Crystal Cladding", Applied Physics Letter 48(9), Mar. 3, 1986.

Hu, et al., "Optical Deflection in Thin-Film Nematic Liquid-Crystal Waveguides", IEEE Journal of Quantum Electronics, vol. QE-10, No. 2, Feb. 1974.

Whinnery, et al., "Liquid-Crystal Waveguides for Integrated Optics", IEEE Journal of Quantum Electronics, vol. QE-13, No. 4, Apr. 1977.

Hu, et al., "Losses of a Nematic Liquid-Crystal Optical Waveguide", Journal of the Optical Society of America, vol. 64, No. 11, Nov. 1974.

Repasky, et al., "Tunable External-Cavity Diode Laser Based on Integrated Waveguide Structures", Opt. Eng. 42(8), Aug. 2003.

Oh Kee Kwan, et al., "Proposal of Electrically Tunable External-Cavity Laser Diode", IEEE Photonics Technology Letters, vol. 16, No. 8, Aug. 2004.

Sheridan, et al., "Elector-Optically Induced Deflection in Liquid-Crystal Waveguides", Journal of Applied Physics, vol. 45, No. 12, Dec. 1974.

Sneh, et al., "High-Speed Continuously Tunable Liquid Crystal Filter for WDM Networks", Journal of Lightwave Technology, vol. 14, No. 6, Jun. 1996.

Gialorenzi, et al., "Light Scattering from Nematic Liquid-Crystal Waveguide", Journal of Applied Physics, vol. 46, No. 3, Mar. 1975.

Schnur, et al., "Prospectus for the Development of Liquid-Crystal Waveguides", Naval Research Laboratory, NRL Report 7507, Nov. 10, 1972.

European Search Report from corresponding European patent application (05722475.0) dated Nov. 22, 2007.

Liu, Zao, "Polarization Cross Coupling in Asymmetric Photonic Waveguides", Electrical and Computer Engineering Master's Theses, Northeastern University, Dept. of Electrical and Computer Engineering, Jan. 1, 2010.

* cited by examiner

LIQUID CRYSTAL WAVEGUIDE HAVING REFRACTIVE SHAPES FOR DYNAMICALLY CONTROLLING LIGHT

CROSS-REFERENCE TO RELATED APPLICATION

This application is a division of U.S. patent application Ser. No. 10/963,946 entitled "LIQUID CRYSTAL WAVEGUIDE HAVING REFRACTIVE SHAPES FOR DYNAMICALLY CONTROLLING LIGHT AND TUNABLE LASER INCLUDING SAME" filed Oct. 12, 2004, which claims the benefit of U.S. provisional patent application No. 60/539,030 filed on Jan. 22, 2004, the disclosure of which is hereby incorporated by reference in its entirety.

GOVERNMENT RIGHTS

This invention was made with Government support under contract No. 0319386 awarded by the National Science Foundation. The Government has certain rights in the invention.

FIELD OF THE INVENTION

This invention relates, in general, to waveguides, and more particularly, to waveguides having liquid crystal materials therein.

BACKGROUND OF THE INVENTION

Various devices such as barcode scanners, compact disk players, DVD players, and others use light to perform various functions, such as read data from or write data to optical media. Beams of light are also used in communication devices, sample analyzing devices, distance measurement devices, and time measurement devices.

Light can be controlled using standard lenses and mirrors. These passive methods can be made active via mechanical motion. For example, mirrors can be placed on galvo-motors to move the mirror to control the direction of light propagation. This technique is used in barcode scanners, or optical read/write heads in CD/DVD players. However, mechanical control over light is problematic for several reasons, as recognized by the present inventors. First, it is difficult to make such mechanical devices compact. Second, the mechanical nature of such moving devices have limited lifetimes due to mechanical wear and failure issues. Third, mechanical devices are inherently vibration sensitive, which limits the type of environment in which they can be used. Finally, mechanical devices necessitate a level of design complexity including gears, bearings, and other mechanical components which add cost, expense, and maintenance issues to such designs.

Rather than move a lens or a mirror with a motor or actuator, light can be controlled through the use of waveguides. For instance, U.S. Pat. No. 5,347,377 entitled "Planar Waveguide Liquid Crystal Variable Retarder" relates generally to providing an improved waveguide liquid crystal optical device, and discloses in Table I the use of alternating current voltages between 2 and 50 volts rms for retardation of the polarized light by controlling only the optical phase delay.

With conventional waveguides, electro-optic materials such as lithium niobate are generally employed in the core whereby a voltage applied across the core material changes the index of refraction, n. However, with conventional techniques using materials such as lithium niobate, the index of refraction can only be changed a very small amount so that the retardation of a half wave may require thousands of volts. This limitation makes this type of light control extremely limited, and to date not a viable alternative to mechanical control of light.

In non-waveguide devices, liquid crystal materials have become widespread in display applications where light is attenuated but not steered nor refocused. However, in order to use conventional display techniques for liquid crystal materials to attempt continuous steering of light, prohibitively thick layers of liquid crystal materials (greater than 100 microns) would be needed, which would render the device highly opaque and slow. The thick layers of liquid crystal can take seconds or even minutes to change, and can be difficult to control. Although non-waveguide, electro-optic beam-steerers have been made with standard thin liquid crystal cells, such devices have only realized minimal steering, in the range of $10^{-6}$ degrees of steering).

U.S. Pat. No. 3,963,310 entitled "Liquid Crystal Waveguide" teaches of utilizing liquid crystal—within the core of a waveguide. However, as recognized by the present inventors, such a waveguide would be problematic in that there would be substantial losses or attenuation of light traveling through such a waveguide.

Accordingly, as recognized by the present inventors, what is needed is a liquid crystal waveguide for controlling light that permits active control of the propagation or refraction of light through the waveguide in a manner that provides for low loss operation.

It is against this background that various embodiments of the present invention were developed.

SUMMARY

In light of the above and according to one broad aspect of one embodiment of the invention, disclosed herein is a liquid crystal waveguide for dynamically controlling the refraction of light passing through the waveguide. Generally, liquid crystal materials may be disposed within a waveguide in a cladding proximate or adjacent to a core layer of the waveguide. According to an embodiment of the present invention, portions of the liquid crystal material can be induced to form refractive or lens shapes in the cladding that interact with a portion (e.g. evanescent) of light in the waveguide so as to permit electronic control of the refraction/ bending, focusing, or defocusing of light as it travels through the waveguide. In one example, a waveguide may be formed using one or more patterned or shaped electrodes that induce formation of such refractive or lens shapes of liquid crystal material, or alternatively, an alignment layer may have one or more regions that define such refractive or lens shapes to induce formation of refractive or lens shapes of the liquid crystal material. In another example of the invention, such refractive or lens shapes of liquid crystal material may be formed by patterning or shaping a cladding to define a region or cavity to contain liquid crystal material in which the liquid crystal materials may interact with the evanescent light.

According to one broad aspect of one embodiment of the present invention, a waveguide may include a core, a pair of claddings surrounding the core wherein one of the claddings (e.g., the upper cladding) contains liquid crystal material therein. In one example, one or more electrodes or an electrode layer is positioned above the upper cladding that has the liquid crystal material therein, and a lower electrode or electrode layer or plane is positioned below the lower cladding and acts as a ground plane.

The one or more upper electrodes define one or more shapes having at least one edge or interface which is non-normal to the direction of light propagation through the waveguide, or may define curved or lens shaped interfaces. The one or more shapes defined by the upper electrode(s) may be used to controllably refract, bend, focus or defocus light as light passes through the core and upper and lower claddings of the waveguide. The upper electrodes, also referred to herein as patterned electrodes, may be shaped or patterned in various manners, including generally triangular or wedge shaped for steering light, or the shapes may include various lens shapes for focusing or defocusing light that passes through the waveguide.

When a voltage or range of voltages are applied between the upper patterned electrode and the lower electrode, at least two indices of refraction can be realized within a waveguide. As voltage is applied and increased between the upper patterned electrodes and the lower electrode plane, the index of refraction n2 of the liquid crystal material under the upper patterned electrodes) is controllably and dynamically changed as a function of the voltage applied.

The index of refraction n1 of the liquid crystal material that is not under the electrode is generally not changed. In this way, the difference between n1 and n2 can be dynamically controlled by the voltage.

According to another broad aspect of one embodiment of the present invention, a waveguide may include a lower electrode plane, a lower cladding, a core layer, an alignment layer having the one or more regions defining various shapes, an upper cladding with liquid crystal material therein, an upper electrode plane, and a glass cover.

In one example on the alignment layer, one or more areas or regions define various shapes in order to induce the liquid crystal material in the adjacent upper cladding to form various shapes when no voltage is applied, such as shapes having non-normal interfaces or shapes having curves or lens shapes. For instance, the alignment layer of the waveguide may include a first region and a second region. In this example, the first region aligns the liquid crystal materials in the upper cladding in a first orientation (e.g., with their long axis perpendicularly orientated relative to the propagation direction of light traveling through the waveguide); while the second region defines a refractive shape (e.g., wedge or prism shape) or lens shape, wherein within the second region, the liquid crystal materials in the upper cladding are aligned in a second orientation (e.g., with their long axis orientated in parallel relative to the propagation direction of light traveling through the waveguide).

In this example, when no voltage is applied between the upper electrode and the lower electrode/substrate, the index of refraction n1 of the first region is greater than the index of refraction n2 of the second region for TE polarized light traveling through the waveguide. As a voltage is applied between the upper electrode and the lower electrode/substrate, the electric field of the applied voltage induces the liquid crystals within the upper cladding to orient vertically, and therefore for TE polarized light traveling through the waveguide, the index of refraction n1 of the first region is approximately equal to the index of refraction n2 of the second region, and no refraction or light bending occurs.

According to another broad aspect of one embodiment of the present invention, a waveguide may include a lower electrode plane, a lower cladding, a core layer, an alignment layer, an upper cladding and an upper electrode plane. In the upper cladding, regions or areas or portions have been removed to form a cavity defining one or more refractive shapes. In one example, the cavity is filled with liquid crystal material.

In one example, one or more cavities, areas or regions of the upper cladding have been removed or reduced and filled with liquid crystal material such that the evanescent wave of the guided light may penetrate into these areas or regions. Liquid crystal material may be placed in these cavities or areas, such that the shape or region in which a portion of the guided light may interact with the liquid crystal defines refractive shapes having non-normal interfaces or refractive shapes having curves or lens shapes. For instance, the upper cladding of the waveguide may include a first region and a second region, wherein the first region may include a non-electro-optic upper cladding material; and while the second region defines a refractive shape (e.g., wedge or prism shape) or lens shape, wherein within the second region, there is liquid crystal material therein such that the evanescent wave may interact with the liquid crystal material in this second region.

In one example, when no voltage is applied between the upper electrode and the lower electrode, the index of refraction n1 of the first region is different than the index of refraction n2 of the second region for light traveling through the waveguide. As a voltage is applied between the upper electrode and the lower electrode, the electric field of the applied voltage induces the liquid crystals, which are confined within the regions or cavities of the upper cladding, to reorient, and therefore for light traveling through the waveguide, the difference between the index of refraction n1 of the first region and the index of refraction n2 of the second region will change, and therefore the degree of refraction or light bending will also change.

According to another broad aspect of an embodiment of the present invention, disclosed herein is a method for dynamically controlling refraction of a light beam through a waveguide having a core and at least one cladding. In one example, the method may include providing a liquid crystal material within the at least one cladding; providing for forming at least one refractive shape from the liquid crystal material in the at least one cladding; providing at least one alignment layer adjacent the core, the alignment layer inducing a substantially uniform arrangement of the liquid crystal material of the at least one refractive shape; and providing for passing the light beam through the waveguide, wherein an evanescent portion of the light beam interacts with the at least one refractive shape having the substantially uniform arrangement of the liquid crystal material, thereby reducing attenuation of the light beam as it travels through the waveguide.

In one example, the at least one cladding may include an upper and lower cladding, and the operation of providing a liquid crystal material may comprise providing the liquid crystal material in the upper cladding or in the lower cladding.

In another example, the operation of providing for forming at least one refractive shape may comprise providing for applying an electric field to a portion of the liquid crystal material, thereby inducing the portion of the liquid crystal material to form at least one refractive shape; providing at least one electrode for receiving at least one voltage; forming the electrode to include at least one refractive shape; and providing for applying a voltage to the electrode thereby inducing the portion of the liquid crystal material to form at least one refractive shape.

In one example, the at least one refractive shape may have a variable index of refraction, and the method may comprise providing for varying the electric field, thereby adjusting the variable index of refraction of the at least one refractive shape; and providing for varying the voltage applied to the electrode in order to adjust an index of refraction of the at least one refractive shape.

In another example, the operation of providing for forming at least one refractive shape may comprise providing at least one alignment layer adjacent at least one cladding; forming the alignment layer to have at least a first region biasing the liquid crystal material in a first orientation, and the alignment layer may have a second region biasing the liquid crystal material in a second orientation, the second region may define at least one refractive shape; providing at least one electrode for receiving at least one voltage, the electrode may define a plane; and providing for applying a voltage to the electrode, thereby re-orienting the liquid crystal material in the at least one cladding.

In one example, the first region may have a first index of refraction and the second region may have a second index of refraction, and the method may comprise providing for varying the voltage applied to the electrode in order to adjust a difference between the first and second index of refraction.

In one example, the operation of providing for forming at least one refractive shape may comprise forming a cavity in the at least one cladding, the cavity may define at least one refractive shape; placing the liquid crystal material in the cavity; and providing for applying an electric field to the cavity, thereby re-orienting the liquid crystal material in the cavity. In another example the liquid crystal material in the cavity may have an index of refraction, and when the electric field is applied to the cavity, the index of refraction of the liquid crystal material in the cavity may change, thereby altering an amount of refraction of the light beam in the waveguide.

In one example, the operation of providing for applying an electric field may comprise providing at least one electrode for receiving at least one voltage, the electrode may define a plane; and providing for applying a voltage to the electrode. In another example, the operation of forming a cavity may comprise shaping the cavity to include at least one wedge shape or at least one lens shape.

According to another broad aspect of an embodiment of the present invention, disclosed herein is a waveguide for controllably refracting a light beam. In one example, the waveguide may comprise a core for guiding a light beam through the waveguide, and a means for controllably refracting the light beam as it travels through the waveguide.

In another example, the means for controllably refracting may include at least one cladding having a liquid crystal material therein; at least one electrode for receiving at least one voltage, the electrode may define at least one refractive shape, wherein the light beam is refracted by an amount that is controlled by the at least one voltage.

In one example, the means for controllably refracting may include at least one cladding having a liquid crystal material within at least a portion of the cladding wherein at least a portion of the liquid crystal material forms one or more refractive shapes having an index of refraction; and at least one electrode, wherein as a voltage is applied to the electrode, the index of refraction of the one or more refractive shapes is altered to controllably refract the light beam as it travels through the waveguide.

In another example, the means for controllably refracting may include at least one cladding having a liquid crystal material disposed therein, the cladding may have a first region characterized by a first index of refraction and a second region characterized by a second index of refraction; and at least one electrode, wherein at least the second index of refraction is controlled by a voltage applied to the electrode.

In another example, the means for controllably refracting may include at least one cladding may have a liquid crystal material disposed therein, the cladding may have at least a first region that includes at least a portion of the liquid crystal material having a first orientation; and at least one electrode, wherein the first orientation of the first portion of the liquid crystal material in the at least first region selectively changes from a first state to a second state based on a voltage applied to the electrode.

Other features, utilities and advantages of the various embodiments of the invention will be apparent from the following more particular description of embodiments of the invention as illustrated in the accompanying drawings.

DETAILED DESCRIPTION

Disclosed herein are various embodiments of a waveguide for dynamically controlling the refraction of light passing through the waveguide. Generally and in accordance with an embodiment of the present invention, liquid crystal materials may be disposed within a waveguide in a cladding proximate or adjacent to a core layer of the waveguide. Portions of the liquid crystal material in the cladding can be induced to form refractive shapes or lens shapes in the cladding so as to permit electronic control of the refraction/bending, focusing, or defocusing of light as it travels through the waveguide. As disclosed herein, a waveguide may be formed using one or more patterned or shaped electrodes that induce the liquid crystal material in the cladding to form such refractive or lens shapes (see FIGS. 1-27); an alignment layer may have one or more regions that define such refractive or lens shapes and induce the liquid crystal material in the cladding to form (see FIGS. 28-33); or a cladding may have a cavity, region or area defining a refractive or lens shape with liquid crystal material therein in which the liquid crystal material interacts with the guided light may be (see FIGS. 34-39). Various embodiments of the present invention are described herein.

Figure 1:
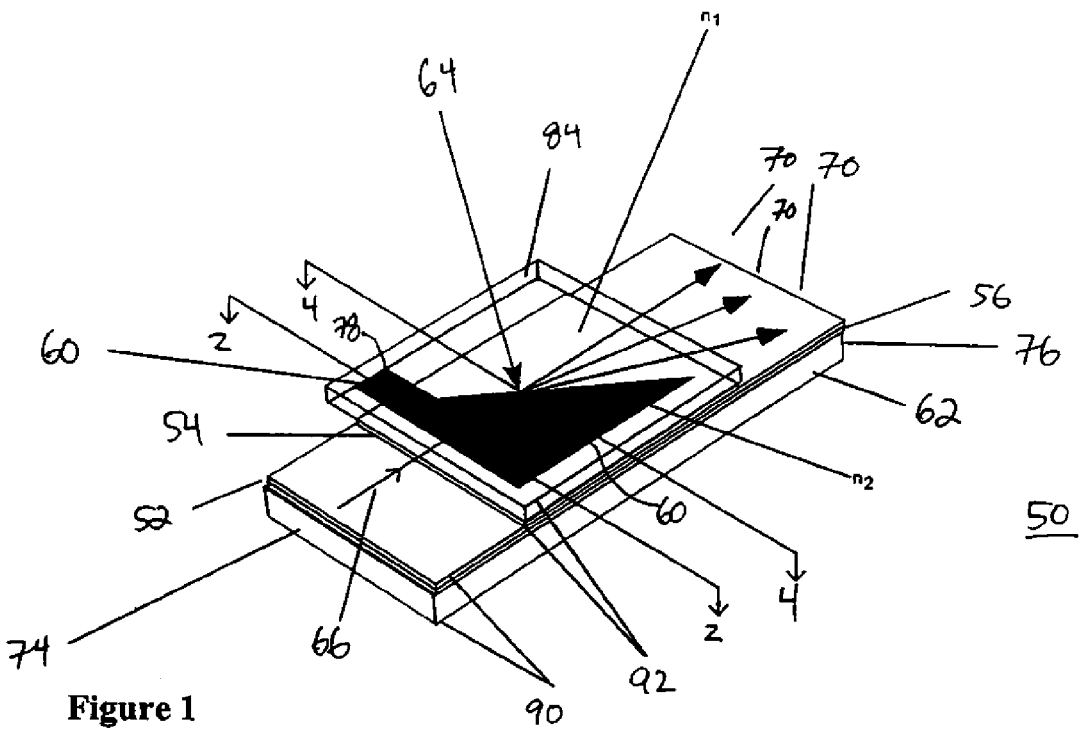
FIG. 1 illustrates an example of a waveguide having a patterned electrode for providing active control of light propagation, in accordance with an embodiment of the present invention.

As shown in FIG. 1, in one example, a waveguide 50 may include a core 52, a pair of claddings 54, 56 surrounding the core 52 wherein one of the claddings (e.g., the upper cladding 54) contains liquid crystal material 58 therein. In one example, one or more electrodes or an electrode layer 60 is positioned above the upper cladding 54 that has the liquid crystal material 58 therein, and a lower electrode or electrode layer or plane 62 is positioned below the lower cladding 56 and acts as a ground plane.

The one or more upper electrodes 60 define one or more shapes having at least one edge or interface 64 that is non-normal to the direction of light propagation 66 through the waveguide 50. As discussed below, the one or more shapes defined by the upper electrode(s) 60 may be used to controllably refract or bend light as light passes through the core 52 and upper and lower claddings 54, 56 of the waveguide. The upper electrodes 60, also referred to herein as patterned electrodes, may be shaped or patterned in various manners, including generally triangular or wedge shaped for steering light, or the shapes may include various lens shapes for focusing or defocusing light that passes through the waveguide 50.

In general and as discussed below, at least two indices of refraction can be realized within a waveguide made according to embodiments of the present invention. The liquid crystal material 58 which is not beneath the patterned electrodes(s) 60 may be characterized as having a first index of refraction n1, and n1 is generally unaffected by the application of a voltage 68 to the patterned electrodes 60.

The liquid crystal material 58 beneath the patterned electrodes 60 can be characterized as having a tunable and dynamic index of refraction n2. In one example, when no voltage 68 is applied to the upper electrode 60, n2 equals n1 and no refraction occurs. As voltage 68 is applied and increased between the upper patterned electrode(s) 60 and the lower electrode plane 62, the index of refraction n2 of the liquid crystal material under the upper patterned electrode(s) 60 is controllably changed as a function of the applied voltage 68. Depending upon the implementation, the applied voltage 68 can be a DC voltage, or an AC voltage, for instance, at low frequencies to high frequencies such as 50 KHz or higher.

Hence, as the difference between n2 and n1 increases, the amount of refraction or bending of light passing through the waveguide 50 can be increased as well. Hence, the amount of bending or refraction of light as it passes through the waveguide 50 can be controlled electronically and without any moving parts to perform numerous useful functions, such as for use in a barcode scanner, a CD/DVD read/write head, a tunable laser, or other applications. In FIG. 1, the input light beam is shown as 66, and the output light beam is shown as 70, with the amount of output angle of output light beam 70 being a function of the applied voltage 68, among other things.

As shown in FIG. 1, the waveguide 50 may be generally rectangular in shape and may include a core 52 having a generally rectangular cross-section or defining a parallel piped between walls 72. On the front end 74 of the waveguide 50, light 66 is introduced into the waveguide core 54 and propagates along the length of the waveguide 50 to the distal end 76 of the waveguide 50. As shown in FIG. 1, the direction of propagation of light 66 through the waveguide 50 is generally along the length of the waveguide 50, and use of embodiments of the present invention permit the output propagation direction or angle 70 to be controllably altered depending, in part, on the shapes of the upper electrodes 60 and the voltages 68 applied between the upper electrodes 60 and the lower electrode or plane 62. Although the waveguide 50 in FIG. 1 is shown as generally rectangular, it is understood that a waveguide made according to one or more embodiments of the present invention could have other shapes such as square, trapezoid, parallelogram, any polygon, or even be diced or scribed so as to have rounded edges producing elliptical, circular, or any curved shape.

As shown in FIGS. 1-2, 4, 6, 8, 10 and others, the core 52 may be a substantially planar core that can define a substantially planar upper and/or lower surface that may extend or span the length, or a portion of the length, of the waveguide 50. In one example, the light beam 66 is refracted or steered in a direction parallel to the substantially planar upper or lower surface of the core 52. In another example, the refraction of the light beam 66 is confined to be in a direction substantially parallel to the upper or lower planar surface of the core 52. In another example, the upper and/or lower substantially planar surface of the core 52 may be parallel to the electrodes 56, 60 in the waveguide 50.

In one example, the patterned electrode(s) 60 may include a tab or extension therefrom 78 which permits the patterned electrode(s) to be electrically connected to other electrical elements, such as a voltage source 68 coupled between the patterned electrode 60 and the lower electrode or plane 62. Alternatively, electrical traces, conductors, vias or other conventional connection types may be utilized instead of or with tab 78 to electrically couple a patterned electrode 60 to other electrical elements.

Figure 2:
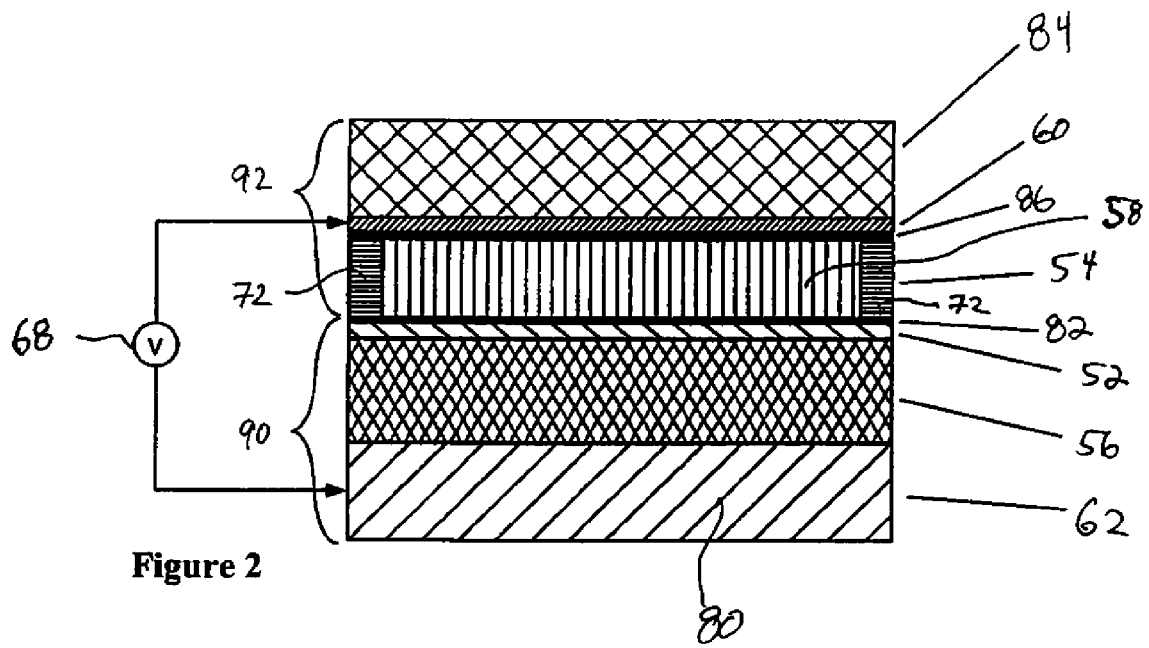
FIG. 2 illustrates a sectional view taken along section lines 2-2 of FIG. 1, illustrating an example of an embodiment of the present invention.

FIG. 2 illustrates a sectional view of a waveguide 50 in accordance with one embodiment of the present invention. As shown in FIG. 2, in one example, a waveguide 50 may include a substrate 80 such as a P-doped silicon substrate or any other conductive material, which provides structural support for the waveguide 50 and also acts as a lower electrode or ground plane 62 to which a voltage 68 may be applied. The substrate 80 may also be formed from any metal, such as silver, copper, aluminum, gold, titanium, etc. Alternatively, the substrate 80 can be nonconductive, such as a glass or crystal, and a conductive coating or electrical ground plane can be applied to the top of the substrate surface, between the substrate 80 and lower cladding 56. This conductive coating can be ITO, Au, Ag, Al, Cu, or any other of a number of conductive coatings. If the substrate 80 is constructed from Si, then circuitry can be directly integrated into the substrate 80 if desired. The conductive substrate 80 is also referred to herein as the lower electrode 62.

A lower cladding layer 56 is provided on the substrate 80 and is preferably made of any dielectric materials with low absorptions whose index of refraction is less than the index of refraction of the core. Suitable materials include Silicon OxyNitride, Silicon-Rich Nitride, Silicon Nitride, Tantalum Pentoxide, Polymers, Pure Silicon, Ion exchange glass on substances such as Lithium Niobate, Sol-Gel, thermally oxidized silicon, glass. In one example, the interface between the lower cladding 56 and the core layer 52 is transparent so that light can penetrate the lower cladding 56 as it propagates through the core 52.

On top of the lower cladding 56, a waveguide core or core material 52 is provided. In one embodiment, the core 52 does not include any liquid crystal material 58 therein. The core 52 may be made of materials such as any dielectric materials with low absorptions whose index of refraction is greater than the index of refraction of the upper and lower claddings 54, 56. Suitable materials include, but are not limited to, Silicon OxyNitride, Silicon Rich Nitride, Silicon Nitride, Tantalum Pentoxide, Polymers, Pure Silicon, Ion exchange glass on substances such as Lithium Niobate, Sol-Gel, thermally oxidized silicon, glass. In one example, the core 54 has a thickness that is tapered or includes a channel. Furthermore, a core 54 may have a constant index of refraction along the length of the waveguide 50, or alternatively have an index of refraction that varies across or along the device.

On top of the core layer 52, an alignment layer 82 (shown as the lower alignment layer 82 in this example) is provided which is used to initially align or bias the orientation of liquid crystal material 58 that is proximate to or adjacent to the alignment layer 82 and the core 52. Alignment can be achieved, for example, by buffed polyimide, nylon, or other polymer coating applied to the core 52 and or the cover plate 84, photo-aligned polyimide, polymer or other photo-aligned material, angle deposited SiO, SiO2 or other angle deposited material, microgrooves etched or directly e-beam written into the core 52 and or cover plate 84, ion-buffed surfaces on the core or lower cladding, a dispersed polymer matrix that is photoaligned, or direct buffing of either surface. In one example the alignment layer 82 may be a coating or layer that induces a homeotropic alignment in the liquid crystal 58. In one example, the lower alignment layer 82 is generally transparent.

On top of the lower alignment layer 82, the upper cladding 54 is provided having liquid crystal material therein 58. In one example, the interface between the lower alignment layer 82 and the upper cladding 54 is transparent. The liquid crystal material 58 may include, but is not limited to, any nematic liquid crystal, with either a positive dielectric constant or a negative dielectric constant or a mixture of each, polymer dispersed liquid crystal material, Smectic A* and C* liquid crystal material, cholesteric liquid crystal material such as ferroelectrics and surface stabilized ferroelectrics, or dual-frequency liquid crystal material, for example. While the various figures herein show the liquid crystal material 58 as being nematic liquid crystal, it is understood that embodiments of the present invention may utilize other types of liquid crystal material.

In one example, the upper cladding 54 is formed using spacer material to define a region or volume wherein liquid crystal material 58 may be contained therein, and optically transparent glue such as Norland 68 may be used to create transparent boundary walls 72 to contain the liquid crystal 58.

On top of the upper cladding 54, an upper alignment layer 86 may be provided to initially align or bias the orientation of liquid crystal material 58 that is adjacent to or proximate to the upper alignment layer 86. As with the lower alignment layer 82, alignment can be achieved, for example, by buffed polyimide coating, photo-aligned polyimide, angle deposited SiO and or SiO2, microgrooves etched or otherwise formed, ion-buffed surfaces, a dispersed polymer matrix that is photoaligned, or direct buffing. In one example, the upper alignment layer 86 is generally transparent.

The alignment of the liquid crystal 58 between the lower and upper alignment layers 82, 86 can be anti-parallel, parallel, twisted, or hybrid between twisted and parallel or anti-parallel. The direction of liquid crystal alignment can be at any angle with respect to the direction of light propagation 66. Described below are examples of where the alignment of the liquid crystal materials 58 is adapted to provide for refraction of TE or TM modulated light as it passes through a waveguide made according to embodiments of the present invention.

On top of the upper alignment layer 86 and below the glass cover 84, a patterned electrode layer 60 or portions of the patterned electrode layer 60 are present. In one embodiment, the patterned electrode layer 60 includes one or more electrodes having non-normal interfaces 64 relative to the orientation of light 66 traveling through the waveguide 50, or includes one or more curved or lens shaped interfaces 64. In one example, the patterned electrode layer 60 is a conductive coating applied to the bottom surface of the glass cover 84. The conductive coating can include, but is not limited to, ITO, Au, Ag, Al, Cu, or any other conductive coating. In another example, the patterned electrode 60 can be p-doped silicon or any metal, such as silver, copper, aluminum, gold, titanium, alloys, or other conductive material, etc. In one example, the glass cover 84 may be made of materials such as, but not limited to, standard float glass such as Corning 1737, fused silica, or any flat surface. Since the evanescent portion of the light preferably does not pass through the cover plate 84, the cover plate 84 can be made from non-transparent materials such as silicon wafers, ceramics, or polished metal surfaces. In another embodiment, the cover plate 84 may be a metal or any other conductive material and serve as the upper electrode.

Using the structure of FIGS. 1-2 or variations thereof, various different waveguides 50 can be formed to selectively and controllably refract, bend, or focus light 66 as it passes through the waveguide 50. When a voltage 68 is applied between the patterned electrode(s) 60 and the substrate 80, an electric field is formed between the patterned electrode 60 and the substrate 80 which induces movement of the liquid crystals 58 in the upper cladding 54 that are subject to the applied electric field. As the liquid crystals 58 move or change their orientation based on the applied voltage, the index of refraction of the affected portion of the upper cladding 54 is changed relative to the index of refraction of the non-affected portions of the liquid crystal material 58 in the upper cladding 54. As shown in FIG. 1, the portion of the waveguide 50 which is not affected by the electric field created between the patterned electrode 60 and the substrate 80 can be characterized as having a first index of refraction (shown as n1), while the portion of the waveguide 50 affected by the electric field created between the patterned electrode 60 and the substrate 80 may be characterized as having a second index of refraction (shown as n2). Under Snell's Law, light refracts when crossing an interface 64 between two different indices of refraction if the interface 64 is oriented in a non-normal relation to the direction of propagation of light 66. In FIG. 1, the patterned electrode 60 has a non-normal interface 64 on its distal trailing edge, so that as light 66 propagates through the waveguide 50 from the front end 74 to the distal end 76 of the waveguide 50, light 66 is refracted or steered (shown as 70) in a controlled manner depending upon the amount of voltage 68 applied between the patterned electrode 60 and the substrate 80.

Preferably, the core layer 52 is surrounded by an upper and lower cladding 54, 56, wherein the interfaces between the lower cladding 56 and the core layer 52 and between the upper cladding 54 and the core layer 52 are transparent. As light 66 enters the core layer 52 and propagates through the core 52 along the length of the waveguide 50, the evanescent portion of the propagating light 66 waves penetrates into both the upper and lower cladding 54, 56. Preferably, the core layer 52 has a fixed index of refraction, and the lower cladding also has a fixed index of refraction. By providing liquid crystal material 58 within the upper cladding 54, a portion of which is controllably subjected to an electric field between the patterned electrode 60 and the substrate 80, the index of refraction (n2) of the upper cladding layer 54 can be controllably altered. Stated differently, the average index of refraction (also referred to herein as the effective index of refraction, or index of refraction) of the upper cladding 54, core 52, and lower cladding 56 as experienced by a single TN or TE mode of light in the waveguides can be controllably altered by altering the index of refraction (n2) of the upper cladding 54. Hence, as light 66 passes through the waveguide core 52 and upper and lower cladding 54, 56, the light 66 can be controllably refracted, steered, or focused (70) through the use of the upper electrode 60 having a non-normal interface 64 therein. Because the liquid crystal material 58 is disposed within the upper cladding 54 and interacts primarily with the evanescent portion of the light wave 66 and the fundamental portion of the light wave 66 passes through the core material 52, there is no significant attenuation of the intensity of the light 66 as the light 66 passes through the waveguide 50. This permits the length of the waveguide 50 to be beneficially long so that numerous electrodes 60 can be utilized in a cascade or series arrangement if desired, for example as in FIGS. 16-18.

Furthermore, in one example, the evanescent portion of the light 66 is only interacting with the liquid crystal molecules 58 that are close to the alignment layer 82. These molecules 58 are more highly ordered than liquid crystal molecules 58 further away from the alignment layer 82 and therefore scatter less light. In one example, the losses are sufficiently low (e.g., less than 0.5 dB/cm) that the waveguide 50 length can be lengthy (e.g., 4 inches or greater).

In one embodiment of the invention, a waveguide 50 may be formed having a first and second assembly 90, 92, wherein the first and second assemblies 90, 92 are attached to one another in order to form the overall waveguide 50. As shown in FIG. 2, the first assembly 90 may include the substrate 80, the lower cladding 56, the core 52, and the lower alignment layer 82; and the second assembly 92 may include the glass cover 84, the patterned electrode(s) 60, the upper alignment layer 96 and upper cladding 54 with liquid crystal material 58 therein. One method for forming a waveguide is illustrated below in FIGS. 3 and 14.

While FIGS. 1-2 show a particular arrangement of layers of a waveguide according to one embodiment of the present invention, it is understood that the present invention contemplates variations of this arrangement. For instance, the patterned electrode(s) 60 may be positioned in a different layer than as shown in FIG. 1-2, such as proximate the lower portion of the waveguide 50 (see FIG. 12 as an example). The conductive lower electrode 62 may also be positioned at different layers within the waveguide if desired. Further, while two alignment layers 82, 86 are shown, the invention may include a single alignment layer. While the liquid crystal material 58 is shown as disposed within the upper cladding 54, it is understood that the liquid crystal material 58 may be disposed in the lower cladding 56 if desired.

Figure 3:
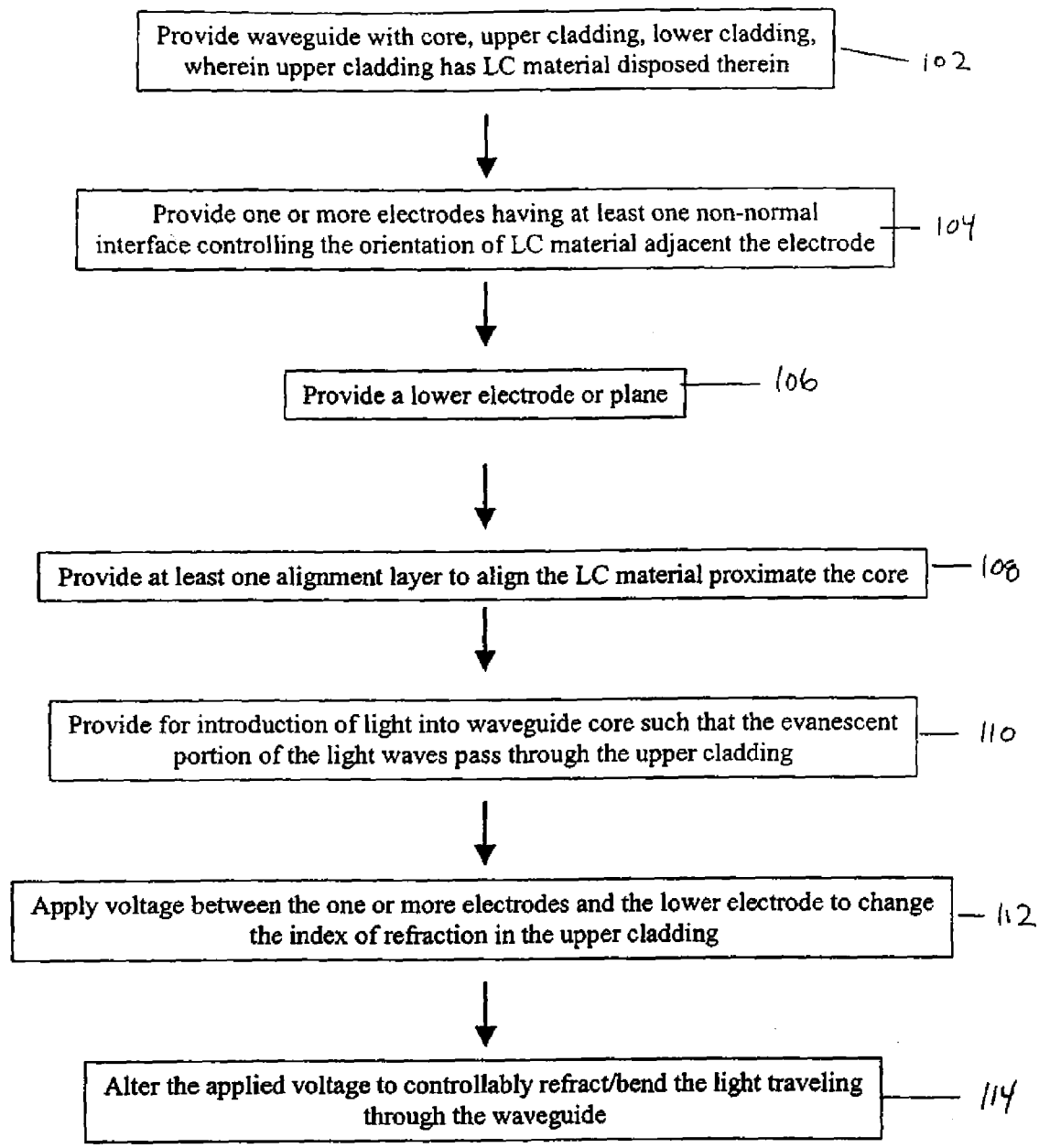
FIG. 3 illustrates an example of operations for forming a waveguide having patterned electrodes for controlling light, in accordance with an embodiment of the present invention.

FIG. 3 illustrates an example of operations 100 for controlling the refraction of light through a waveguide, in accordance with one embodiment of the present invention. At operation 102, the waveguide is provided with a core, an upper cladding, and a lower cladding where in one example the upper cladding has liquid crystal material disposed therein. Alternatively, liquid crystal material may be disposed within the lower cladding if desired. At operation 104, one or more electrodes are provided for controlling the orientation of the liquid crystal material proximate the one or more electrodes, wherein the one or more electrodes have at least one non-normal interface relative to the direction of propagation of light through the waveguide. As discussed above, the non-normal interface results in refraction, steering, or bending of light as light exits the non-normal interface. At operation 106, a second electrode or ground plane is provided. In one example, a substrate material of the waveguide is electrically conductive and acts as a lower electrode or ground plane so that a controlled voltage can be applied between the patterned electrode and the substrate to create an electric field therebetween.

At operation 108, at least one alignment layer is provided to align the liquid crystal material proximate the core. For instance, a lower alignment layer (such as 82 in FIG. 2) can be provided to initially align or bias the liquid crystals within the upper cladding and adjacent to the lower alignment layer. By providing the alignment layer, the liquid crystal material responds to an applied voltage in a faster and more orderly and predictable manner. Further, when no voltage is applied to the liquid crystal material, the alignment layer provides sufficient liquid crystal ordering to minimize scattering of the light propagating through the waveguide because the evanescent portion of the light interacts primarily with the highly ordered liquid crystal molecules along the alignment layer.

At operation 110, the introduction of light is provided into the waveguide core such that as the primary or fundamental portion of the light input into the waveguide travels through the core, and the evanescent portion of the light passes through the upper and lower claddings of the waveguide. In one example, operation 110 is achieved by prism coupling, grating coupling, end-fire coupling or other conventional coupling techniques. In another embodiment, polarized light (such as TE or TM polarized light) is introduced into the waveguide and operation 108 provides a liquid crystal orientation that is adapted to controllably refract, steer, or focus the polarized light.

At operation 112, a voltage is applied between the one or more electrodes and the lower electrode in order to change the effective index of refraction of the materials between the one or more electrodes and the lower electrode. By altering the refraction of the liquid crystal material under the patterned electrodes (e.g., shown as n2 in FIG. 1), a modulation index or change in the index of refraction (referred to as ΔN) is achieved. As the modulation index ΔN increases, the amount of light beam refraction also increases, which permits active, solid state control of the amount of refraction of light passing through the waveguide. At operation 114, the amount of applied voltage may be altered to controllably refract or bend the light traveling through the waveguide.

In one example of waveguides formed in accordance with embodiments of the present invention, various degrees of modulation index through waveguides were achieved, and are summarized in Table 1 and Table 3. Hence, it can be seen that by the operations of FIG. 3, light can be controllably refracted or steered as it passes through a waveguide.

Embodiments of the present invention can be used to selectively control the index of refraction for particular types of polarized light, such as TM polarized light and TE polarized light. Generally, TM (Transverse Magnetic) polarized light means that the magnetic field of the light wave is traversing the plane of the waveguide, while the electric field is substantially perpendicular to the plane of the waveguide. TE (Transverse Electric) polarized light is characterized by the electric field of the light traversing the plane of the waveguide, while the magnetic field of the light is substantially perpendicular to the plane of the waveguide.

Figure 4:
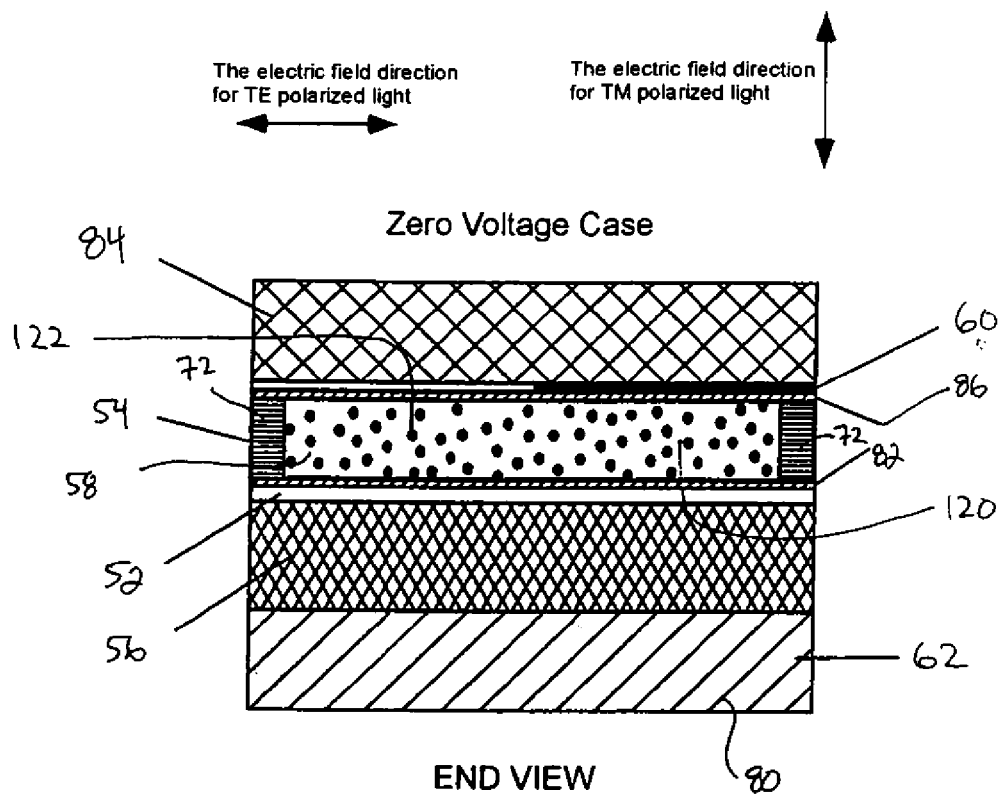
FIG. 4 illustrates a sectional view of the waveguide along section lines 4-4 of FIG. 1 where no voltage is applied to the patterned electrode, in accordance with one embodiment of the invention.
Figure 5:
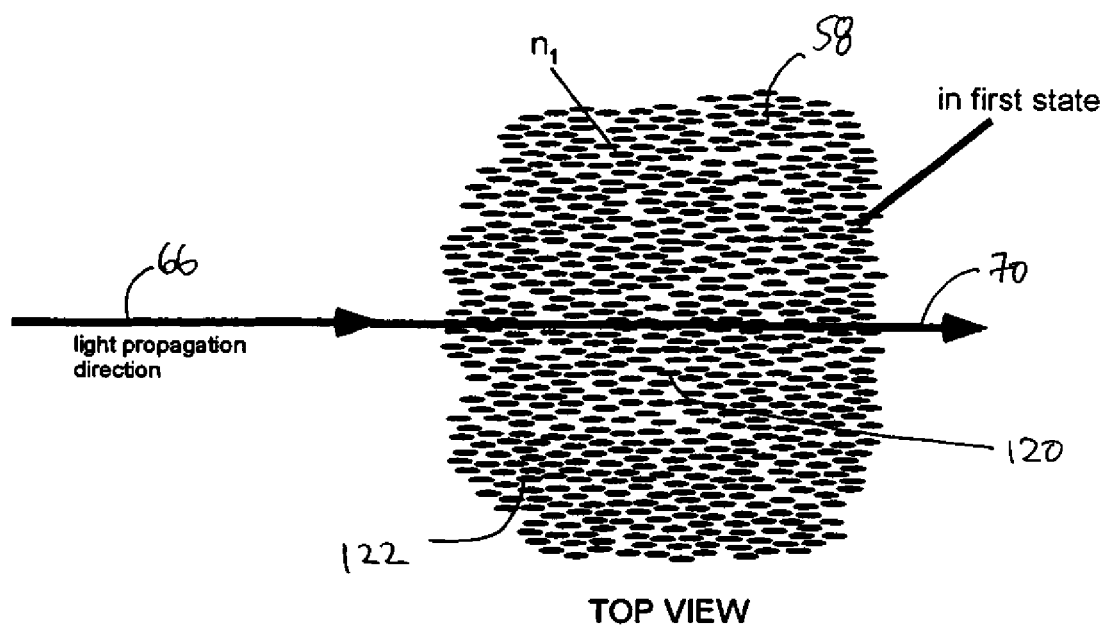
FIG. 5 illustrates a top view of the liquid crystals as oriented in the upper cladding of FIG. 4 where no voltage is applied to the patterned electrode, in accordance with one embodiment of the present invention.
Figure 6:
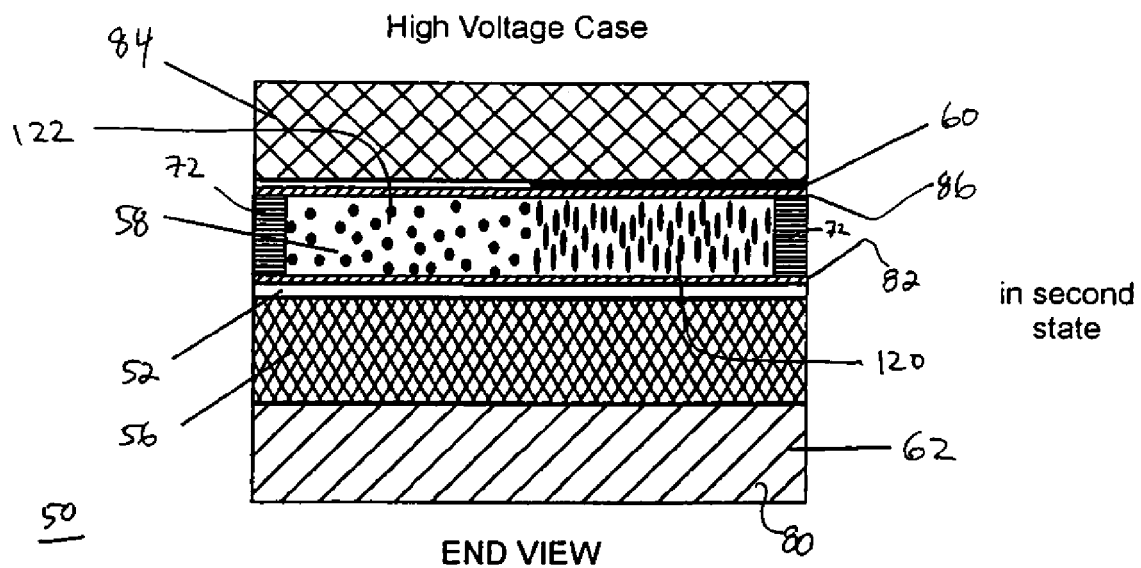
FIG. 6 illustrates a sectional view of the waveguide along section lines 4-4 of FIG. 1, wherein a voltage is applied to the patterned electrode so as to alter the orientation of the liquid crystal material under the patterned electrode, in accordance with one embodiment of the present invention.
Figure 7:
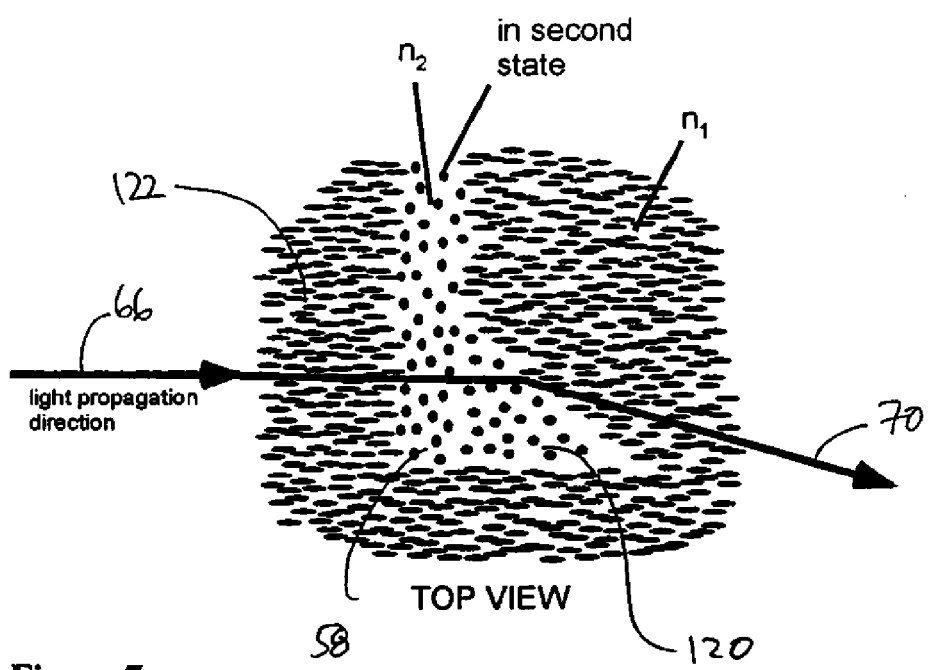
FIG. 7 illustrates a top view of the liquid crystal material in the upper cladding of FIG. 6, when a voltage is applied to the patterned electrode, in accordance with one embodiment of the present invention.

FIGS. 4-7 and 8-11 illustrate various examples of how embodiments of the present invention may be used to refract, steer, or focus light that has been polarized either as TE or TM polarization. Referring to FIGS. 4-7, if the liquid crystals 58 disposed within the upper cladding 54 are initially aligned (e.g., through the use of the lower and upper alignment layers 82, 86) in such a way that the long axis of the liquid crystals 58 are aligned in parallel with the direction of light propagation 66 through the waveguide 50 (FIGS. 4-5 show this situation when no voltage 68 is applied to the electrodes 60, 62), then when voltage 68 is applied to the electrodes 60, 62, the liquid crystals 120 beneath the patterned electrode 60 respond by rotating upwardly in a plane containing the applied electric field vector and the propagation vector of the light 66. The liquid crystals 122 that are not beneath the electrode 60 generally maintain their orientation. When the long axis of the affected liquid crystals 120 are perpendicular to the direction of propagation of light 66 through the waveguide 50, or the long axis of the affected liquid crystals 120 are at intermediate stages such that they are not parallel to the propagation vector 66 (see FIGS. 6-7), then light 66 which is TM polarized experiences a higher index of refraction within the volume of liquid crystals 120 beneath the patterned electrode 60. This is because the E field of the propagating light 66 interacts more strongly with the LC molecules 120 when the LC molecules 120 are perpendicular to the direction of propagation of TM polarized light. Accordingly, as seen in FIGS. 4-7, a waveguide 50 can be formed that can controllably refract, steer, or focus light which is TM polarized. In one example, the light 66 is TM polarized before it enters into the waveguide (FIG. 7).

In FIGS. 4-7, light 66 which enters the waveguide 50 with a TE polarization would not be affected, refracted, or steered by the movement of the affected liquid crystals 120 into the second state because the electric field of TE polarized light experiences the same interaction with the liquid crystals 120 in both the first state and the second state. In other words, in one example, the electric field of the TE polarized light is perpendicular to the long axis of the molecules.

Figure 8:
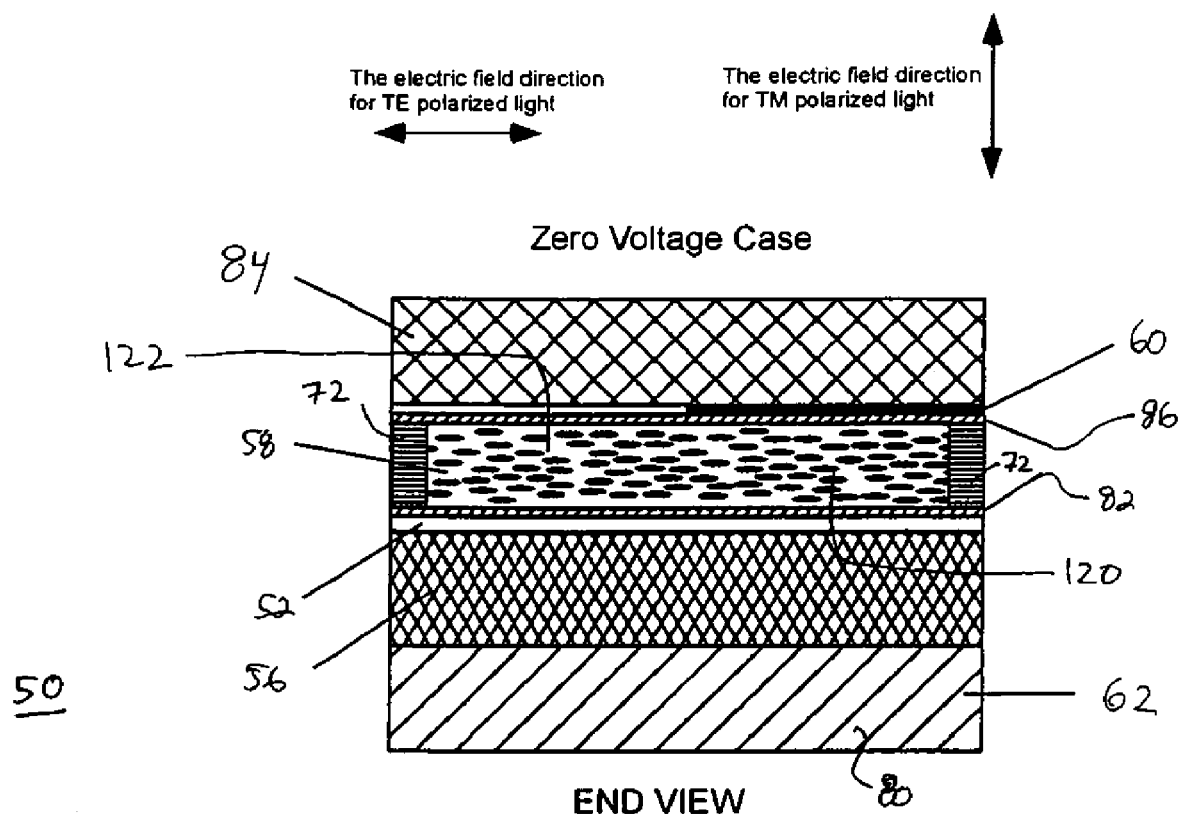
FIG. 8 illustrates a sectional view of the waveguide along section lines 4-4 of FIG. 1 where no voltage is applied to the patterned electrode, in accordance with one embodiment of the present invention.
Figure 9:
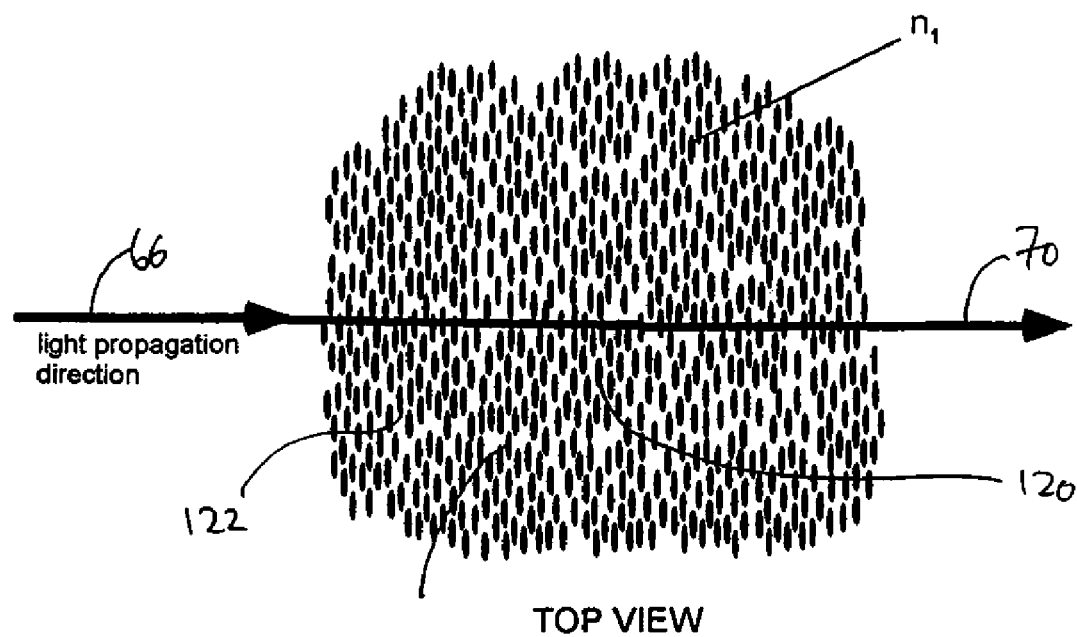
FIG. 9 illustrates a top view of the liquid crystal material within the upper cladding of the waveguide of FIG. 8 where no voltage is applied to the upper electrode, in accordance with one embodiment of the present invention.
Figure 10:
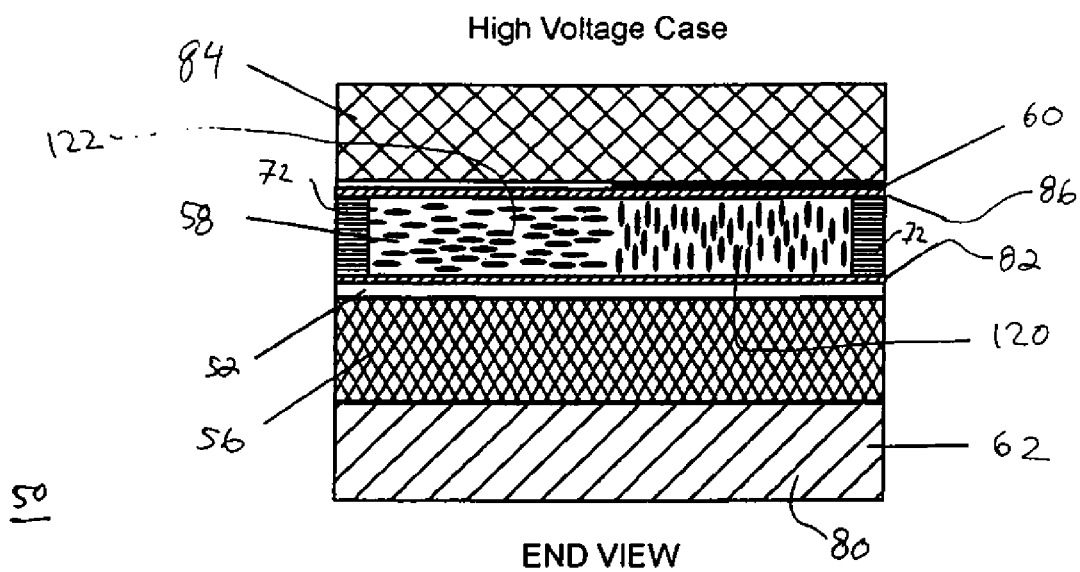
FIG. 10 illustrates a sectional view of the waveguide of FIG. 1 taken along section lines 4-4, when a voltage is applied to the patterned electrode so as to change the orientation of the liquid crystal material under the patterned electrode, in accordance with one embodiment of the present invention.
Figure 11:
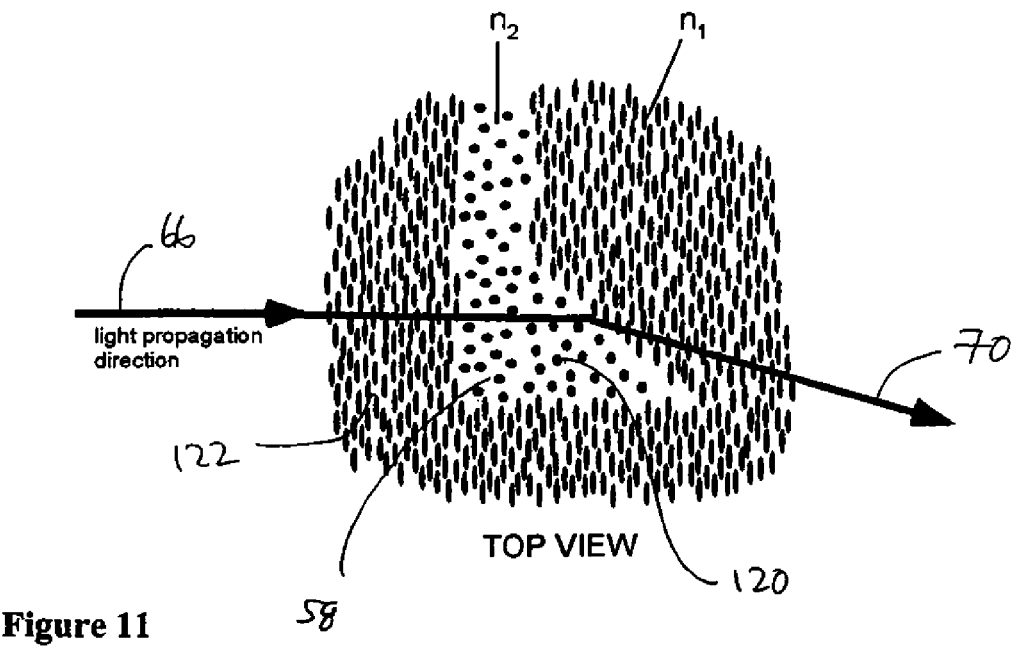
FIG. 11 illustrates a top view of the liquid crystal material within the upper cladding of FIG. 10 when a voltage is applied to the patterned electrode, in accordance with one embodiment of the present invention.

With regard to FIGS. 8-11, these figures illustrate an embodiment of the present invention wherein the liquid crystals 58 disposed within the upper cladding 54 are aligned with their long axis perpendicular to the direction of propagation 66 of light through the waveguide 50. Again, the alignment of the liquid crystals 58 can be biased or initially aligned through the use of the upper and lower alignment layers 86, 82. In this embodiment, light which is TE polarized can be refracted, steered, or focused as it travels through the waveguide 50, and further, light which is TM polarized that enters the waveguide 50 can also be refracted, steered, or focused as it travels through the waveguide 50. FIGS. 8-9 show the liquid crystals 58 in their initial, first, or zero voltage state, where the liquid crystals 58 have been aligned with their long axis perpendicular to the propagation 66 of light traveling through the waveguide 50. For light that is TE polarized prior to entry into the waveguide 50, the orientation of the liquid crystals 58 in the initial or first state provides a larger index of refraction than when the liquid crystals 58 are oriented vertically upward in the second state (FIGS. 10-11). Accordingly, TE polarized light can be refracted, steered, or focused through the use of this embodiment of the present invention. Likewise, TM polarized light can be refracted as well. For TE polarized light, in the second state where the voltage is on, n1 is greater than n2. For TM polarized light, in the second state where voltage is on, n2 is greater than n1.

Figure 12:
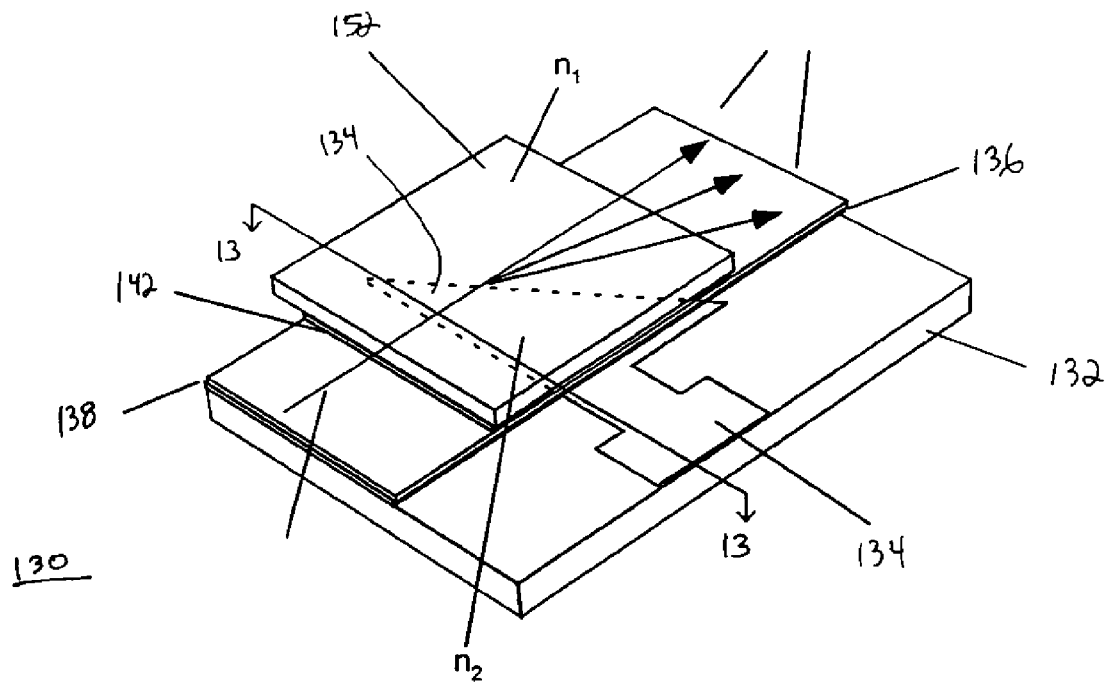
FIG. 12 illustrates an alternative embodiment of the present invention wherein a patterned electrode is positioned between the substrate and the lower cladding of a waveguide, in accordance with one embodiment of the present invention.
Figure 13:
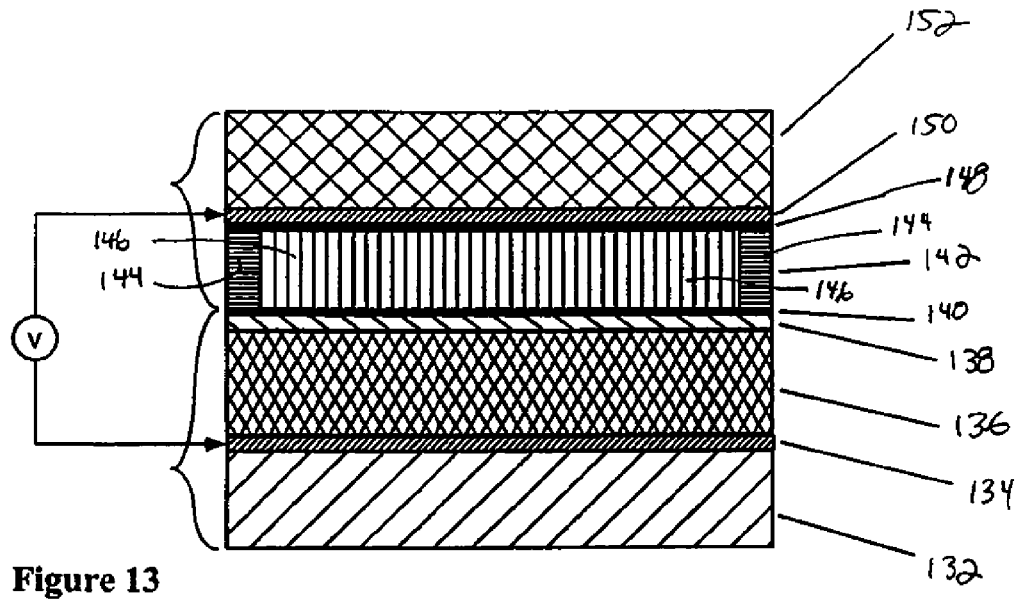
FIG. 13 is a sectional view of a waveguide taken along section 13-13 of FIG. 12, in accordance with one embodiment of the present invention.

While FIGS. 1-11 illustrate one example of the present invention, it is understood that the principles of the present invention could be employed in other arrangements of liquid crystal waveguides, and one such example is illustrated in FIG. 12. In FIG. 12, an alternative embodiment of a waveguide 130 is illustrated in accordance with the present invention. In this example, the ordering of the layers of the waveguide 130 are changed when compared with FIGS. 1-2. In FIG. 12, a substrate 132 defines the lower portion of the waveguide 130 and a patterned electrode 134 is placed on top of the substrate 132 (see also FIG. 13). As shown in FIG. 13, a lower cladding 136 made of non-electro optic material may be placed on top of the electrode layer 134. The core 138 layer may be placed on top of the lower cladding 136, and a lower alignment 140 layer may be placed on top of the core layer 138. An upper cladding 142 having walls 144 with liquid crystal materials 146 therein may be placed on top of the lower alignment layer 140, and an upper alignment layer 148 may be placed on top of the upper cladding 142. A conductive layer or plane 150 may be placed on top of the upper alignment layer 148, and a cover plate 152 may be placed on top of the conductive layer 150. In this embodiment, the liquid crystals 146 are disposed within the upper cladding 142. It is understood that the liquid crystals 146 could be disposed within the lower cladding 136 if desired, and the alignment layers 140, 148 could be placed on the upper and lower surfaces of the lower cladding 136 having the liquid crystal material 146 therein.

Figure 14:
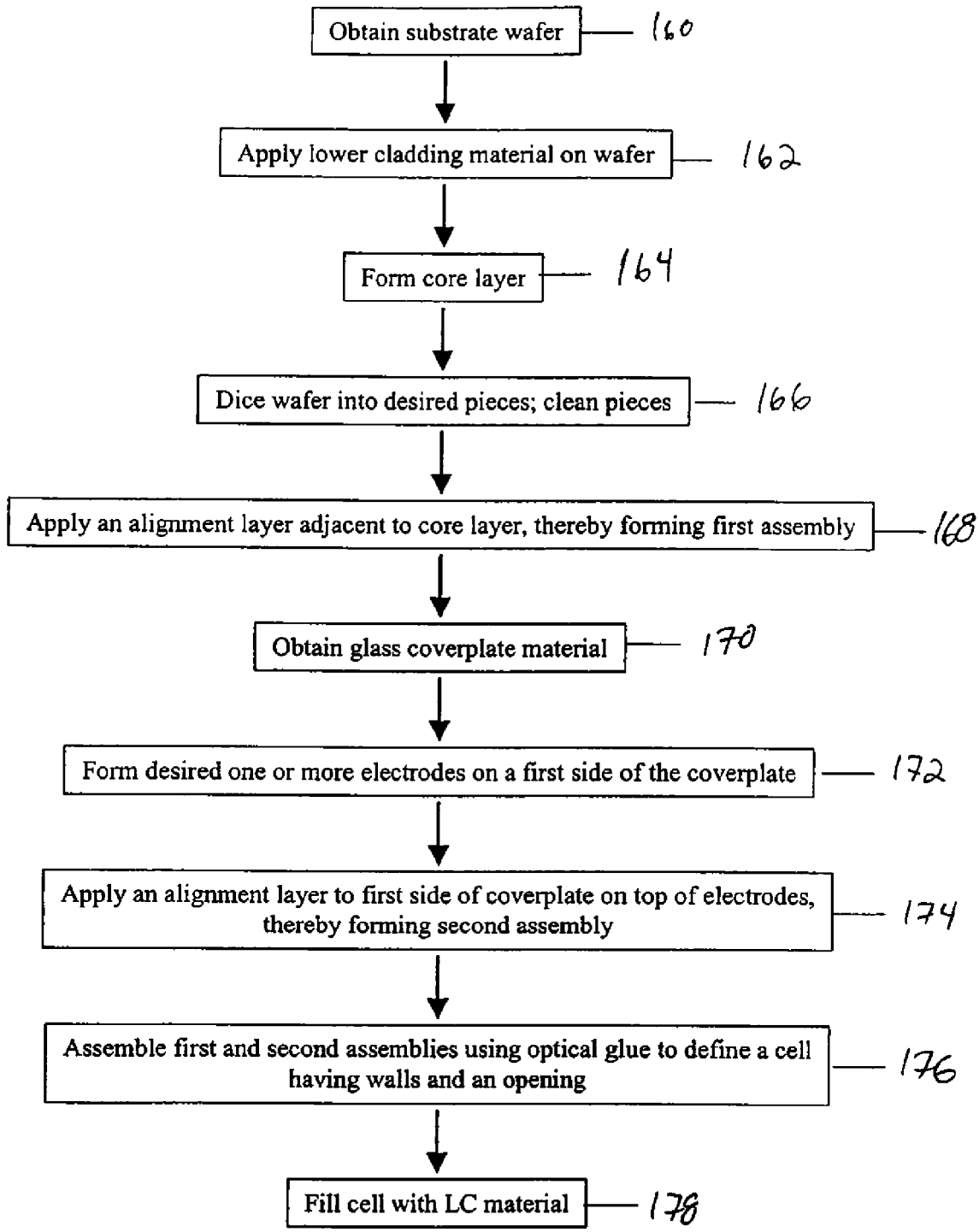
FIG. 14 illustrates an example of operations for forming a waveguide having one or more patterned electrodes for controlling the propagation of light through the waveguide, in accordance with one embodiment of the present invention.

FIG. 14 illustrates an example of operations that may be used for making one example of a waveguide in accordance with one embodiment of the present invention. In making a waveguide, the materials described with reference to FIGS. 1-2 or as described otherwise herein may be used and conventional materials may be used. At operation 160 of FIG. 14, a substrate wafer is obtained for forming the base of the waveguide. In one example, the substrate wafer is a P-doped, polished silicon substrate wafer such that the substrate can act as the lower electrode, for example as in the embodiment of FIGS. 1-2. At operation 162, a lower cladding material is applied onto the substrate wafer. At operation 164, the core layer is formed on top of the lower cladding material, in one example. At operation 166, in one example, the wafer is diced into desired pieces, wherein each piece will form a separate waveguide, and cleaned if desired. A conventional dicing saw for semiconductor substrates may be used. Cleaning may include cleaning in an ultrasonic cleaner with a mild soap or solvent, or cleaning with methanol wipes. Also, stresses from the coating process under which the waveguides are made may induce warp and bow, which can be removed via optically contacting the waveguide to an optical flat or stiffener plate. In another example, using wafers polished on both sides and applying thermally grown SiO2 on both sides, to a thickness of about 2 microns, can reduce the warp and bow. This thermally grown SiO2 layer may serve as the lower waveguide cladding.

At operation 168, for each piece, an alignment layer is applied adjacent to the core layer, and this combination may form a first assembly. There are several methods of applying the alignment layer, most of which are standard for liquid crystal cells. These include: i) spin coat a polyimide layer, which is then buffed with a cloth (to provide directionality); ii) buff the waveguide directly; iii) oblique deposition of an SiO or SiO2 layer; iv) photo-align a spin-coated polyimide or other polymer layer via exposure to polarized light (see FIGS. 28-32 below); v) microgrooves (see FIGS. 28-32 below); and vi) angled ion buffing.

A second assembly may be formed by operations 170, 172, 174. At operation 170, a piece of glass cover plate material is obtained, and at operation 172, one or more electrodes are formed on a first side of the glass cover plate material, wherein at least one of said one or more electrodes has a non-normal edge or interface relative to the axis or direction that light will propagate relative to the cover plate. Operation 172 may be implemented by applying a coating such as an indium tin oxide (ITO) layer or any conductive layer, e.g., gold, aluminum. After this coating is applied it can be patterned via standard photo-lithographic processes.

At operation 174, an alignment layer may be applied to the first side of the cover plate on top of the electrodes, thereby forming a second assembly. This can be achieved in the same manner as operation 168. At operation 176 the first and second assemblies are joined together, preferably using optical glue to define a cell having three walls and an opening along the fourth wall. At operation 178, the cell is filled with liquid crystal material, and this filled structure may form the upper cladding in the example of FIGS. 1-2. Operation 178 may be implemented by establishing the cell thickness by mixing spacer balls (typically 3-10 microns) into the glue that attaches the cover plate to the waveguide. The cover plate is glued around the edges, but not in the middle, leaving a cavity. A small hole is left in the glue seal, which is used to fill the cavity with liquid crystal material. The cell created by the waveguide and cover plate is then filled with liquid crystal. A small drop of liquid crystal material, placed at the opening or hole in the glue seal, will wick into the cell. This can be done with only one opening or hole under vacuum, or with two holes at standard air pressure. After the cell is filled, the opening/hole in the glue seal is covered with more glue.

It is understood that FIG. 14 is provided for illustrative purposes only, and that these operations could be interchanged, subdivided, regrouped, or reordered depending upon the particular implementation and the particular waveguide being made. For instance, the operations could be re-ordered so as to form the waveguide 130 of FIGS. 12-13, or other waveguide structures.

Figure 15:
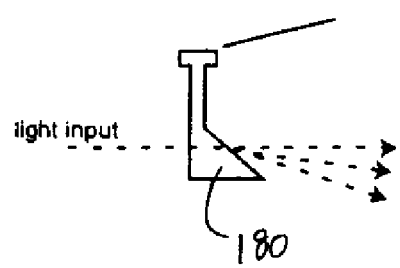
FIG. 15 illustrates an example of a patterned electrode for controlling light propagating through a waveguide, in accordance with an embodiment of the present invention.
Figure 16:
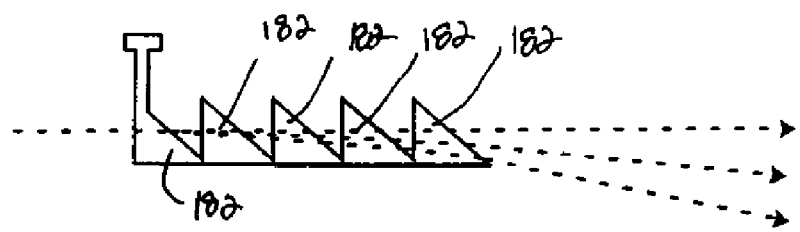
FIG. 16 illustrates another example of a patterned electrode for controlling light propagating through a waveguide, in accordance with an embodiment of the present invention.
Figure 17:
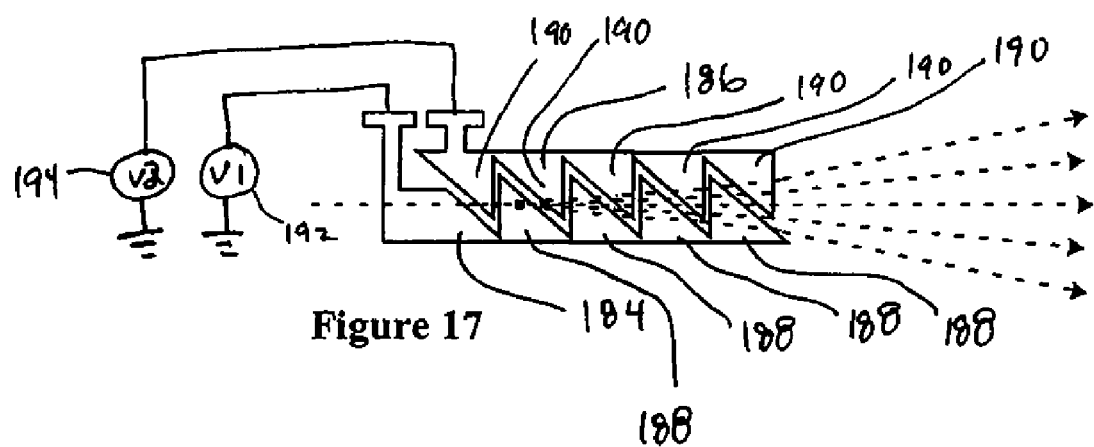
FIG. 17 illustrates an example of a pair of patterned electrodes for controlling light propagating through a waveguide, in accordance with an embodiment of the present invention.

In accordance with embodiments of the present invention, a patterned electrode 60, 134 may take various shapes depending upon the particular application. FIGS. 15-19 illustrate various examples of shapes for electrodes, such as electrodes 60, 134. If it is desired to refract or steer light over a small angle, then a simple wedge shape 180 as shown in FIG. 15 may be used for an electrode. If a larger amount of refraction is desired, then an electrode can include multiple wedge shapes 182 cascaded together and electrically coupled together so that each successive wedge 182 provides a greater amount of refraction of the light received from the preceding wedge, as shown in FIG. 16. In FIG. 17, an electrode can include a first and second electrode 184, 186 wherein the first and second electrode 184, 186 are electrically isolated. The first electrode 184 may provide a plurality of wedge shapes 188 in series for refracting or steering light in a downward direction, while the second electrode 186 provides a series of cascaded wedges 190 that refracts light upwardly. Hence, the embodiment of FIG. 17 can provide refraction over large angles. In use, a first voltage 192 could be applied to the first electrode 184 and as the first voltage 192 increases, the amount of deflection downwardly increases. As the amount of the first voltage 192 decreases, the amount of deflection decreases until the point where no voltage is applied to either the first or second electrode and the light propagates through the waveguide in a straight line. When a second voltage 194 is applied to the second electrode 186 (but not the first electrode), then the light passing through the waveguide begins to refract upwardly as the voltage 194 increases, and as the voltage 194 decreases, the amount of refraction decreases until the point where the light passes through the waveguide is a straight line.

Figure 18:
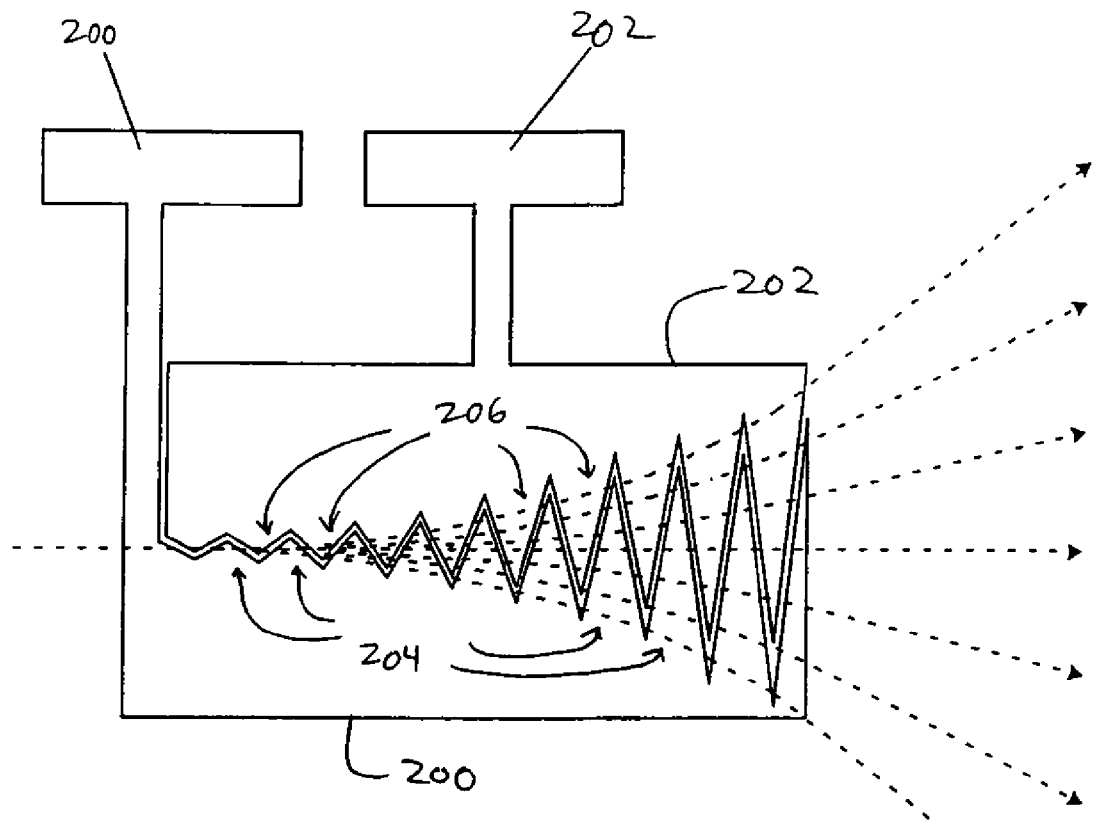
FIG. 18 illustrates another example of a pair of patterned shaped electrodes for controlling light propagating through a waveguide, in accordance with an embodiment of the present invention.

The angular tuning range of beamsteerer electrodes such as 184, 186 shown in FIG. 17 can be limited because with successive refraction at each prism/wedge 188, 190, the beam can be deflected sufficiently so as to exit the electrodes, and therefore no longer be steered by the remaining prisms/wedges 188, 190. In other words, the output aperture eclipses the beam, thus unnecessarily limiting the angular range. This can be alleviated by: i) forming the prism array into a horn shape so that the output aperture encompasses the full deflection range of the beamsteerers, and ii) forming the input aperture to match to the size of the beam being deflected. This can increase the steering range and is generally discussed in: Y. Chiu, K. J. Zou, D. D. Stancil, T. E. Schelsigner, *Shape-Optimized Electrooptic Beam Scanners: Analysis, Design, and Simulation*, J. of Lightwave Tech., Vol. 17, p 108 (1999); and D. A. Scrymgeour, Y. Barad, V. Gopalan, K T. Gahagan, Q. Jia, T. E. Mitchell, and J. M. Robinson, *Large-Angle Electro-Optic Laser Scanner on LiTaO3 Fabricated by in Situ Monitoring of Ferroelectric-Domain Micropatterning*, App. Opt. Vol. 40, p. 6236 (2001), the disclosures of which are incorporated by reference in their entirety. As applied to embodiments of the present invention, the outer envelope of a prism array, which defines the maximally refracted or steered beam, may be characterized by $$\frac{d^2 x}{dz^2} = \frac{\Delta n}{n} \frac{1}{W(z)}, \qquad \text{Eq. 1}$$

where $$W(z) = x(z) + \omega_0 \left\{ 1 + \left[ \frac{\lambda z}{\pi n \omega_0^2} \right]^2 \right\},$$

and $\Delta n$ is the maximum modulation index of the waveguide, n is the average effective index of the guided mode, $\lambda$ is the wavelength of light, and $\omega$ is the Gaussian beam waist of the input beam. In one example as shown in FIG. 18, within this envelope, electrodes 200, 202 can be formed with prisms 204, 206 formed by dividing the length of each electrode 200, 202 into N prisms 204, 206 of equal base length. The differential equation describing the envelope may be solved using numerical methods, and an electrode pattern may be constructed. An example of such an electrode pattern is shown in FIG. 18, wherein a first electrode 200 defines a plurality of successive prisms 204, and a second electrode 202 defines a second plurality of prisms 206 opposing the first set of prisms 204.

In a manner analogous to the two electrode beamsteerer of FIG. 17, selective application of voltage to one or the other electrode 200, 202 of FIG. 18 can be used to selectively steer the beam either to one side or the other.

Combinations of electrodes such as 180, 182, 184, 186, 200, 202 can be utilized to form optical switches wherein a first waveguide with one or more electrodes acts as a transmitter and a second waveguide with one or more electrodes can be positioned to receive the light transmitted by the first waveguide.

In another example, a waveguide using the electrodes of FIG. 18 may selectively control light (e.g. a laser beam) through an aperture, so that a laser beam may be refracted either through the aperture or refracted so as to not pass through the aperture, so as to be used as a shutter. This can be advantageous for construction of shutters with light in the blue or near-UV spectral region, in part because polarization based shutters suffer from poor contrast ratios. In other words, in conventional shutters that rotate the polarization of the light to be either blocked or not blocked by a polarizer, the off state is typically limited by the quality of the polarizer. For example, Gallium-Nitride (GaN) diode lasers, with wavelengths around 400 nm, have utility in optical data storage and other applications, yet high quality polarizers at these wavelengths are expensive, and therefore a polarization based shutter is also expensive. Using embodiments of the present invention, a shutter can be provided based on steering a GaN diode beam either through or not through an aperture, and can be both high contrast and inexpensive.

Furthermore, horn shaped electrodes 200, 202 can be utilized as receiving elements. A detector element, such as a photodiode, can be placed at the narrow end of the horn-shaped prism electrodes 200, 202 (left side of FIG. 18). Depending on the amount of applied voltage to either electrode 200, 202, the electrode pattern shown in FIG. 18 can selectively detect portions or regions of light that are entering the large end of the electrodes 200, 202 (the right side of FIG. 18). In other words, for a specific applied voltage to the electrodes 200, 202, only light that enters at a specific angle and region of the electrode pattern 200, 202 (on the right side of FIG. 18) will be directed to the detector (on the left side of FIG. 18), and therefore only that light will be detected. By changing the voltage applied to the electrodes 200, 202, different regions and angles can be selected. In this way, electrode patterns 200, 202 such as shown in FIG. 18, can not only serve as beam steerers, but also serve as voltage controllable scanners or imagers. Combinations of these electrode patterns 200, 202 or others can serve multiple optical crossconnect and switching functions.

Figure 19:
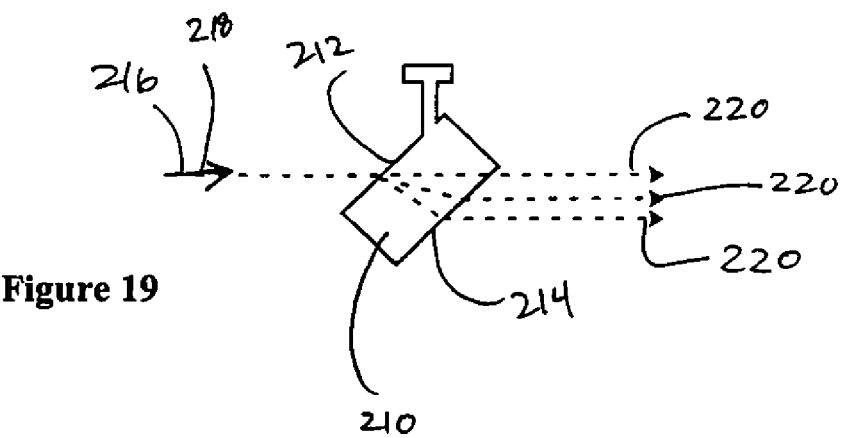
FIG. 19 illustrates another example of a patterned electrode for controlling light propagating through a waveguide, in accordance with an embodiment of the present invention.

FIG. 19 shows an example with an electrode 210 having a parallelogram shape wherein two parallel surfaces 212, 214 are both non-normal to the propagation direction 216 of the light input 218. In this embodiment, as the voltage applied to electrode 216 increases, the light beam output 220 passing through the waveguide can be moved to one side or another. As the voltage increases, the distance between the input beam 218 and the active output beam 220 grows, while as the voltage decreases, the distance between the input beam 218 and the active output beam 220 decreases.

Figure 20:
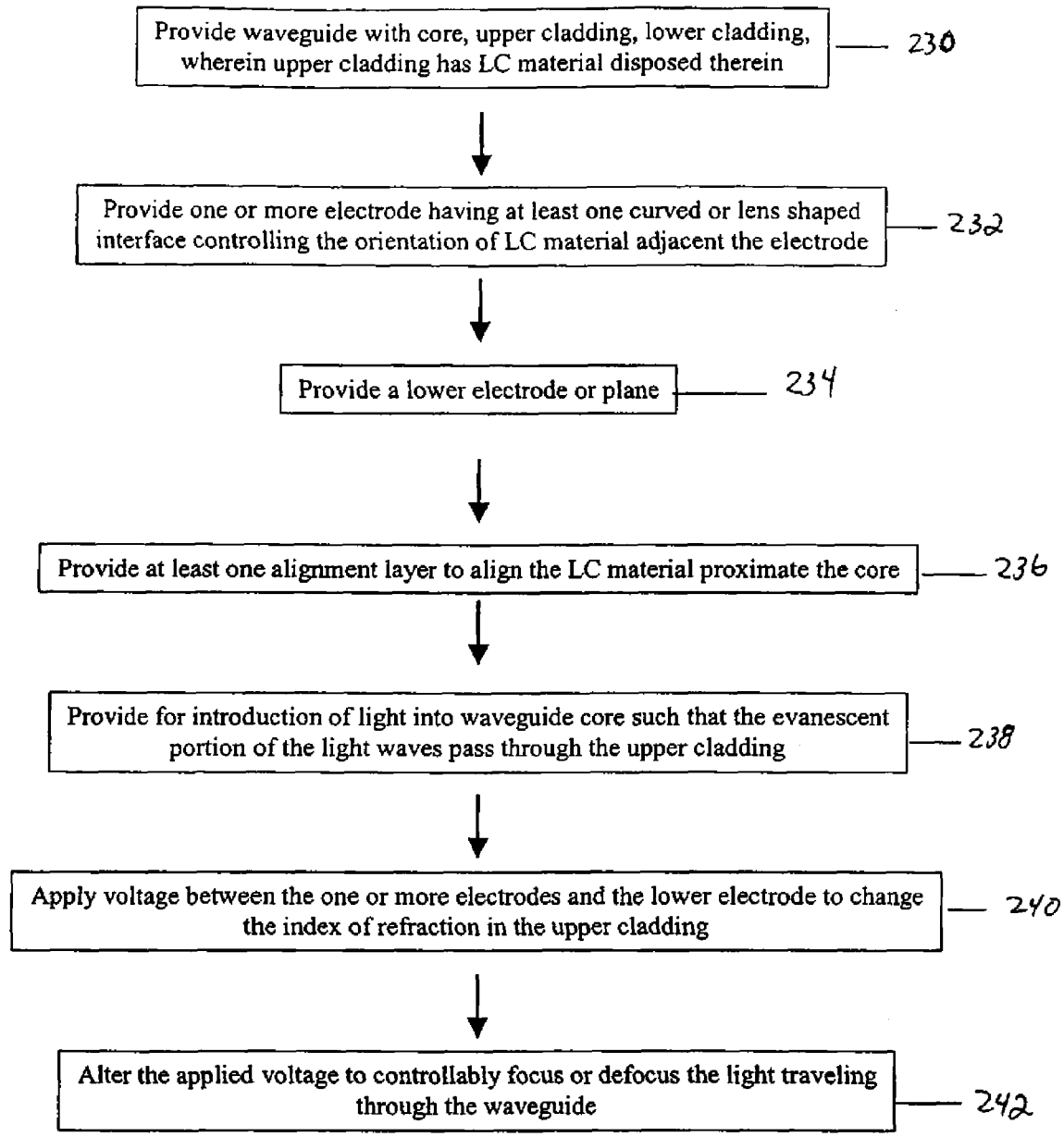
FIG. 20 illustrates an example of operations for forming a waveguide having one or more electrodes with curved or lens shaped interfaces for controlling the propagation of light through the waveguide, in accordance with one embodiment of the present invention.

In addition to electrode shapes that can be used for beam steering as described with reference to the examples above, electrode shapes may also be provided which focus light as it passes through the waveguide. FIG. 20 illustrates an example of operations for forming a waveguide having one or more electrodes with curved or lens shaped interfaces for controlling the propagation of light through the waveguide, in accordance with one embodiment of the present invention. FIGS. 21-28 illustrate some examples of electrodes having lens shapes that may be utilized in waveguides according to embodiments of the present invention.

In FIG. 20 at operation 230, a waveguide is provided with a core, upper cladding, and lower cladding, wherein liquid crystal material is disposed within one of the claddings. As described above, the liquid crystal material may be disposed within the upper or lower cladding, and for purposes of this example, the liquid crystal material will be described as being disposed within the upper cladding. At operation 232, one or more electrodes, also referred to herein as patterned electrodes, are provided having at least one curved or lens shaped interface or edge for controlling the orientation of the liquid crystal material adjacent (i.e., above or below) the electrode. The curved or lens shape of the one or more electrodes induces the liquid crystal material adjacent the electrode to form a lens shape wherein the index of refraction of the lens shape is controllable dependent upon the amount of voltage applied to the electrode. The electrodes can be made in various such lens or curved shapes, including conventional lens shapes, and some examples of such shapes are illustrated in FIGS. 21-28. At operation 234, a lower electrode or plane is provided within the waveguide so that an electric field can be formed between the one or more electrodes of operation 232 and the lower electrode or plane of operation 234 in order to control the orientation of the liquid crystal material therebetween. In one example, a conductive substrate layer is provided in the waveguide to act as the lower electrode or ground plane.

At operation 236, at least one alignment layer is provided to align the liquid crystal material proximate the core. In one example, an upper alignment layer and a lower alignment layer may be provided as shown in FIG. 2 so that the liquid crystal material adjacent the alignment layer is biased or oriented in a desired orientation when no voltage is applied between the upper patterned electrode and the lower electrode or conductive substrate; or other arrangements of alignment layers can be used. At operation 238, in one example, it is provided that light may be introduced into the waveguide core such that the evanescent portion of the light wave passes through the cladding, which contains the liquid crystal material (i.e., the upper cladding, in one example). In one embodiment, for instance, a prism coupler or endfire coupler or other conventional coupler may be used to introduce light into the waveguide.

At operation 240, a voltage applied between the one or more electrodes of operation 232 and the lower electrode, plane, or conductive substrate of operation 234, in order to change the index of refraction of the cladding, which contains the liquid crystal material. In operation 240, the liquid crystal material between the electrode having the curved or lens shaped interface and the lower electrode/conductive substrate is controllably reoriented depending upon the amount of voltage applied, and such application of voltage alters the index of refraction of such liquid crystal material relative to light propagating through the waveguide. As such, through the application of voltage between the patterned electrodes and the lower electrode/conductive substrate, one or more shapes can be formed within the liquid crystal material which in effect operate as lenses to focus or direct light under the control of the applied voltage. At operation 242, the applied voltage may be varied so as to controllably focus or defocus light as it travels through the waveguide and the evanescent portion of the light passes through the liquid crystal material experiencing the influence of the electric field of the applied voltage.

FIGS. 21-27 illustrate some examples of electrodes having lens shapes that may be utilized in waveguides according to embodiments of the present invention. It is understood that these figures are provided as examples only, and that the present invention contemplates any patterned electrode forming any type of lens shape used for focusing or defocusing light, including conventional lens shapes, or other shapes for instance as described with reference to FIGS. 1-19. For purposes of this description, it is assumed that as voltage is applied to the electrode, the index of refraction n2 of the liquid crystal material proximate the electrode is greater than the index of refraction n1 of the liquid crystal material outside of the electrode.

Figure 21:
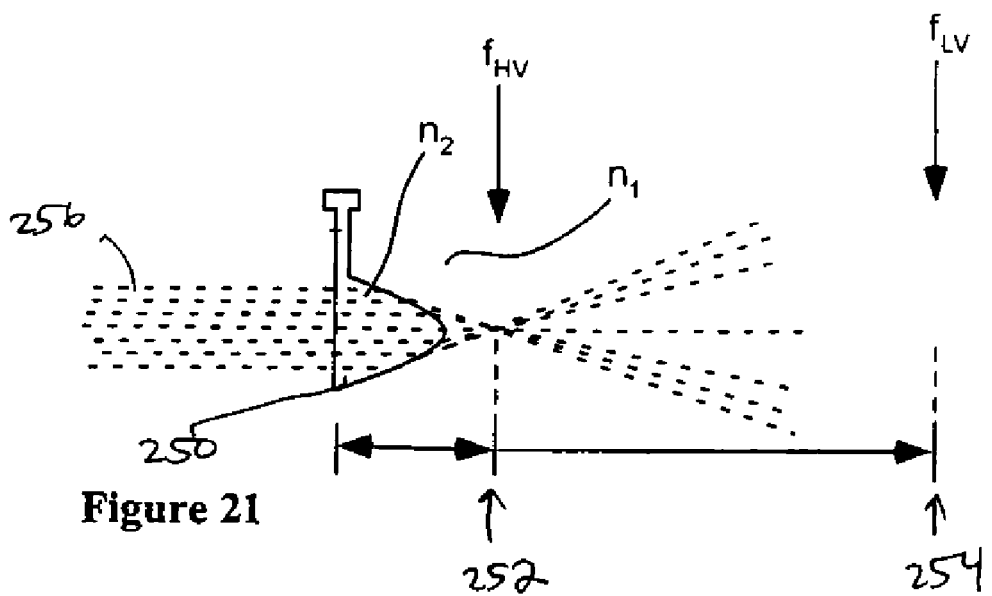
FIG. 21 illustrates an example of an electrode formed in the shape of a simple positive lens for controlling light propagating through a waveguide, in accordance with one embodiment of the present invention.

In FIG. 21, an electrode 250 is formed in the shape of a simple positive lens or plano-convex lens, wherein as the voltage applied to the electrode 250 increases, the index of refraction n2 increases relative to n1, and the focal length 252 is relatively short. As the voltage applied to the electrode 250 decreases, the index of refraction n2 approaches the index of refraction n1 and the focal point 254 moves outward towards infinity. As such, the electrode 250 of FIG. 21 can be used to selectively focus light 256 along different points (e.g., between 252 and 254) within a waveguide, and can be used for spectroscopic applications, lab on a chip, examining micro-fluidic channels, collimation, or the like.

Figure 22:
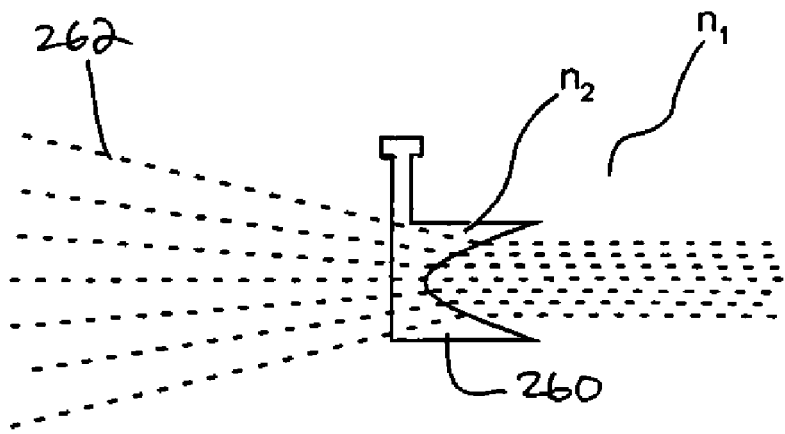
FIG. 22 illustrates an example of an electrode formed in the shape of a negative lens for controlling light propagating through a waveguide, in accordance with one embodiment of the present invention.

In FIG. 22, an electrode 260 is formed in the shape of a negative lens or plano-concave lens wherein as the voltage applied to the electrode 260 increases, the index of refraction N2 increases which defocuses the light 262. As the voltage applied to the electrode decreases, the index of refraction N2 approaches N1, and the light rays travel substantially along the same orientation as on the front side of the lens. As such, the electrode 260 of FIG. 22 can be used to selectively spread out or diffuse light, or to collimate a converging beam of light.

Conventionally, aspherical glass lenses are difficult to make due to grinding and polishing techniques involved with making conventional glass lenses. In contrast, aspherical curved surfaces are easily constructed using embodiments of the present invention. For example, embodiments of the present invention can use photolithography techniques to form or etch one or more aspherical lens shapes in the patterned electrode. In another example, elliptical or hyperbolic lens shapes can be made in the patterned electrode according to the present invention, without the negative affects of spherical aberrations.

Figure 23:
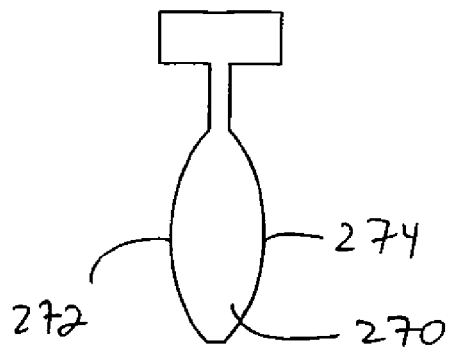
FIG. 23 illustrates an example of an electrode formed in the shape of a convex-convex lens for controlling light propagating through a waveguide, in accordance with one embodiment of the present invention.

FIG. 23 illustrates an example of an electrode 270 formed in the shape of a convex-convex lens for controlling light propagating through a waveguide, in accordance with one embodiment of the present invention. This type of lens shape may be used to focus a collimated beam of light or to collimate a divergent beam of light. Due to the curvature of both sides 272, 274, back reflections may be reduced. Furthermore, since both sides 272, 274 act as focusing elements, the curvature of each side 272, 274 may be reduced to achieve the same focal length as the lens of FIG. 21.

Figure 24:
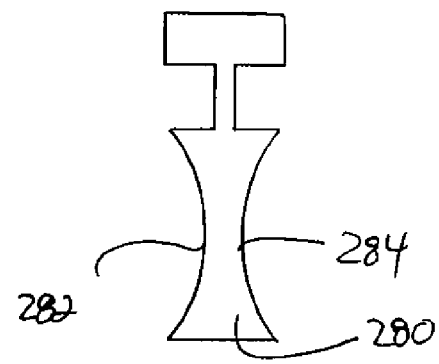
FIG. 24 illustrates an example of an electrode formed in the shape of a concave-concave lens for controlling light propagating through a waveguide, in accordance with one embodiment of the present invention.

FIG. 24 illustrates an example of an electrode 280 formed in the shape of a concave-concave lens for controlling light propagating through a waveguide, in accordance with one embodiment of the present invention. This type of lens shape may be used to focus a collimated beam of light or to collimate a divergent beam of light. Due to the curvature of both sides 282, 284, back reflections may be reduced. Furthermore, since both sides 282, 284 act as defocusing elements, the curvature of each side 282, 284 may be reduced to achieve the same negative focal length as the lens of FIG. 22.

Figure 25:
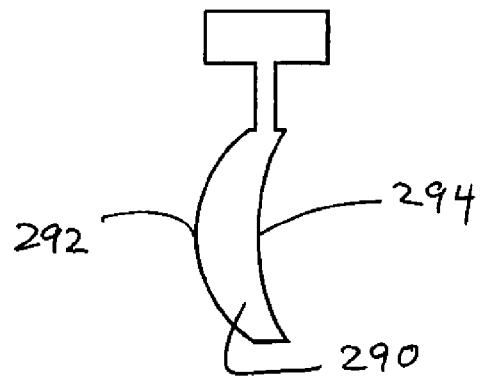
FIG. 25 illustrates an example of an electrode formed in the shape of a convex-concave lens for controlling light propagating through a waveguide, in accordance with one embodiment of the present invention.

FIG. 25 illustrates an example of an electrode 290 formed in the shape of a convex-concave lens for controlling light propagating through a waveguide, in accordance with one embodiment of the present invention. In this example, the radius of curvature of the front side 292 of the lens shape is greater than the radius of curvature of the back side 294. This can be useful, for instance, where it is desired to match the front side's 292 radius of curvature with a radius of curvature of a preceding lens shape in the waveguide, or to match the back side's 294 radius of curvature with a radius of curvature of a subsequent lens shape in the waveguide. As another example (not shown), Fresnel type lens patterns may be used. Fresnel type lenses can be useful to limit the thickness of the lens, and such patterns can be made and applied in the present invention.

Figure 26:
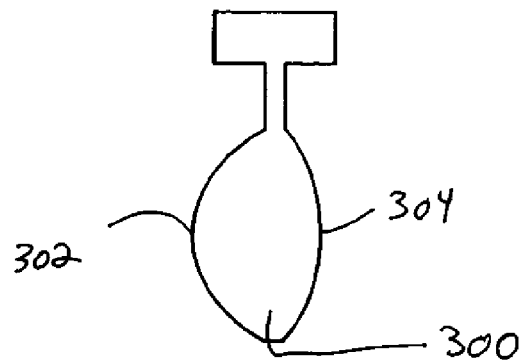
FIG. 26 illustrates an example of an electrode formed in the shape of a concave-concave asphere lens for controlling light propagating through a waveguide, in accordance with one embodiment of the present invention.

FIG. 26 illustrates an example of an electrode 300 formed in the shape of a concave-concave asphere lens for controlling light propagating through a waveguide, in accordance with one embodiment of the present invention. In this example, the radius of curvature of the front side 302 of the lens shape is smaller and oppositely orientated than the radius of curvature of the back side 304. This can be useful, for instance, where it is desired to match the front side's 302 radius of curvature with a radius of curvature of a preceding lens shape in the waveguide, or to match the back side's 304 radius of curvature with a radius of curvature of a subsequent lens shape in the waveguide. Furthermore, aspherical shapes can be utilized to reduce aberrations.

In another example, two of more lens shaped electrodes may be placed in series or cascaded or otherwise arranged to achieve various light beam manipulations, such as beam expansion, beam compression, telescoping. Since the focusing and defocusing of light through the waveguide can be controlled electronically through the application of voltage to the electrodes (without any mechanically moving parts), embodiments of the present invention can be used to replace mechanical focusing devices. For instance, a zoom function can be implemented by combining a focusing and defocusing lens in series (i.e., combining the electrode shapes of FIG. 21 with FIG. 22; or combining the electrode shapes of FIG. 23 with FIG. 24). Further, one or more lens shaped electrodes may be placed in series or cascaded or otherwise arranged with one or more electrodes having wedge/prism shapes or other non-normal interfaces such as those shown in FIGS. 1-2 and 15-19.

Figure 27:
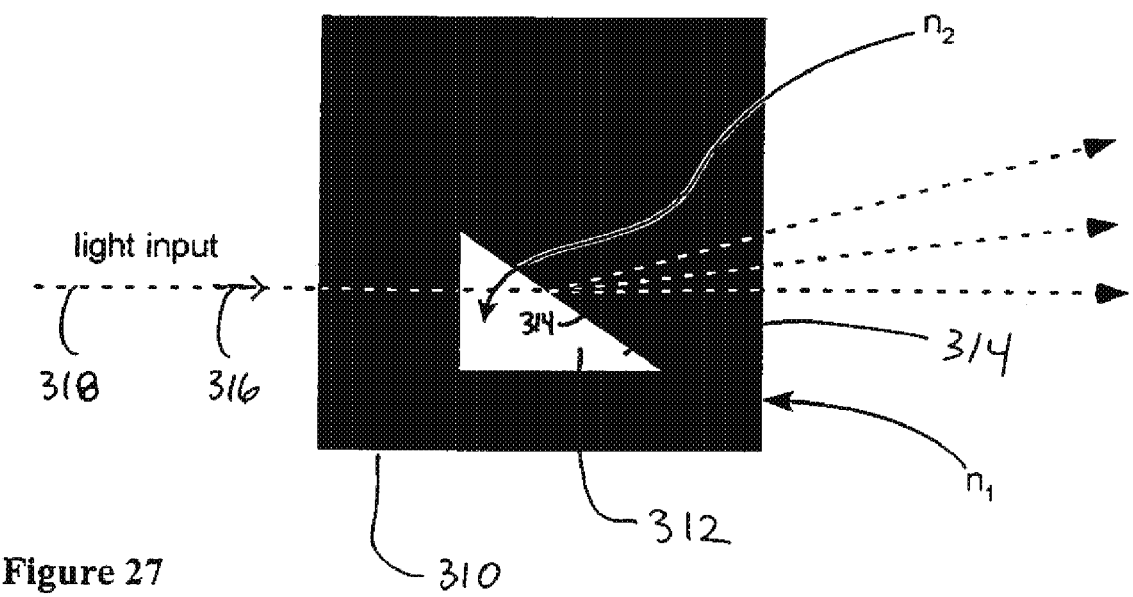
FIG. 27 illustrates another example of an electrode for controlling light propagating through the waveguide, in accordance with one embodiment of the present invention.

FIG. 27 illustrates another example of an electrode 310 for controlling the propagation of light through the waveguide, in accordance with one embodiment of the present invention. In this embodiment, the electrode 310 includes an opening or hole region 312 that defines at least one non-normal interface or curved or lens shaped edge 314 relative to the direction 316 of propagation of light 318 traveling through the waveguide. While in this example the opening 312 defines a single wedge/prism shape, it is understood that other shapes could be used as well, such as shapes having non-normal interfaces or curves or lens shapes, for instance, as shown in FIGS. 15-19 or 21-26, and that the electrode may include multiple openings in series or cascaded. In this case, when no voltage is applied to electrode 310, the index of refraction n2 of the region adjacent the opening 312 is approximately equal to the index of refraction of the region adjacent the electrode; and as voltage is applied to the electrode 310, the index of refraction n1 of the region adjacent or proximate the electrode 310 changes.

Figure 28:
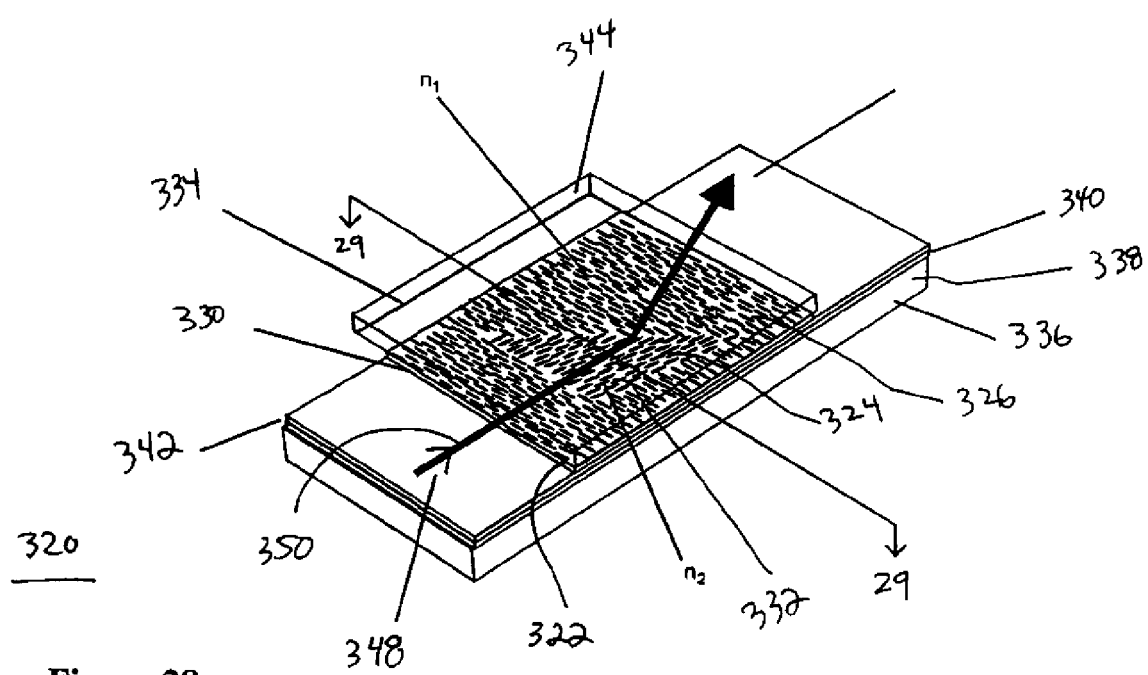
FIG. 28 illustrates an alternative embodiment wherein the waveguide utilizes an alignment layer having two or more areas or regions having different orientations that align the liquid crystal material in the adjacent cladding so as to form refractive shapes within the liquid crystal material in the cladding for controlling light propagating through a waveguide, in accordance with one embodiment of the present invention.

FIG. 28 illustrates an alternative embodiment wherein a waveguide 320 utilizes an alignment layer 322 having two or more areas or regions 324, 326 having different orientations that align the liquid crystal material 328 in the adjacent cladding 330 so as to form refractive shapes 332 within the liquid crystal material 328 for controlling light propagating through a waveguide 320, in accordance with one embodiment of the present invention. In one example and referring to FIGS. 28-30, the waveguide 320 can be constructed in a manner similar to the embodiments described above except that in place of one or more patterned electrodes, the embodiments of FIGS. 28-30 have an alignment layer 322 with regions 324, 326 of patterned alignments and a pair of electrode layers 334, 336 or planes. Hence, the waveguide 320 of the example of FIG. 28-30 may include a substrate 338 acting as a lower electrode plane 336, a lower cladding 340, a core layer 342, an alignment layer 322 having the one or more regions 324, 326 defining various shapes, an upper cladding 330 with liquid crystal material 328 therein, an upper electrode plane 334, and a glass cover 344. The substrate 338, lower cladding 340, core 342, upper cladding 330 with liquid crystal material 328 therein, and the glass cover 344 can all be made as described above with reference to FIGS. 1-14. The upper electrode 334 can be implemented as a conductive coating or conductive layer as described above with reference to FIGS. 1-14.

On the alignment layer 322, the one or more areas or regions 324, 326 can define various shapes 332 in order to induce the liquid crystal material 328 in the adjacent upper cladding 330 to form various shapes when no voltage 346 is applied, such as shapes 332 having non-normal interfaces (such as one or more of the shapes shown in FIGS. 1-2 and 15-19 or shapes having curves or lens shapes such as one or more of the shapes shown in FIGS. 21-26).

In the example of FIG. 28, the alignment layer 322 of the waveguide includes a first region 324 and a second region 326. In this example, the second region 326 aligns the liquid crystal materials 328 in the upper cladding with their long axis perpendicularly orientated relative to the propagation direction 348 of light 350 traveling through the waveguide 320; and the first region 324 defines a wedge or prism shape 332, wherein within the first region 324, the liquid crystal materials 328 in the upper cladding 330 are aligned with their long axis orientated in parallel relative to the propagation direction 348 of light 350 traveling through the waveguide 320 (see FIGS. 29, 31).

Figure 29:
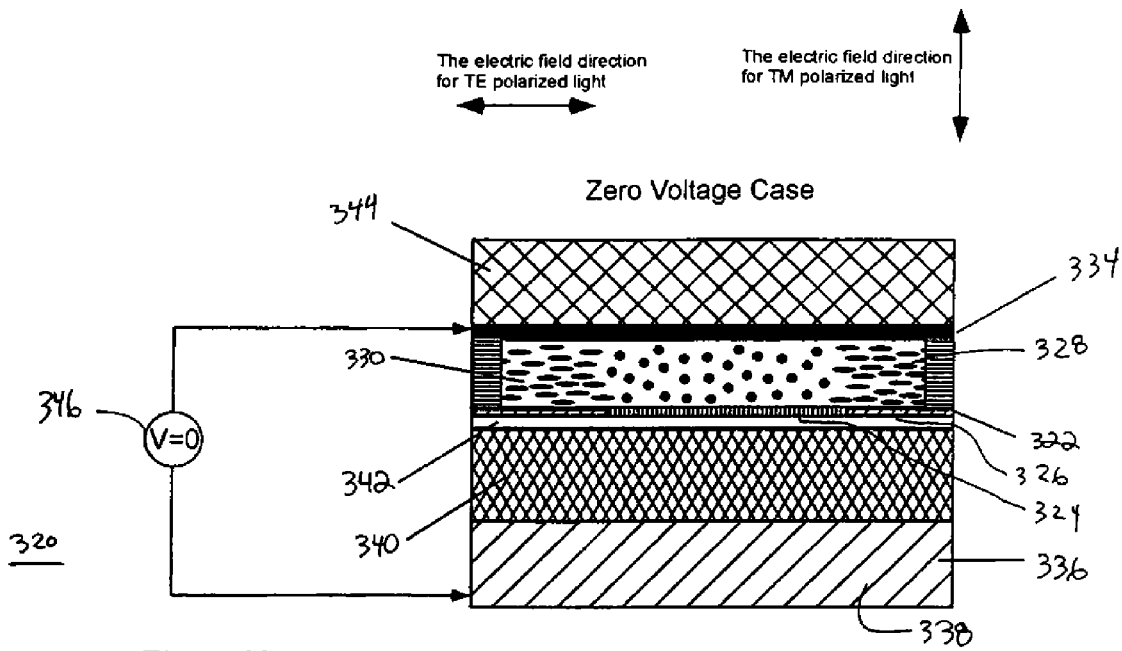
FIG. 29 illustrates a sectional view of the waveguide of FIG. 28 taken along section lines 29-29 with no voltage applied, in accordance with one embodiment of the present invention.
Figure 30:
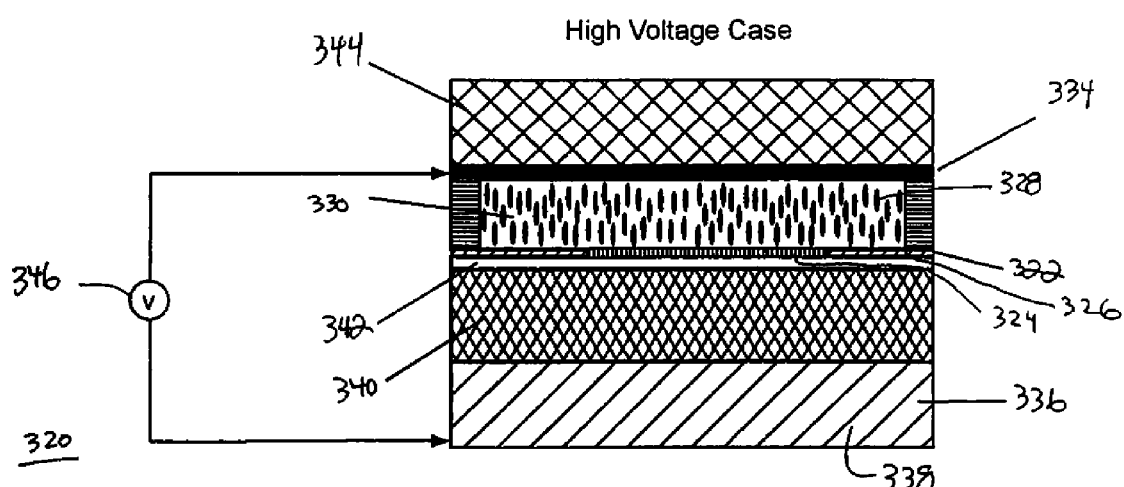
FIG. 30 illustrates a sectional view of the waveguide of FIG. 28 taken along section lines 29-29 with a voltage applied, in accordance with one embodiment of the present invention.
Figure 31:
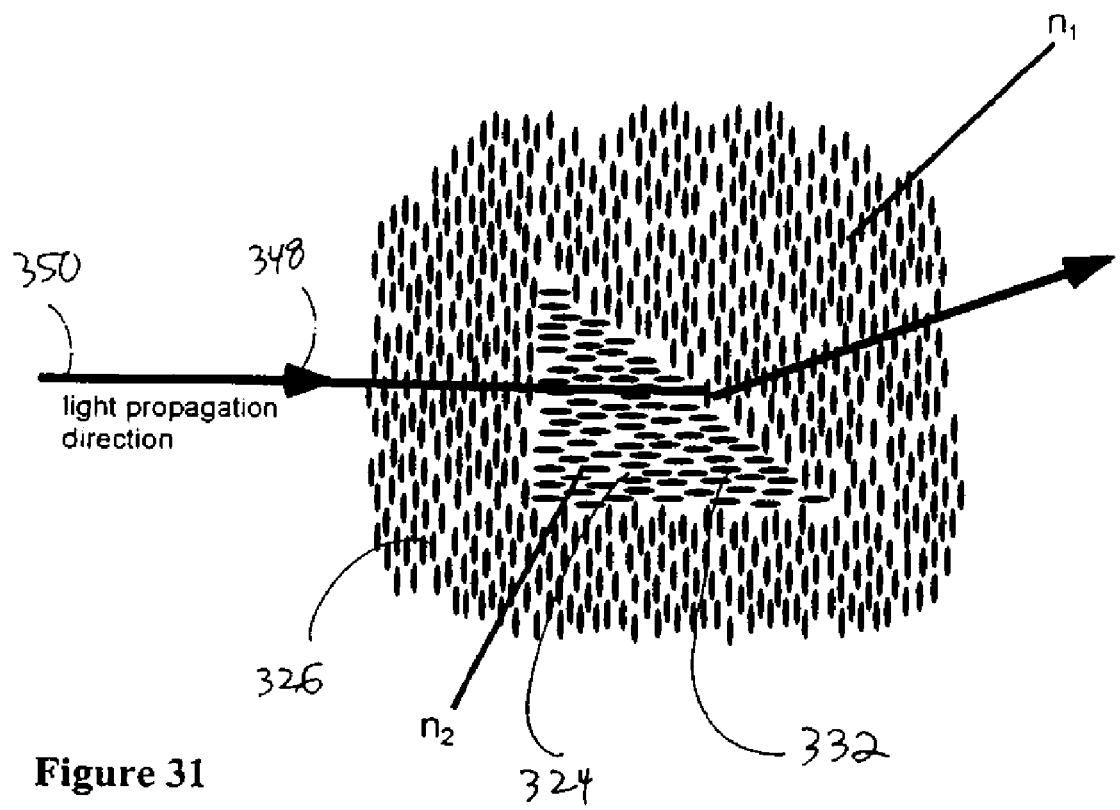
FIG. 31 illustrates a top view of the liquid crystals within the upper cladding of the waveguide of FIG. 28 when no voltage is applied, in accordance with one embodiment of the present invention.
Figure 32:
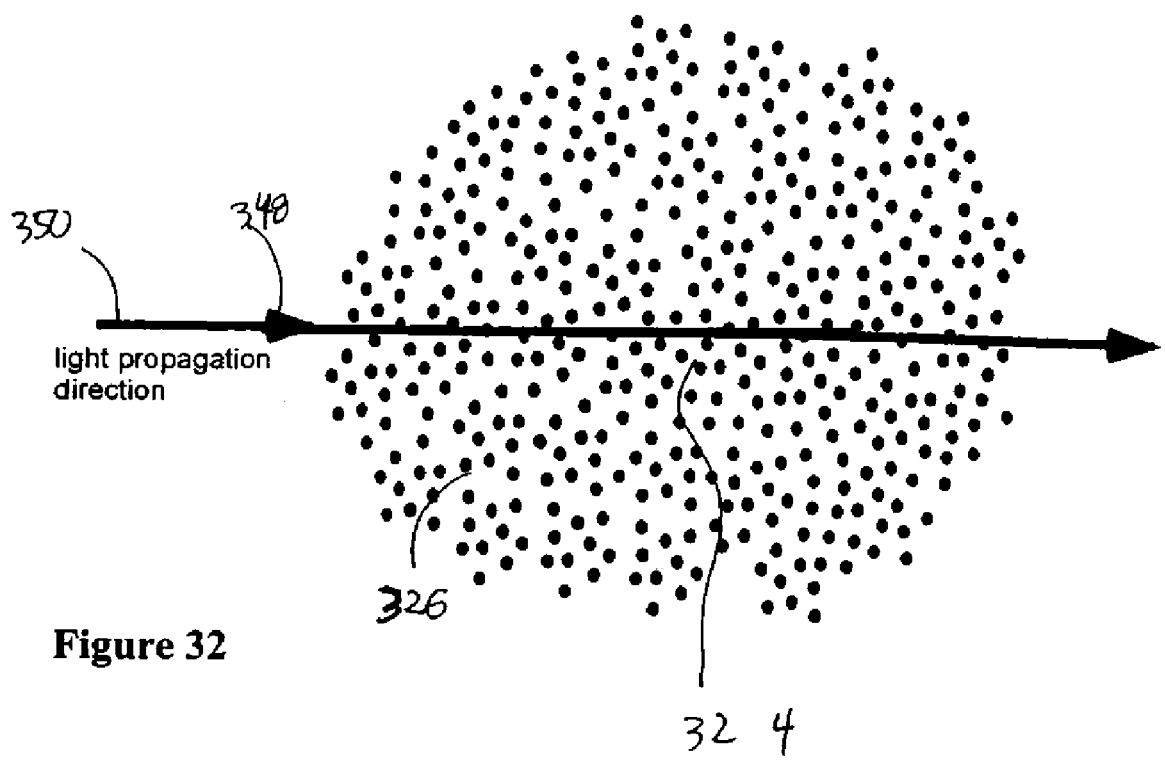
FIG. 32 is a top view of the liquid crystal material within the upper cladding of the waveguide of FIG. 28 when a high voltage is applied so as to re-orient the liquid crystal material therein, in accordance with one embodiment of the present invention.

In operation, when no voltage 346 is applied between the upper electrode 334 and the lower electrode/substrate 336, the index of refraction n1 of the second region 326 is greater than the index of refraction n2 of the first region 324 for TE polarized light traveling through the waveguide 320 (see FIGS. 29, 31). As a voltage 346 is applied between the upper electrode 334 and the lower electrode/substrate 336, the electric field of the applied voltage 346 induces the liquid crystals 320 within the upper cladding 330 to orient vertically (see FIGS. 30, 32), and therefore for TE polarized light traveling through the waveguide 320, the index of refraction n1 of the second region 326 is approximately equal to the index of refraction n2 of the first region 324, and no refraction or light bending occurs.

As with the other embodiments disclosed herein that use patterned electrodes to induce portions of the liquid crystal materials to form various refractive or lens shapes, the embodiments of FIGS. 28-32 can be made using different arrangements, liquid crystal alignments, or orders of layers as desired.

Figure 33:
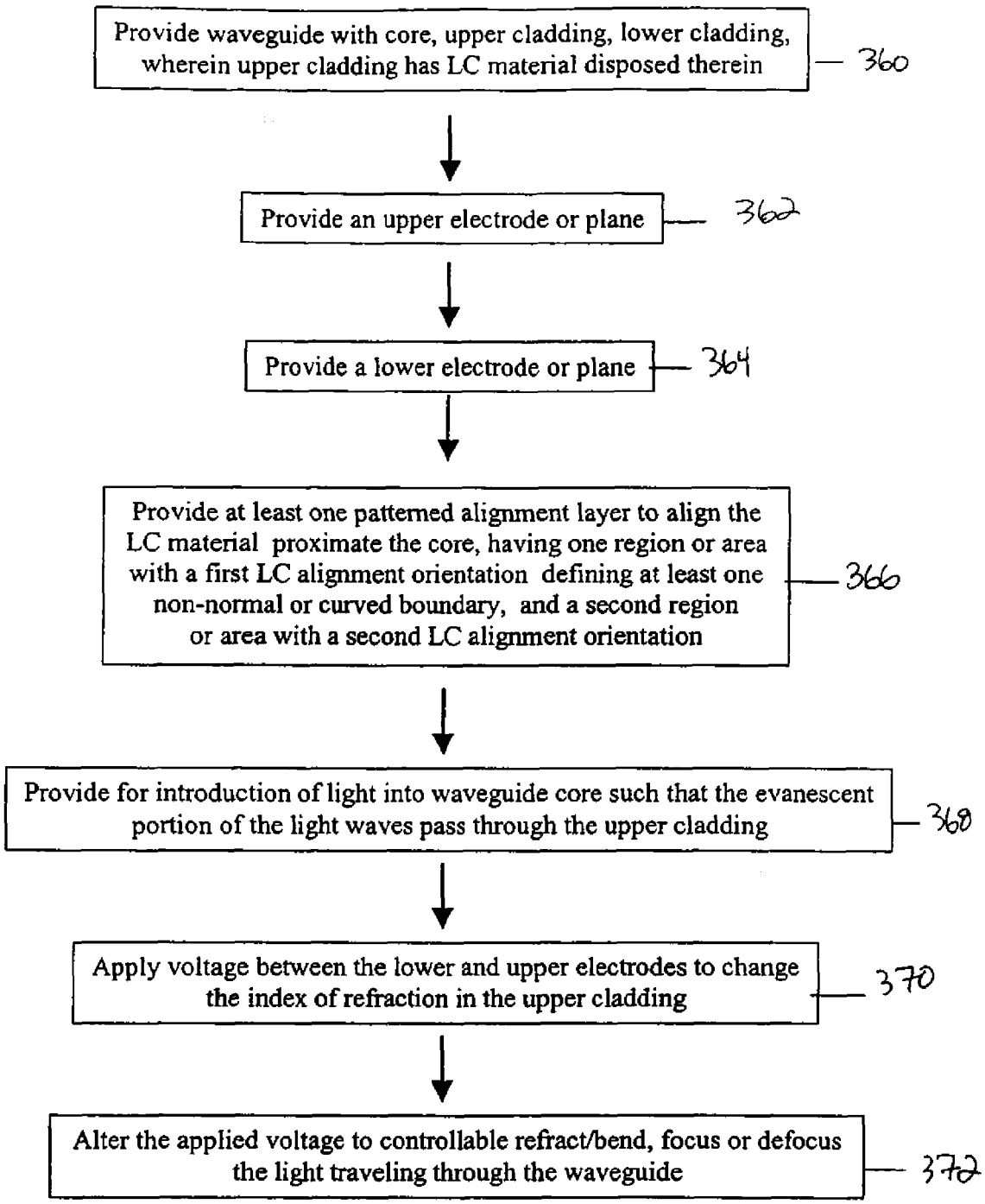
FIG. 33 illustrates an example of operations for forming a waveguide having two or more areas or regions having different orientations that align the liquid crystal material in the adjacent cladding so as to form refractive shapes within the liquid crystal material for controlling light propagating through a waveguide, in accordance with one embodiment of the present invention.

FIG. 33 illustrates an example of operations for forming a waveguide having an alignment layer with two or more areas or regions having different orientations that induce or align the liquid crystal material in the adjacent cladding to form refractive shapes within the liquid crystal material for controlling light propagating through a waveguide, in accordance with one embodiment of the present invention. The shapes of the regions can include shapes with non-normal interfaces, or curved or lens shaped interfaces.

In FIG. 33 at operation 360, a waveguide is provided with a core, upper cladding, and lower cladding, wherein liquid crystal material is disposed within one of the claddings. As described above, the liquid crystal material may be disposed within the upper or lower cladding, and for purposes of this example, the liquid crystal material will be described as being disposed within the upper cladding. At operation 362, an upper electrode or plane is provided, and at operation 364, a lower electrode or plane is provided within the waveguide. In one example, the upper electrode is formed as a conductive coating on the glass cover or as a layer of conductive material. In one example, a conductive substrate layer or other conductive layer is provided in the waveguide to act as the lower electrode or ground plane.

At operation 366, at least one alignment layer is provided to align the liquid crystal material in the upper cladding proximate the core. In one example, the alignment layer has two or more regions with differing alignments so that the liquid crystal material adjacent the alignment layer is biased or oriented in a desired orientation when no voltage is applied between the upper electrode and the lower electrode. The shapes of the regions can include, for instance, shapes with non-normal interfaces, refractive shapes, prisms, wedges, curved or lens shapes such as those described above.

As with the above described embodiments, the non-normal interfaces, refractive shapes, curved or lens shapes of regions of the alignment layer induce the liquid crystal material in the adjacent cladding to form a corresponding shape wherein the index of refraction of the formed shape is controllably dependent upon the amount of voltage applied to the electrodes.

As to operation 366, one example of how a region or area of the alignment layer can be patterned or made is by utilizing regions of photo-aligned polyimide, such as by companies such as Elsicon Inc., or other photo-aligned polymers or other general photoalignable materials. Liquid crystal molecules in the adjacent cladding will generally align according to the orientation of these regions of polymer.

Specifically, the polymer may be spin-coated directly onto the surface of the waveguide core, and such application may occur in the same manner as how normal polymer would be applied to the core. Polarized ultraviolet light may be applied to selected regions of the polymer to create alignments within such regions. The direction of polarization of the ultraviolet light determines the director, or liquid crystal orientation or direction, i.e., the alignment.

In order to create regions of patterned alignment, a first mask can be created which would be placed directly above the polymer to cover the polymer during exposure to ultraviolet light. Patterns of opaque regions on the mask would cast shadows onto the polymer, and therefore these dark regions would not be aligned. The ultraviolet light source would then be turned off and the mask removed.

A second mask that is a negative or inverse of the first mask could then be placed directly above the polymer to cover the polymer during a second exposure to ultraviolet light. For the second exposure, the direction of polarization of the ultraviolet light, with respect to the waveguide, is then rotated ninety degrees. When the ultraviolet light is turned on during the second exposure, the regions that were previously not exposed (and therefore not aligned) are now aligned. Since the direction of polarization of the ultraviolet light (with respect to the waveguide) has been rotated ninety degrees, the alignment in these regions will be rotated ninety degrees with respect to the alignment outside of these regions. Using this method, various regions on the alignment layer can be formed having different alignments so that the polymer induces the liquid crystal material in the adjacent cladding to align according to the polymer patterns of the alignment layer.

Alternatively, in another example, a polymer can be applied and uniformly buffed. A photoresist can then be applied and exposed in the desired pattern. The photoresist is then removed in the area of the pattern and the polyimide is buffed in a different or orthogonal direction. The remaining photoresist is then removed.

Another example of operation 366 to form a patterned or aligned region or area is via etching microgrooves directly into the top of the waveguide core. The width and distance between adjacent microgrooves is chosen to be sufficiently small so that it does not effect the propagation of the light in the core. Liquid crystal molecules in the adjacent cladding will generally align according to the orientation of these microgrooves.

To create microgrooves, in one example photo-resist may be applied to the core and then cured using an interference pattern between two short-wavelength beams. This creates a pattern of closely spaced lines of photo-resist on the core. Standard etching techniques are then used to remove a small amount of the core in the regions that are not covered by the lines of photo-resist. The photo-resist is removed, and a microgrooved pattern is left on the core.

Two or more regions of microgrooves can be formed on the alignment layer (or on the surface of the core), wherein each region has a set of aligned microgrooves, and the alignment of a first region differs from the alignment of a second region. This can be done by masking techniques. Specifically, a patterned mask can be inserted prior to exposing the photo-resist to the short wavelength interference pattern. The photoresist will not be cured in the regions that are shadowed by the mask. The short wavelength light is turned off and the mask is removed. A negative of the first mask is then inserted. The interference pattern created by the short wavelength light is then rotated ninety degrees with respect to the waveguide. The short wavelength light is then turned on, and the exposed regions of the photo-resist are cured in closely spaced lines, but these lines are now rotated ninety degrees with respect to the previously cured lines. The waveguide is then etched using standard techniques. The net result is two regions, both with microgrooves, but the directions of the microgrooves in one region is rotated ninety degrees with respect to the direction of the microgrooves in the other region. Using this technique, various regions on the alignment layer can be formed having different alignments so that the microgrooves induce the liquid crystal material in the adjacent cladding to align according to the regions of microgroove patterns of the alignment layer.

As another example, nano-imprint lithography techniques can be used to create regions of patterned alignment. In this technique, a pattern, such as the microgroove pattern described above, can be used to imprint the pattern onto a softer substrate.

At operation 368, in one example, it is provided that light may be introduced into the waveguide core such that the evanescent portion of the light wave passes through the cladding, which contains the liquid crystal material (e.g., the upper cladding, in one example). In one embodiment, for instance, a prism coupler or butt-coupling or end-fire coupling technique or other conventional method or device may be used to introduce light into the waveguide.

At operation 370, a voltage is applied between the upper and lower electrodes of operations 362-364 in order to change the index of refraction of the upper cladding, which in this example contains the liquid crystal material. As voltage is applied between the upper and lower electrodes, an electric field is formed between the upper and lower electrodes in order to control the orientation of the liquid crystal material therebetween.

In operation 370, the liquid crystal material between the upper electrode and the lower electrode is controllably reoriented depending upon the amount of voltage applied, and such application of voltage alters the index of refraction of such liquid crystal material relative to light propagating through the waveguide. As such, through the application of voltage between the upper and lower electrodes, one or more shapes can be formed within the liquid crystal material which in effect operate as prisms, refractive elements, or lenses to bend, focus, defocus, or direct light under the control of the applied voltage. At operation 372, the applied voltage may be varied so as to controllably refract/bend, focus or defocus light as it travels through the waveguide and the evanescent portion of the light passes through the liquid crystal material experiencing the influence of the electric field of the applied voltage.

Figure 34:
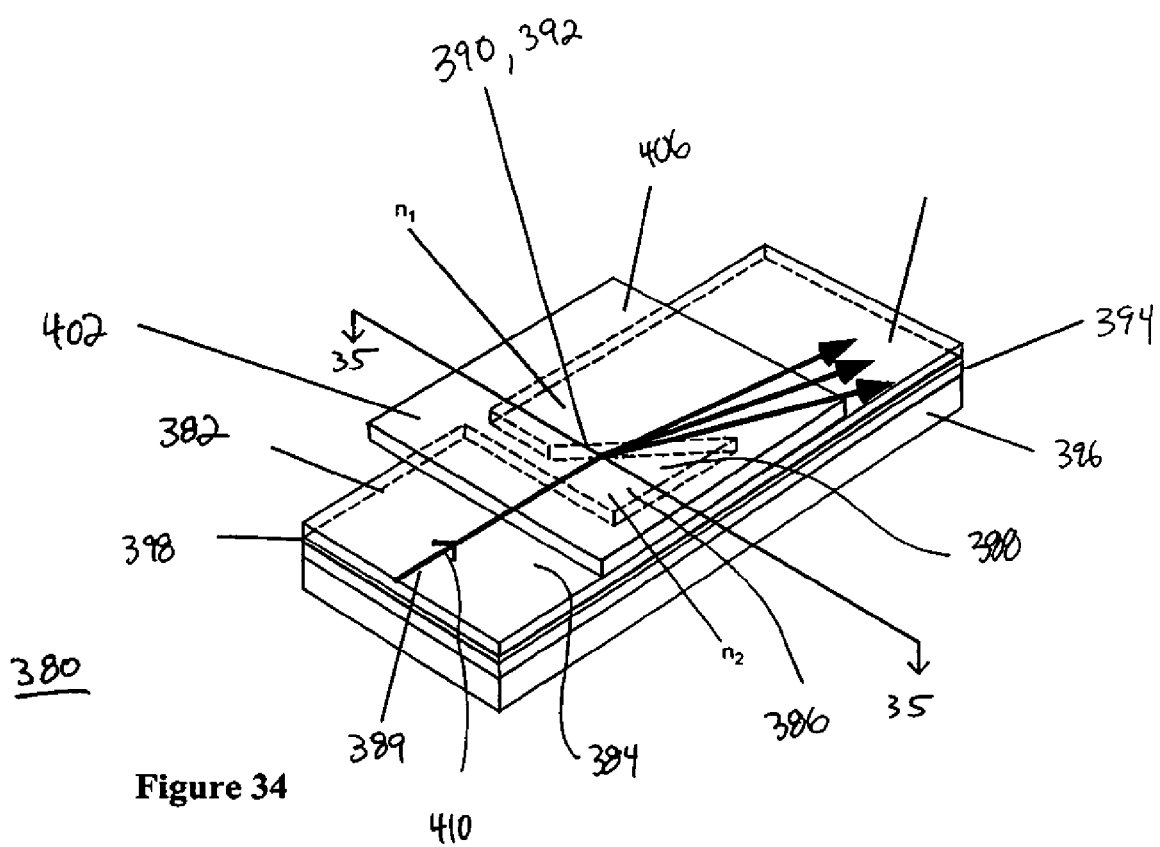
FIG. 34 illustrates an alternative embodiment wherein the waveguide utilizes an upper cladding layer having a first region and a second region, the second region including a cavity having liquid crystal material therein, the cavity defining one or more refractive shapes for controlling light propagating through a waveguide, in accordance with one embodiment of the present invention.

FIG. 34 illustrates an alternative embodiment wherein a waveguide 380 utilizes a cladding 382 that includes at least two regions 384, 386: a region 384 without liquid crystal material 388 and a region 386 with liquid crystal material 388. In one example, the first region 384 may include a non-liquid crystal material, such as but not limited to any of the materials that can be used to create the lower cladding as discussed previously with respect to FIGS. 1-14. In one example, this first region 384 is generally not electro-optic, i.e., the index of refraction does not change with respect to an applied electric field. The second region 386 may comprise areas or refractive shapes or cavities 390 where the non-liquid crystal material of the first region is not present or is reduced in thickness so as to create cavities or chambers 390 into which liquid crystal material 388 is placed and the evanescent wave of the guided light 389 will penetrate. In this manner, dynamically voltage tunable refractive shapes 392 are constructed by controlling the shape or area 390 in which the liquid crystal 388 may interact with the guided light 389 via the evanescent wave. Of course, the cladding 382 with the cavity 390 with liquid crystal material 388 therein could be the upper cladding 382 or the lower cladding 394, depending on the implementation.

Figure 35:
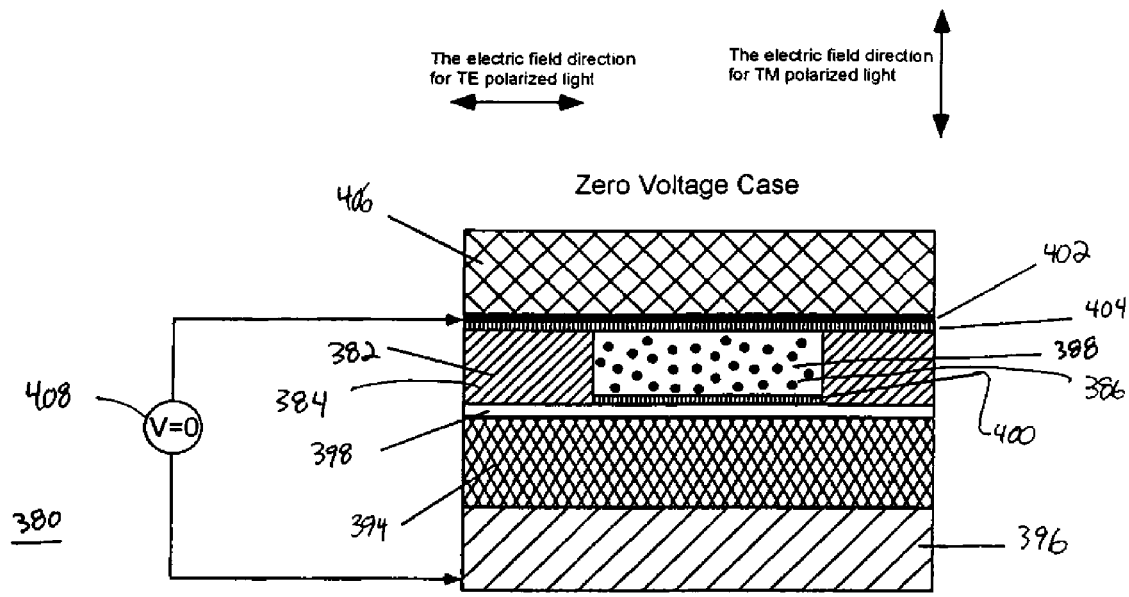
FIG. 35 illustrates a sectional view of the waveguide of FIG. 34 taken along section lines 35-35 with no voltage applied, in accordance with one embodiment of the present invention.
Figure 36:
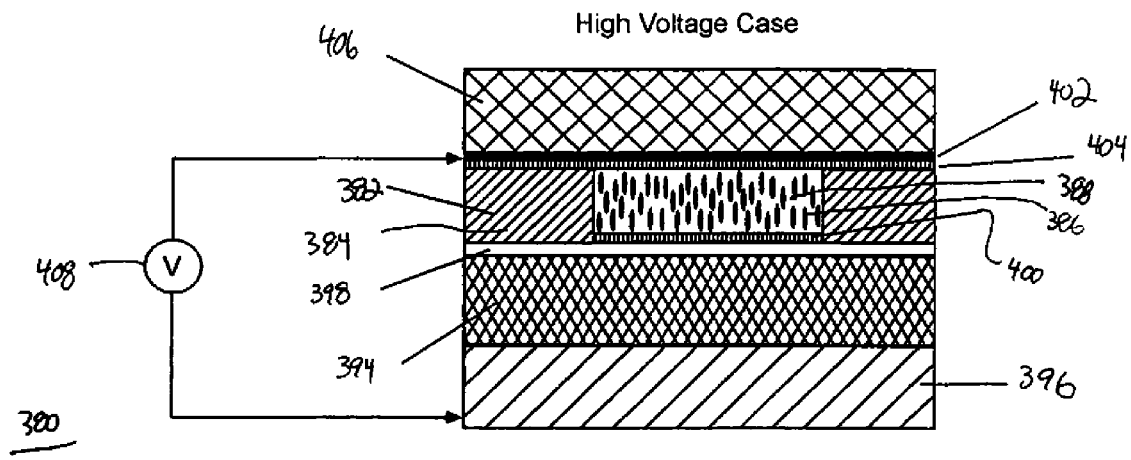
FIG. 36 illustrates a sectional view of the waveguide of FIG. 34 taken along section lines 35-35 with a voltage applied, in accordance with one embodiment of the present invention.

In one example and referring to FIGS. 34-36, a waveguide 380 can be constructed in a manner similar to the embodiments described above except that in place of one or more patterned electrodes, the embodiments of FIGS. 34-36 have an upper cladding 382 in which only regions or areas 386 contain liquid crystal material. Hence, the waveguide 380 of the example of FIG. 34-36 may include a substrate 396 acting as a lower electrode plane, a lower cladding 394, a core layer 398, an alignment layer 400, an upper cladding 382 with a region or area 386 with liquid crystal material 388 therein and a region 384 with non-liquid crystal material therein, and an upper electrode plane 402. A second alignment layer 404 may be provided between the upper electrode 402 and the upper cladding 382, if desired. A glass cover 406 may also be used if desired. The substrate 396, lower cladding 394, core 398, upper cladding region 386 with liquid crystal material 388 therein, and the glass cover 406 can all be made as described above with reference to FIGS. 1-14. The upper electrode or plane 402 can be implemented as a conductive coating or conductive layer as described above with reference to FIGS. 1-14.

On the upper cladding 382, the one or more areas or regions 386 in which liquid crystal material 388 interacts with the guided light 389 can define various shapes 392, such as refractive shapes having non-normal interfaces (such as one or more of the shapes shown in FIGS. 1-2 and 15-19 or shapes having curves or lens shapes such as one or more of the shapes shown in FIGS. 21-26).

In the example of FIG. 34, the second region 386 may comprise a wedge shape where the non-electro optic material of the upper cladding 382 is absent and the core layer 398 is therefore exposed. In this second area 386, an alignment layer 400 and liquid crystal material 388 are disposed therein and may operate in a fashion analogous to that previously discussed in reference to FIGS. 1-15. In this particular example, the long axes of the liquid crystal molecules 388 in the second region 386 are aligned so that at low or zero voltage 408 their alignment direction is predominantly parallel to the direction 410 of light 389 propagating through the waveguide 380 (see FIG. 35), although other orientations are possible.

Figure 37:
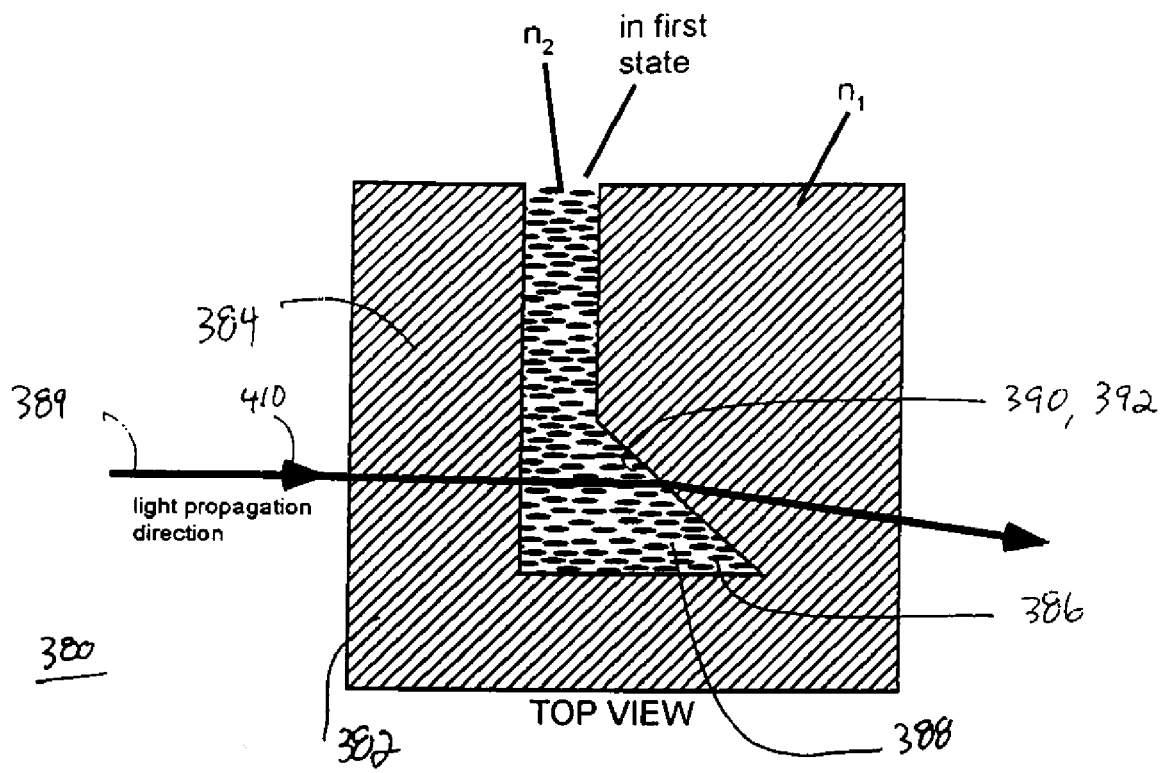
FIG. 37 illustrates a top section view of the upper waveguide cladding of the waveguide of FIG. 34, which contains a first region without liquid crystals and a second region with liquid crystals, when no voltage is applied, in accordance with one embodiment of the present invention.
Figure 38:
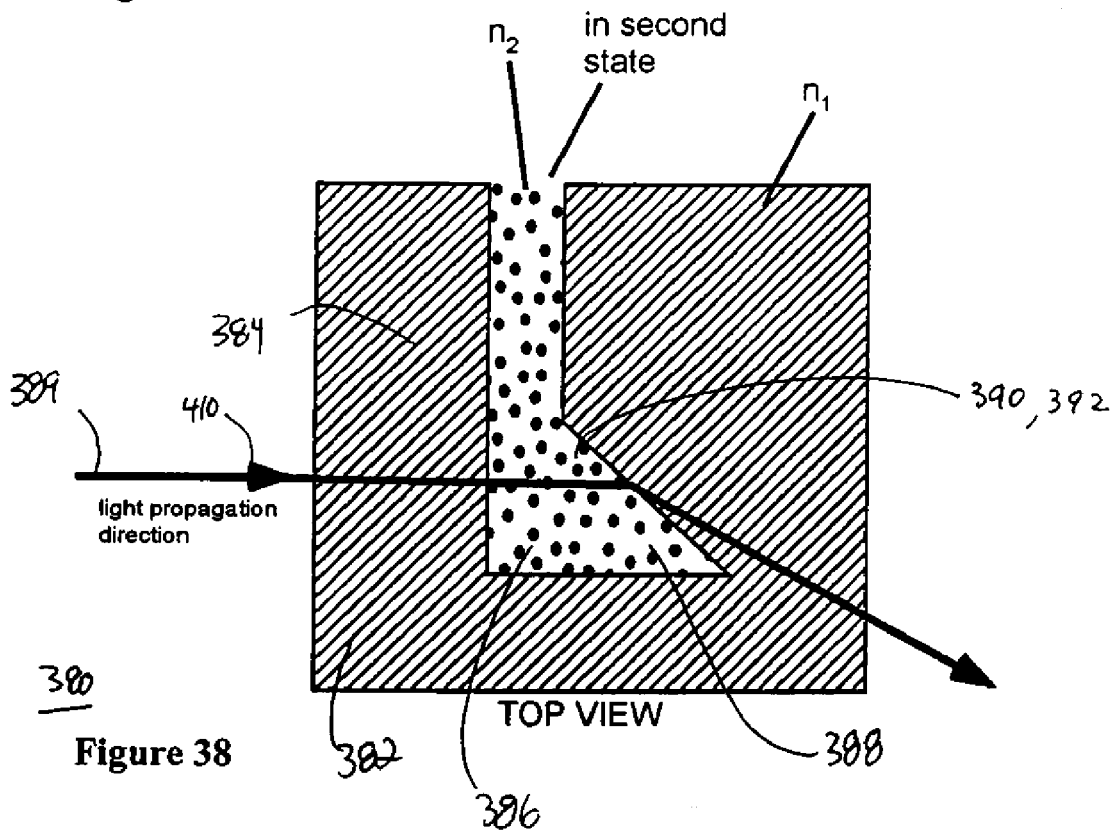
FIG. 38 illustrates a top section view of the upper waveguide cladding of the waveguide of FIG. 34, which contains a first region without liquid crystals and a second region with liquid crystals, when a high voltage is applied, in accordance with one embodiment of the present invention.

In operation and referring to FIGS. 34-38, when no voltage 408 is applied between the upper electrode 402 and the lower electrode/substrate 396, the index of refraction n1 of the first region 384 is different than the index of refraction n2 of the second region 386 for TM polarized light traveling through the waveguide (see FIGS. 35, 37). As a voltage 408 is applied between the upper electrode 402 and the lower electrode/substrate 396, the electric field of the applied voltage 408 induces the liquid crystals 388 within the second region 386 of the upper cladding 382 to orient vertically (see FIGS. 36, 38), and therefore for TM polarized light traveling through the waveguide 380, the difference between the index of refraction n1 of the first region 384 and the index of refraction n2 of the second region 386 is changed. Depending on the index of refraction of the first region 384 (which in this example is constant and not voltage tunable, but can be chosen from a range of values), the degree or amount of refraction of the waveguide 380 will change. In other words, since the difference between n1 and n2 can be voltage tuned, the degree of refraction can also therefore be voltage tuned. However, unlike the embodiments using shaped electrodes, the refraction at zero voltage will not generally be zero, unless the fixed index of region 384 is deliberately chosen to equal the index of the liquid crystal 388 at zero volts.

As with the other embodiments disclosed herein that use patterned electrodes to induce portions of the liquid crystal materials to form various refractive or lens shapes, the embodiments of FIGS. 34-38 can be made using different arrangements of layers, different liquid crystal alignments, or different orders of layers as desired. Depending on the implementation, refraction of TE or TM polarized light (or both) can be achieved.

Figure 39:
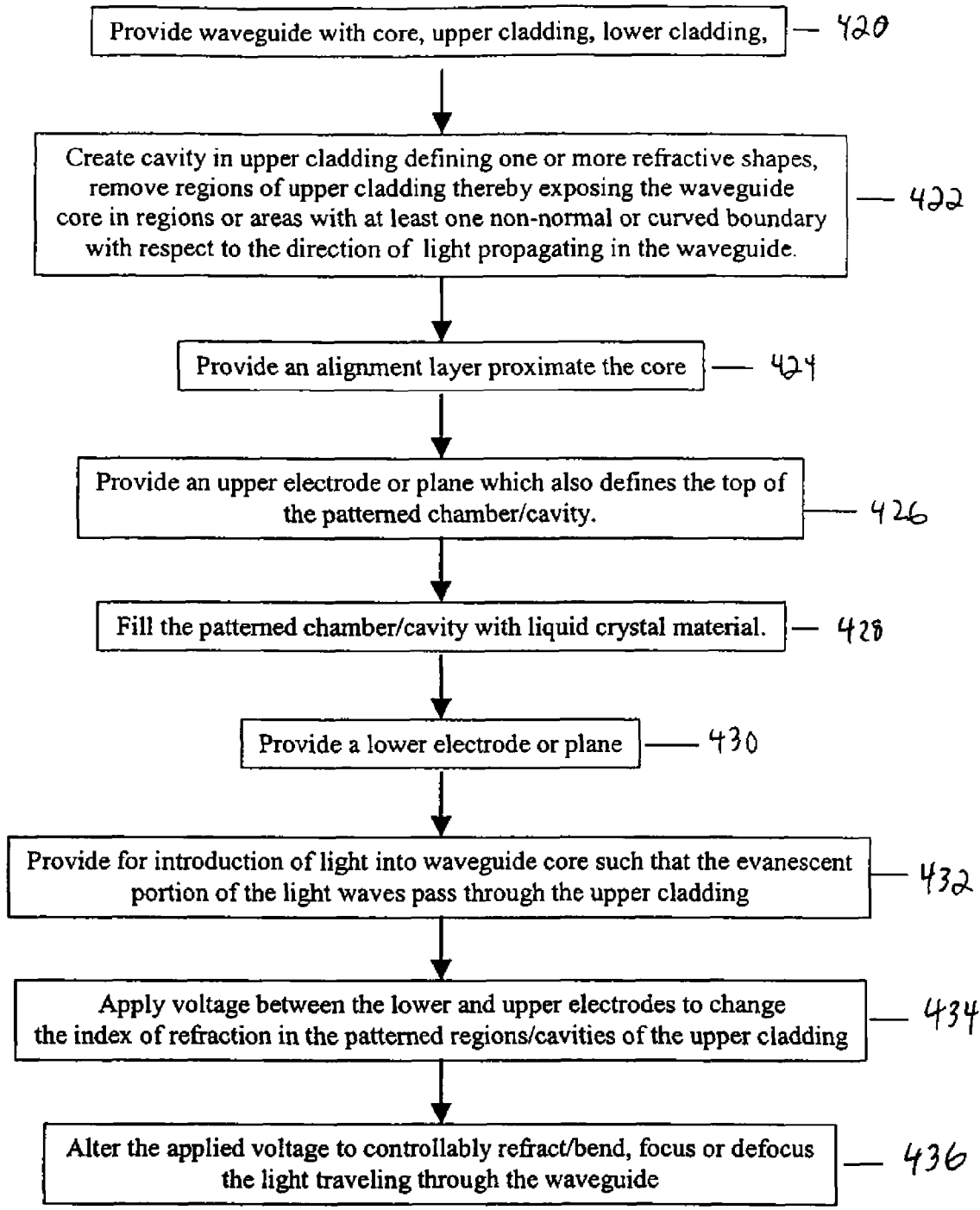
FIG. 39 illustrates an example of operations for forming a waveguide having a cladding with at least a first and second region, the second region having a cavity with liquid crystal material therein, the cavity defining one or more refractive shapes within the upper cladding for controlling light propagating through a waveguide, in accordance with one embodiment of the present invention.

FIG. 39 illustrates an example of operations for forming a waveguide having a cladding layer with two or more areas or regions, the first region having non-liquid crystal material and the second region having liquid crystal material to form refractive shapes within the cladding for controlling light propagating through a waveguide, in accordance with one embodiment of the present invention. The shapes of the regions can include refractive shapes with non-normal interfaces, for example wedge or prism shapes or curved or lens shaped interfaces. In the example of FIG. 39, a cavity or region with liquid crystal material is provided in the upper cladding, although it could be provided in the lower cladding.

In FIG. 39 at operation 420, a waveguide is provided with a core, an upper cladding, and a lower cladding.

At operation 422, in one example, regions or areas of the upper cladding are removed thereby forming shapes or areas in which the core layer may be exposed. This may be achieved with standard photolithographic techniques. For example, a photomask may be used to cure a patterned photoresist on top of the upper cladding layer. Etching techniques are then used to remove portions of the upper cladding in regions where the photoresist has not been cured. The upper cladding may be etched with a chemical process that only removes the upper cladding material and not the core, which will prevent the core from being etched into or etched through (etching through the core would destroy the waveguide). Alternatively, the upper cladding can be etched for a sufficient time to significantly reduce the thickness of that region of upper cladding, but not completely remove the non-liquid crystal cladding. Such a technique can create regions into which the evanescent wave will penetrate. As another alternative, a chemical stop layer may be applied between the core and upper cladding layer. This chemical stop layer will prevent etching into the core, and can be made sufficiently thin so as to not adversely affect the optical properties of the waveguide. Finally, the etched cavity region can be constructed so as to provide an opening at the edge of the waveguide. This can facilitate filling the chamber or cavity of the cladding with liquid crystal material.

At operation 424, an alignment layer is provided for biasing the liquid crystal material that will be disposed within the etched cavity regions of the upper cladding. This can be accomplished by the alignment techniques previously mentioned. However, since the upper surface is no longer of uniform height (regions have been etched away), application of an alignment layer can become more challenging. For example, spin coating techniques (for application of a polyimide or polymer layer) will tend to planarize the surface and therefore be undesirably thick in the etched regions. One technique to avoid this problem is to create the etched regions or cavities such that they extend to the edge of the waveguide. The waveguide can then be placed on a spin coater off-center, and oriented so that excess material will have a path to be removed via centrifugal forces of the spin coat process. Alternatively, oblique deposition of SiO and/or SiO2 can provide an alignment layer, with only minimal shadows created by the edges of the etched regions. As another alternative, prior to applying the non-liquid crystal upper cladding material, a microgroove alignment layer may be created along the entire waveguide core via holographic lithography or nano-imprint techniques. The non-liquid crystal upper cladding would then be applied, and after etching away regions or cavity areas to expose the core, the alignment layer would already be present there.

At operation 426, an upper electrode or plane is provided. This upper electrode or plane may also form the ceiling of the chamber or cavity to be filled with liquid crystal. In one example, the upper electrode is formed as a conductive coating on the glass cover or as a layer of conductive material.

At operation 428, the chamber or cavity in the upper cladding may be filled with liquid crystal material. With only one opening, as depicted in the example of FIG. 34, this process may be conducted under a vacuum. A drop of liquid crystal material placed adjacent to the opening will wick into the chamber or cavity. This chamber may be plugged with a standard glue after filling.

At operation 430, a lower electrode or plane is provided. In one example, a conductive substrate layer or other conductive layer is provided in the waveguide to act as the lower electrode or ground plane.

At operation 432, in one example, light may be introduced into the waveguide core such that the evanescent portion of the light wave passes through the cladding that contains both the regions with and without the liquid crystal material (e.g., the upper cladding, in one example). In one embodiment, for instance, a prism coupler or butt-coupling or endfire coupling technique or other conventional method or device may be used to introduce light into the waveguide.

At operation 434, a voltage is applied between the upper and lower electrodes of operations 426-430 in order to change the index of refraction of the sections or cavity areas of the upper cladding which contain the liquid crystal material. As voltage is applied between the upper and lower electrodes, an electric field is formed between the upper and lower electrodes in order to control the orientation of the liquid crystal material therebetween.

In operation 436, the liquid crystal material in the shaped cavities between the upper electrode and the lower electrode is controllably reoriented depending upon the amount of voltage applied, and such application of voltage alters the index of refraction of such refractive shapes of liquid crystal material relative to light propagating through the waveguide. Such shapes that contain the liquid crystal material in effect operate as prisms, refractive elements, or lenses to bend, focus, defocus, or direct light under the control of the applied voltage. At operation 436, the applied voltage may be varied so as to controllably refract/bend, focus or defocus light as it travels through the waveguide and the evanescent portion of the light passes through the liquid crystal material experiencing the influence of the electric field of the applied voltage.

Figure 40:
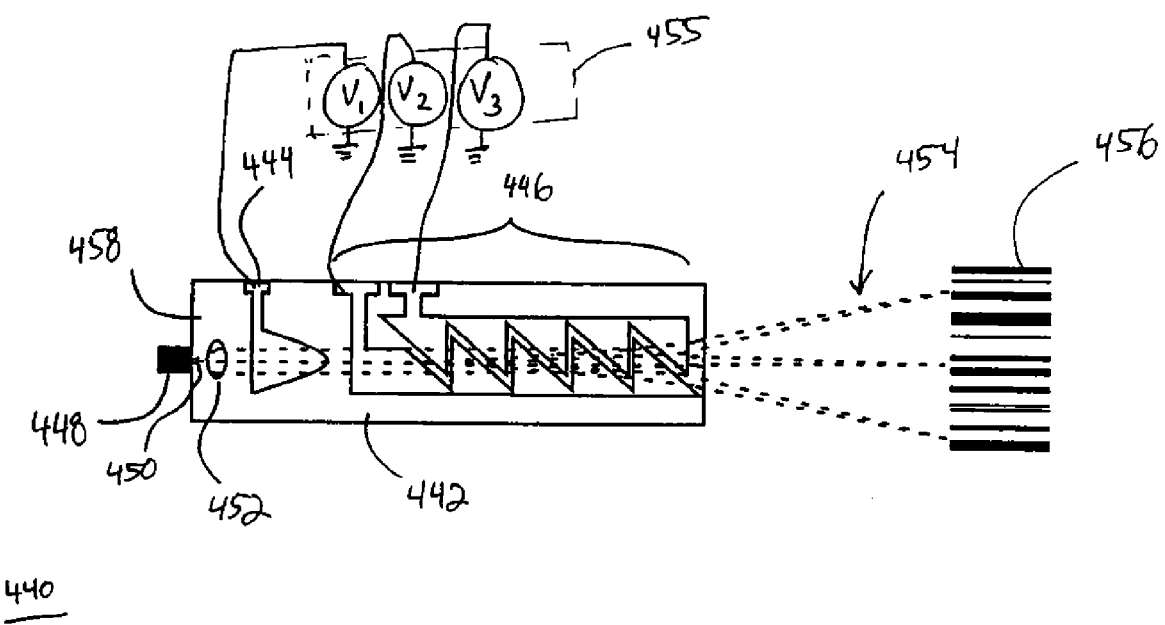
FIG. 40 illustrates an example of a barcode scanner utilizing a waveguide having a plurality of patterned electrodes for controlling light, in accordance with an embodiment of the present invention.
Figure 41:
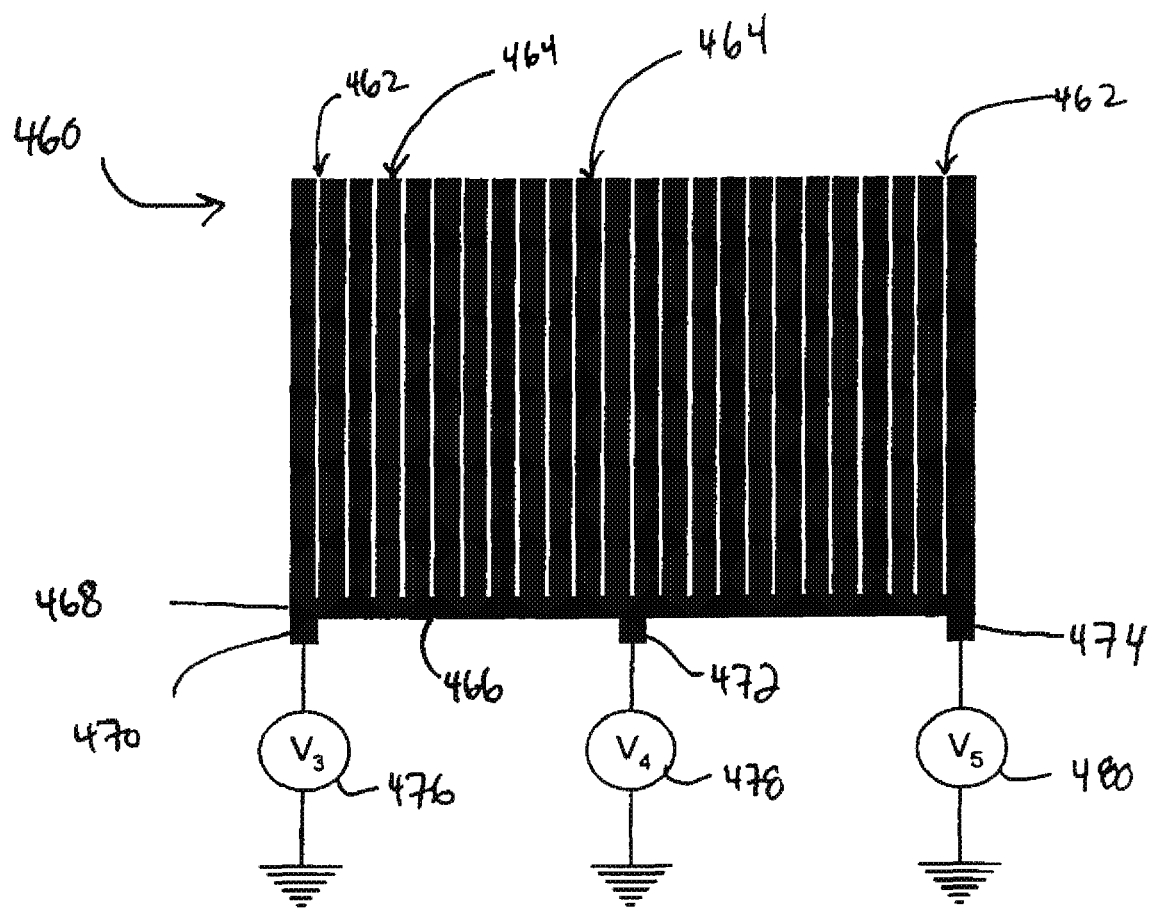
FIG. 41 illustrates an example of an electrode formed in the shape of bus bars with multiple connection points, wherein application of voltages at the three connection points enables control of voltage gradients across the electrode in accordance with one embodiment of the present invention.
Figure 42:
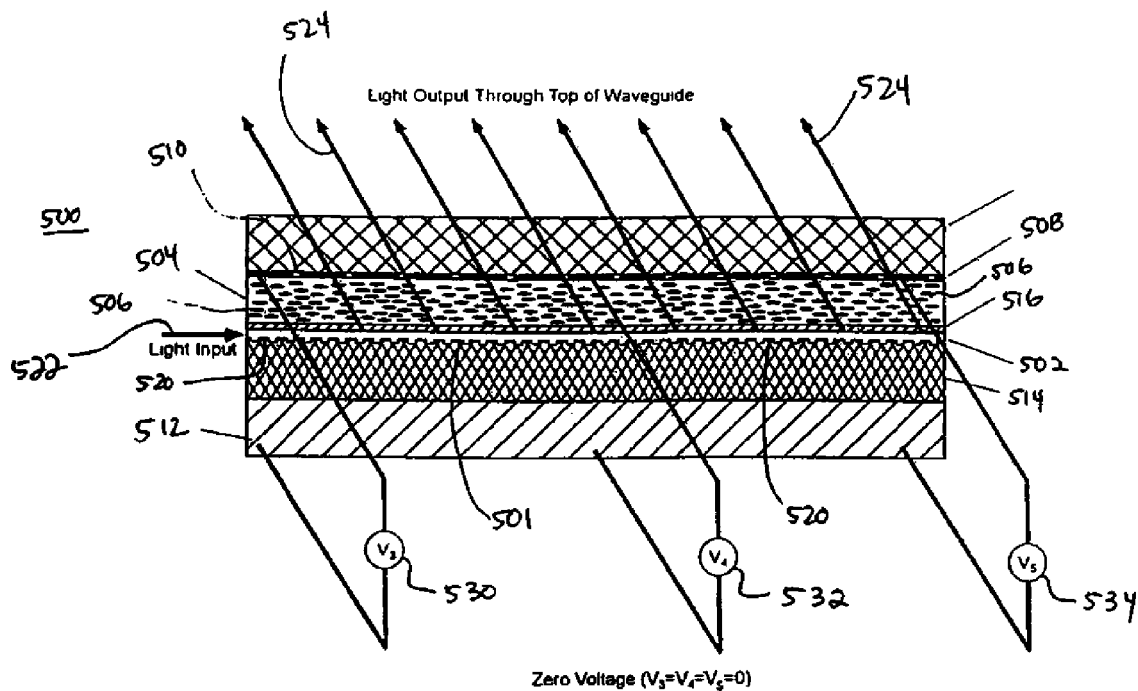
FIG. 42 illustrates a sectional view of the waveguide with the electrode of FIG. 41, when no voltage is applied to the electrode, in accordance with one embodiment of the present invention.

As explained above, embodiments of the present invention may be used in various applications. FIGS. 40-42 illustrate two examples of such applications. In FIG. 40, a barcode scanner or laser print head 440 is formed utilizing a waveguide 442 having a lens shaped electrode 444 and a plurality of prism shaped electrodes 446. In this example, a laser light source 448 passes a laser beam 450 through a lens 452, which directs the laser beam 450 into the waveguide 442, and within the waveguide 442, depending upon the voltages 455 applied to the patterned electrodes 444, 446 therein, the angle at which the light beam 450 exits the waveguide 442 is controlled. Hence, the output beam 454 of light can be dynamically steered to scan or read a barcode 456, and the reflected light can be read by optical receiving devices such as photodiodes (not shown). In this example, the optical portion 458 of the barcode scanner 440 does not use any moving parts. Instead, the direction of the output light beam 454 is controlled by the voltages 455 applied to the patterned electrodes 444, 446.

FIG. 41 illustrates another example of an electrode for controlling the propagation of light through a waveguide, in accordance with one embodiment of the present invention. In this embodiment, the electrode 460 includes multiple slits, gaps, or slots, 462 in the electrode 460. In one example, the electrode 460 includes multiple fingers or rectangles 464, or a comb structure, where each rectangle 464 is separated from the adjacent rectangle by a small space or slit 462. The rectangles 464 are electrically connected along one end 466; for example, in FIG. 41 the rectangles 464 are connected along the bottom edge 468 of the electrode 460. Furthermore, multiple points 470, 472, 474 are provided for connection of multiple voltages 476, 478, 480 to this electrode 460. If the voltages 476-480 applied to all of the connection points 470-474 are the same, then this electrode 460 acts as a uniform plane, which can be used to change the index of refraction of liquid crystal material under, proximate, or otherwise adjacent to this electrode 460. Alternatively, the voltages 476-480 applied to the different connection points 470-474 may be chosen to be different from one another. In this case, a voltage gradient will exist from one electrode connection point 470, 472, or 474 to another. The magnitude of this voltage gradient will be dependent on the magnitude of the differences in the voltages 476-480 applied to the different connection points 470-474. The electrode 460 can be designed to have a sufficiently high resistance, such that a voltage gradient or difference can be maintained with only limited current flowing through the electrode 460. This voltage gradient, which exists between the connection points 470-472-474, will be extended, via the rectangular shapes 464, to cover a region of a waveguide over which this electrode pattern extends. In this way, a gradient in the index of refraction of a waveguide can be created and dynamically controlled, by controlling the different voltages 476-480 at the different connection points 470-474. Although FIG. 41 shows an electrode 460 with three connection points 470-474, it is understood that any number of connection points can be utilized.

Figure 43:
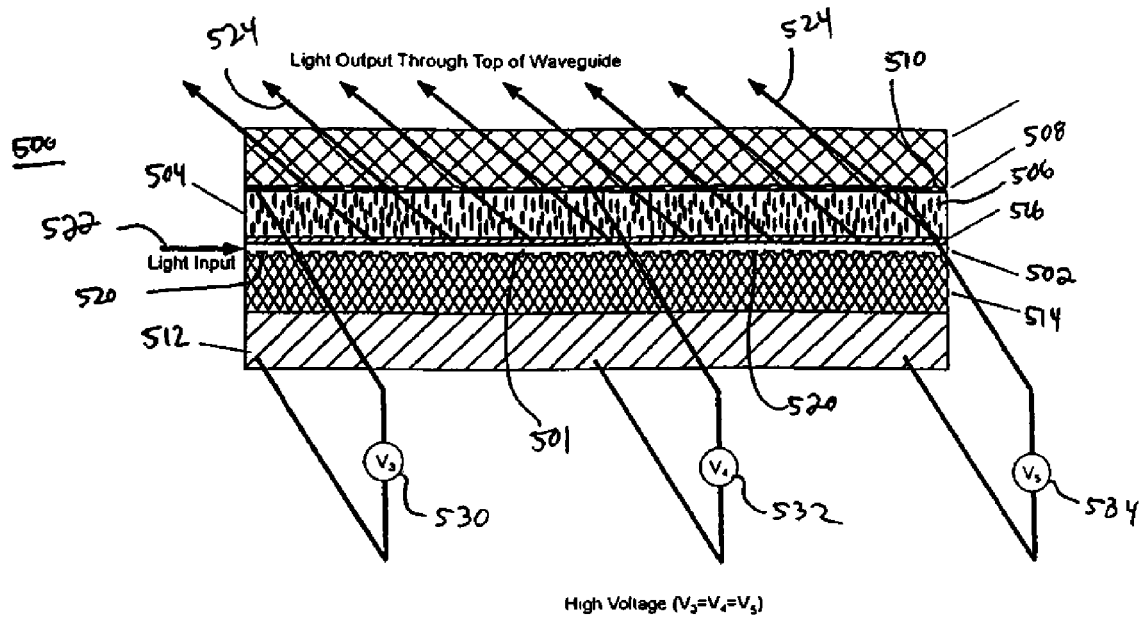
FIG. 43 illustrates a sectional view of the waveguide with the electrode of FIG. 41, when a voltage is applied to the electrode so as to change the orientation of the liquid crystal material under the electrode, in accordance with one embodiment of the present invention.
Figure 44:
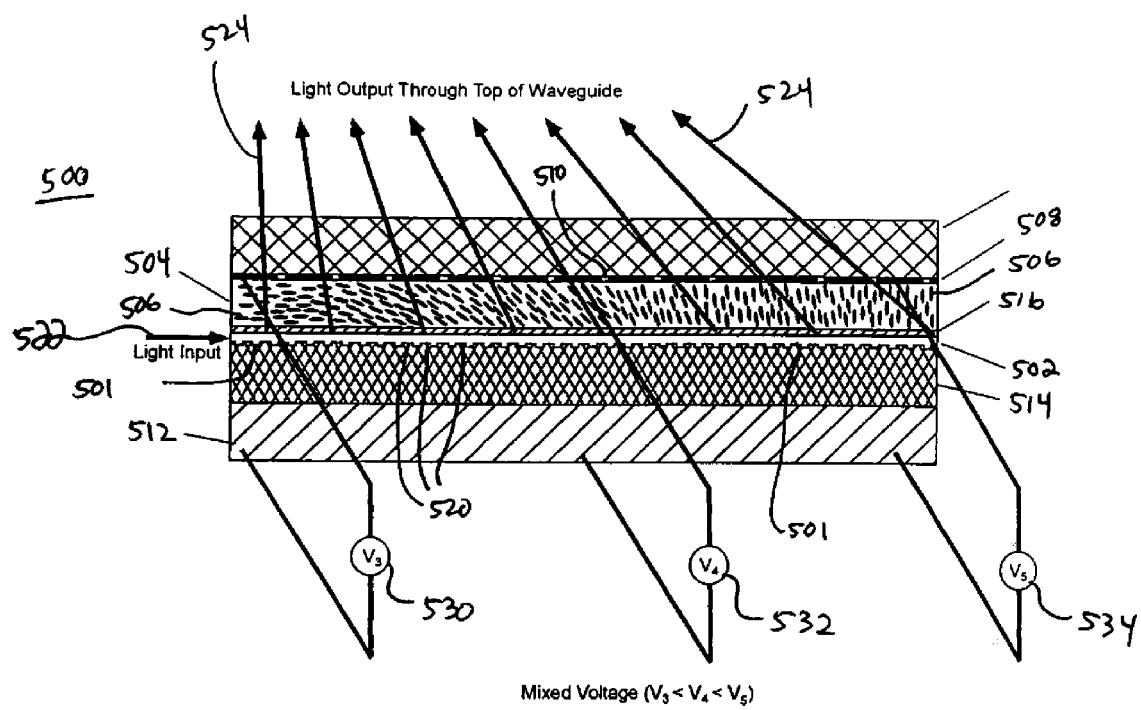
FIG. 44 illustrates a sectional view of the waveguide with the electrode of FIG. 41, when a plurality of differing voltages are applied to the different connection points of the electrode so as to change the orientation of the liquid crystal material under the electrode, in accordance with one embodiment of the present invention.

A waveguide may be formed utilizing any of the structures previously discussed, wherein an out-coupling grating is included in the waveguide. Out-coupling gratings can be constructed by deliberately creating a periodic variation in the index of refraction within a waveguide. This may be done, for example, by providing a core layer with periodic variations in its thickness, as is shown in FIGS. 42-44. Alternatively, either the core or one of the claddings may be constructed so as to have a periodically varying index of refraction (e.g., the core layer may be doped with materials having different indexes of refraction. The spacing or pitch between index variations may be chosen so that light will be directed out of the waveguide. In one example, the angle at which the light is out-coupled, (e.g., the angle of propagation of the light that leaves the waveguide) is dependent in part on the pitch or spacing of the out-coupling grating. As recognized by the present inventors, by dynamically changing this pitch, a waveguide can be formed so that the angle at which the light leaves the waveguide can be dynamically changed.

In one example, an out-coupling grating can be combined with a patterned electrode of FIG. 41 to control the angle at which light leaves a waveguide. For example, in FIGS. 42-44, a waveguide 500 may include an out-coupling grating 501 formed by a core 502 having a periodically varying thickness. A cladding 504 having liquid crystal material and an electrode 508 with slots 510 (e.g., FIG. 41) may be placed on top of the cladding 504. A lower substrate 512 provides both structural support for the waveguide 500 and the electrical ground for all voltages applied between the connection points and the substrate 512. The sub-cladding 514 (e.g., lower cladding), core 502, liquid crystal upper cladding 504, and alignment layers 516 can be constructed as discussed previously.

In order to construct an out-coupling grating 501, in one example a pattern of grooves 520 can be created in the lower cladding 514 prior to application or formation of the core layer 502. This groove pattern 520 may be constructed with photo-lithographic techniques. After the core layer 502 is applied, a chemical-mechanical polishing step can be used to smooth out the top surface of the core layer 502. Also, the depth and spacing of the out-coupling grating can be tapered from one side (e.g., entrance) to the other (e.g., distal) of the waveguide 500. Such tapering techniques can be utilized to alter or condition the shape of the out-coupled light beam.

Light 522 is input into the waveguide 500, and the light output 524 leaves the waveguide 500 due to the out-coupling grating 501. The angle at which output light 524 leaves the waveguide 500 depends in part on the voltages 530-534 V3, V4, V5 applied to the electrode 508.

As with FIG. 41, the electrode 508 of FIGS. 42-44 may have various points at which different voltages may be applied. In the example shown in FIG. 41, three voltages (530, 532, 534) are represented as V3, V4, and V5.

It is understood depending upon the implementation, a waveguide can be formed with an out-coupling grating 501 or variation thereof in combination with one or more different electrodes, including but not limited to a comb-type electrode (such as 460 or 508), a prism or wedge shape electrode, a lens shaped electrode, or an electrode which has a plane or shape. Conversely, an electrode such as electrode 460 can be used in a waveguide that has a core layer as described with reference to FIGS. 1-30 or a waveguide or core layer having an out-coupling grating such as grating 501 of FIGS. 42-44.

Referring to FIG. 42, if no voltage is applied to the patterned electrode 508 (e.g., V3=V4=V5=0), then the index of refraction for the liquid crystal material 506 underneath the electrode 508 will be uniform. The out-coupling grating 501 formed by the core 502 will then direct the light 524 out of the waveguide 500 at an angle that is determined by the pitch of the out-coupling grating 501. As shown in FIG. 42, this angle will be constant along the length of the grating 501. When light 522 first enters the core 502 with out-coupling region 501, it will begin to leave the waveguide 500 at an angle that is determined by the pitch of the grating 501. As the light 522 propagates along the length of the out-coupling grating 501, the light beam 524 will exit the waveguide 500 until all of the light 524 has been out-coupled or the out-coupling grating 501 ends.

Shown in FIG. 43 is the case where a high-voltage has been applied to all of the connection points (e.g., V3, V4, V5) of electrode 500. In this case, the index of retraction of the liquid crystal material 506 in cladding 504 will be uniform, but different than the index of refraction that corresponds to zero voltage in FIG. 42. The change in the index of refraction of the upper cladding 504 will alter the index of refraction for the guided light, as has been discussed previously, and changes in the effective pitch of the out-coupling grating 501. Since this pitch is effectively different, the angle at which light 524 exits or is out-coupled from the waveguide 500 will therefore also be different. In this way the angle at which light 524 exits the waveguide 500 may be controlled by controlling the voltage V3, V4, V5 applied to the patterned electrode 508. In the example of FIGS. 42-43, the light 522 is assumed to be TM polarized, in which case higher voltage will direct the light 524 out of the waveguide 500 at a steeper angle relative to the waveguide normal. For lower voltage and TM polarized light, the output angle of light 524 with respect to the waveguide normal will be smaller. In this way, one may dynamically control the angle of light 524 leaving the waveguide 500 by controlling the magnitude of applied voltage (e.g., V3, V4, V5).

Shown in FIG. 44 is the case where the voltages (e.g., V3, V4, V5) applied to different connection points of electrode 500 are not the same. Specifically, shown in FIG. 44 is the case where the voltage V3 is zero, the voltage V4 is intermediate, and the voltage V5 is higher than V4. In this case, the index of refraction of the liquid crystal material 506 underneath the electrode 508 is varying. This varying index of refraction will result in a varying out-coupling angle of light 524, as is shown in FIG. 44 for TM polarized light 522. By controlling the magnitude of the differences between the voltages V3, V4, V5, the angle at which the light 524 leaves the waveguide 500 can be controlled as well as the focusing of the out-coupled light 524. Shown in FIG. 44 is an example where the voltage differences between V3, V4, V5 are chosen so that the out-coupled light 524 is coming to a focus. Therefore, not only can the angle of the out-coupled light 524 be dynamically controlled with the voltages (e.g., V3, V4, V5), but also the focusing properties of the light 524.

Figure 45:
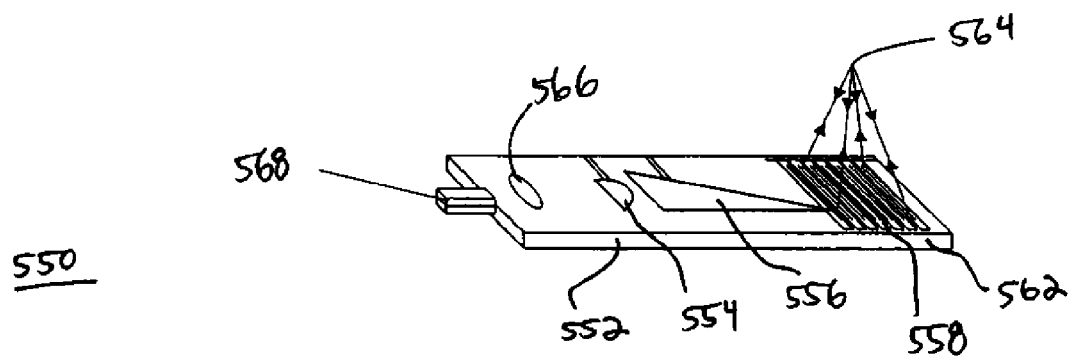
FIG. 45 illustrates a perspective view of an optical read/write head for a CD/DVD player including a waveguide having a plurality of patterned electrodes for controlling light, in accordance with an embodiment of the present invention.
Figure 46:
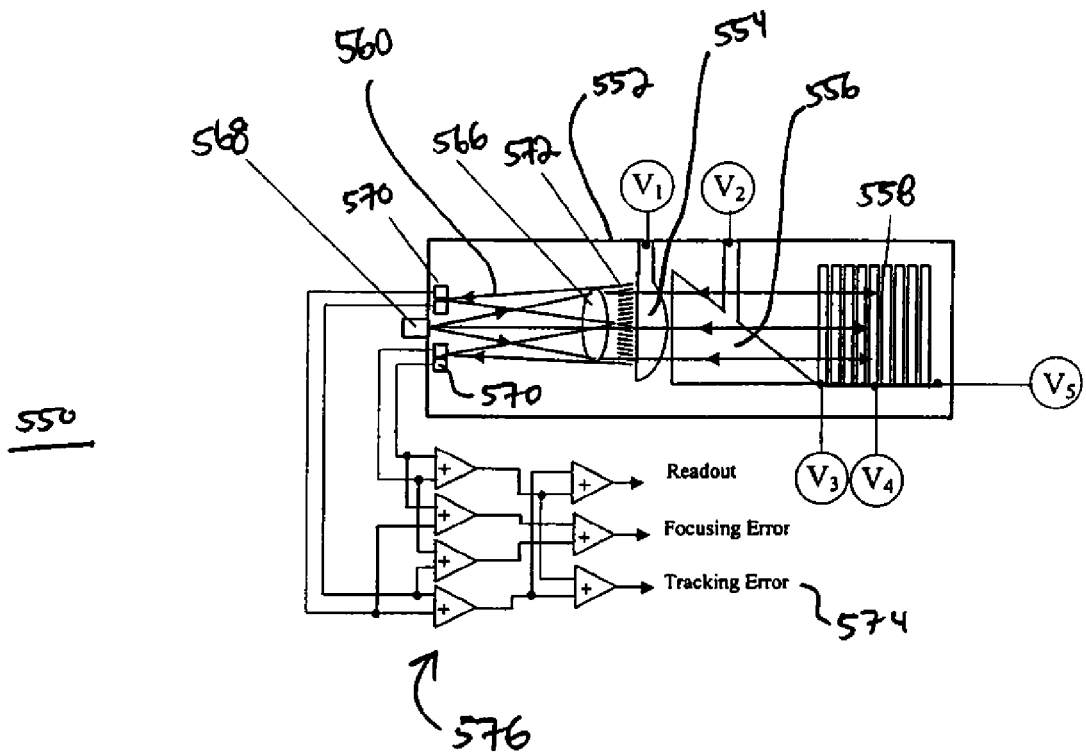
FIG. 46 illustrates a top view of the optical read/write head of FIG. 41 with related circuitry, in accordance with an embodiment of the present invention.

In FIGS. 45-46, an optical read/write head 550 for a CD/DVD player includes a waveguide 552 having a plurality of patterned electrodes 554, 556, 558 for controlling light, in accordance with an embodiment of the present invention. FIGS. 45-46 are an adaptation of a figure in S. Ura, T. Suhara, H. Nishihara, and J. Koyama, An Integrated-Optic Disk Pickup Device, IEEE J. Lightwave Technology, LT-4, Vol. 7, pages 913-918, (1986), the disclosure of which is incorporated by reference in its entirety. In the example of FIGS. 45-46, the device 550 is dynamic due to the liquid crystal waveguide 550 and its electrode elements 554-558. In this example, three patterned electrodes 554, 556, 558 are provided for dynamic steering and focusing. Application of voltages V1 and V2 steers and focuses the beam 560 in the dimension of the waveguide plane. The electrodes 554, 556 are a focusing or lens shape (554) and a steering or prism shape (556). The voltages V3, V4, and V5 are applied to a patterned electrode 558, similar to as shown in FIG. 41. In FIGS. 45-46, this electrode 558 is placed above an out-coupling grating (562). As discussed above, the ratios and magnitude of voltages V3, V4, and V5, give both steering and focusing of light 564 out of the waveguide 552. In this example, the out-coupling grating 562 also serves as an in-coupling grating. Light that is directed out of the waveguide will hit an optical storage medium (such as a compact disc), and the light that is reflected off of that medium will be re-coupled back into the waveguide. This is the return beam. Shown in FIGS. 45-46 is an integrated optical lens 566, which serves to both collimate the light from the laser diode 568 and also to focus the return light onto detection photodiodes 570. The detection photodiodes 570 are actually photodiode pairs. Shown in FIG. 46 is a beamsplitting grating 572, which splits the return beam into two parts that focus the returned light onto the photodiodes 570. If the surface of the optical storage medium is too close, the beams fall towards the outer photodiodes of pairs 570. A tracking error 574 shifts intensity between the upper and lower photodiode pairs 570. The circuitry 576 of FIG. 46 shows an example of how the focusing, tracking, and signal from the CD or other optical storage media can be amplified and measured.

Electrode Example One

Described below is one example of a liquid crystal waveguide in which the waveguide provides for an increased modulation index, and this is described as an example only. It is understood that this example is provided for illustrative purposes only, and does not limit the scope of embodiments of the present invention. In this example, a waveguide device may be formed utilizing a heavily p-doped silicon wafer, with both sides polished, as the lower electrode. Upon the p-doped silicon wafer, a thermally oxidized lower cladding can be grown with a thickness of 2±0.05 microns. The lower cladding refractive index at a wavelength of 1550 nanometers was 1.445±0.001 as measured by a broadband ellipsometer. A SiOxNy guide layer or core was applied over the lower cladding by plasma enhanced chemical vapor deposition to a thickness of 800.3±7 nanometers. The ratio of Ox to Ny in SiOxNy was adjusted during the deposition process to create a core with a refractive index of 1.811±0.005 at a wavelength of 633 nanometers and a refractive index of 1.793±0.005 at a wavelength of 1550 nanometers. Identical coatings were applied to both sides of the wafer in order to balance stresses, and therefore mitigate warping or bending of the wafer. These stresses are a result of the plasma enhanced chemical vapor deposition process. A rectangle/parallelogram was created as the upper electrode using standard photolithographic techniques, specifically, standard masking and chemical etching pattern the ITO on the glass cover plate.

Once complete, the wafer was diced into smaller 10 millimeter by 25 millimeter parts. Each diced part was then coated with an alignment film approximately 120 angstroms in thickness. The alignment film was used to create the homeotropic orientation of the liquid crystal upper cladding. The film was produced by spin coating an 8:1 mixture of Nissan polyimide varnish solvent #26 to Nissan polyimide type 1211 filtered at 0.2 microns at 2500 rpm. The same spin coating process was performed on the cover plate, which was made of 0.7 millimeter thick 1737 corning float glass coated on one side with an indium tin oxide (ITO) film to produce the 100 ohms/square conductive layer used for the upper electrode.

Once both the wafer and the cover glass were coated, the polyimide was imidized by baking in an oven at 200 degrees celcius for approximately 1 hour. The polyimide coatings were mechanically buffed with a dense piled cloth to induce preferential alignment along the light wave propagation direction of the waveguide. The liquid crystal upper cladding layer was formed by spacing the ground plane 1737 glass window from the diced wafer parts with 5-micron borosilicate glass spacers immersed in an ultra-violet curing adhesive Norland 68. Approximately 1-millimeter dots of the spacing mixture were placed at the four corners that created the cell gap for the liquid crystal to be disposed therein. The cover plate was attached to the rest of the waveguide so as to create an anti-parallel alignment layer on the waveguide core. The cell gap was then exposed to 365 nanometer light until fully cured. Straight Norland 68 was used to backfill via capillary action the remaining exposed edges making up the cell gap. Two 1-millimeter openings were left, one on each opposite side on the edges 90 degrees to the buff direction. MBBA liquid crystal, obtained from Aldrich Chemical Co., was then introduced to one of the two edge openings and allowed to fill the cell gap via capillary force. Once filled, the holes were plugged by using Norland UVS-91 visible-uv curing adhesive. Wires were then attached to the upper electrode and lower electrode using conductive epoxy.

In this example, operation of the waveguide included coupling light into and out of the waveguide by means of gadolinium gallium garnet GGG 30-60-90 prisms. Equal amounts of TE and TM light were introduced into the TE0 and TM0 modes of the waveguide. Amplitude modulated 15 KHz square-wave drive voltages were applied to change the TM phase relationship to TE. To measure this change in phase relationship, a 45-degree polarizer prism was used to interfere the TE and TM light.

Table 1 shows hypothetical calculations of Beam Deflection (in degrees) as a function of applied voltage. The modulation index, which is the difference between n2 and n1, is experimental data as different voltages are applied to a waveguide made according to this example, with a wavelength of light of 1320 nm. Using this experimental modulation index data, a theoretical beam deflection can be calculated using Snell's law with the assumption that light is passed through a prism or wedge or triangular shaped electrode having a right angle and a small angle of 8.44 degrees.

TABLE I

Theoretical Beam Deflection

| Volts (RMS) | Modulation Index Change (Δn) | Theoretical Beam Deflection (degrees) |
| --- | --- | --- |
| 3.7 | 0.00015 | −0.01521 |
| 7.9 | 0.001353 | 0.248549 |
| 9.7 | 0.001954 | 0.38367 |
| 12.2 | 0.002706 | 0.555834 |
| 14 | 0.003308 | 0.696327 |
| 15.9 | 0.003909 | 0.839424 |
| 17.8 | 0.00451 | 0.985276 |
| 19.5 | 0.004961 | 1.096573 |
| 22.7 | 0.005713 | 1.28593 |
| 26 | 0.006615 | 1.520026 |
| 28.5 | 0.007216 | 1.680617 |
| 32 | 0.007968 | 1.886918 |
| 37.4 | 0.009321 | 2.275752 |
| 45.7 | 0.010374 | 2.596174 |
| 50 | 0.010825 | 2.739055 |
| 59.3 | 0.011877 | 3.087396 |
| 72.5 | 0.01308 | 3.515909 |
| 90 | 0.014282 | 3.985982 |
| 92.5 | 0.014433 | 4.048325 |
| 110 | 0.015335 | 4.443064 |
| 125 | 0.015936 | 4.729873 |
| 129 | 0.016086 | 4.805172 |
| 160 | 0.016989 | 5.295375 |
| 181 | 0.01744 | 5.572446 |
| 212.5 | 0.018041 | 5.991477 |
| 246 | 0.018492 | 6.362253 |
| 326 | 0.019244 | 7.220316 |
| 358 | 0.019394 | 7.48663 |

Electrode Example Two

Described below is one example of a liquid crystal waveguide in which the waveguide was designed to provide for approximately 28.7 degrees in beam steering, and this is described as an example only. It is understood that this example is provided for illustrative purposes only, and does not limit the scope of embodiments of the present invention. In one example, a waveguide beam steering device may be formed utilizing a heavily p-doped silicon wafer, with both sides polished, as the lower electrode. Upon the p-doped silicon wafer, a thermally oxidized lower cladding can be grown with a thickness of 2.16±0.05 microns. The lower cladding refractive index at a wavelength of 633 nanometers was 1.458±0.001 as measured by a broadband ellipsometer. A stoichiometeric Si3N4 guide layer or core was applied over the lower cladding by low-pressure chemical vapor deposition to a thickness of 314±1 nanometers. The Si3N4 was deposited to create a core with a refractive index of 2.016±0.005 at a wavelength of 633 nanometers. The p-doped silicon wafer with the applied coating was then chemically and mechanically polished to create an average surface roughness of 4±0.8 angstroms while creating a final core thickness of 286±1 nanometers. Identical coatings were applied to both sides of the wafer in order to balance stresses, and therefore mitigate warping or bending of the wafer. These stresses are a result of the low-pressure chemical vapor deposition process.

In this example, a pair of upper electrodes were formed wherein each electrode had a plurality of refractive prism-like shapes in series, such as shown in FIG. 18. In particular for each electrode, ten (10) triangle elements were designed using an index modulation of 0.02, 125-micron beam waist, and a constant triangle base size. Each electrode was etched into the cover plate by standard photolithographic techniques.

Specifically, standard masking and chemical etching techniques were used to pattern the ITO on the glass cover plate.

Table 2 below shows the coordinates of a 20-micron wide line of demarcation defining the space between the triangular shape electrodes for this example (see also FIG. 18).

TABLE 2

Dimensions of 2 Electrodes

| X Dimension Microns | Y Dimension Microns |
|---|---|
| 0 | 250 |
| 1000 | −261 |
| 2000 | 294 |
| 3000 | −350 |
| 4000 | 428 |
| 5000 | −528 |
| 6000 | 650 |
| 7000 | −794 |
| 8000 | 961 |
| 9000 | −1150 |
| 10000 | 1361 |
| 11000 | −1594 |
| 12000 | 1849 |
| 13000 | −2127 |
| 14000 | 2426 |
| 15000 | −2748 |
| 16000 | 3092 |
| 17000 | −3458 |
| 18000 | 3847 |
| 19000 | −4257 |
| 20000 | 4690 |

The wafer (having a conductive substrate, lower cladding, and core) was diced into smaller 20 millimeter by 40 millimeter parts. Each diced part was then coated with an alignment film approximately 120 angstroms in thickness. The alignment film was used to create the homogeneous orientation of the liquid crystal upper cladding. The film was produced by spin coating an 8:1 mixture of Nissan polymide varnish solvent #21 to Nissan polymide type 2170 filtered at 0.2 microns at 3000 revolutions per minute.

The same spin coating process was performed on the cover plate (having the two upper electrodes). The glass cover was made of 1.1 millimeter thick 1737 corning glass coated on one side with an indium tin oxide (ITO) film to produce the 100 ohms/square conductive layer used for the upper electrodes.

Once both the wafer (with the lower cladding and core) and the cover glass (with the two upper electrodes) were coated, the polyimide coatings were imidized by baking in an oven at 200 degrees Celsius for approximately 1 hour. The polyimide coatings were mechanically buffed with a dense piled cloth to induce preferential alignment along the light wave propagation direction of the waveguide.

The cell, into which the liquid crystal upper cladding may be contained, was formed by spacing the cover plate (e.g., 1737 glass window) from the diced wafer parts with 5-micron borosilicate glass spacers immersed in a ultra-violet curing adhesive Norland 68. On the bottom side of the coverplate is the patterned electrode, in this example. Approximately 500-micron dots of the spacing mixture were placed at the four corners of the wafer (having the lower cladding and core) to create the cell gap for the liquid crystal to be disposed therein. The cover plate was attached to the wafer so as to create an anti-parallel alignment layer on the waveguide core and positioned such that the cover plate distal edge corresponding to the beam steerer output was aligned over the distal output edge of the waveguide. The cell gap was then exposed to 365 nanometer light until fully cured. Straight Norland 68 was used to backfill, via capillary action, the remaining exposed edges making up the cell gap. Two 3-millimeter openings were left, one on each opposite side on the edges 90 degrees to the buff direction. MLC-6621 liquid crystal, obtained from EMD Chemicals, Inc., was then introduced to one of the two edge openings and allowed to fill the cell gap via capillary force. Once filled, the holes were plugged by using Norland UVS-91 visible-uv curing adhesive. Once fully cured the output edge of the assembled device was polished utilizing diamond impregnated polishing pads supplied by Ultratec Manufacturing, and the final polish was performed using 0.2 micron diamond. Braided wires of AWG were then attached to the two upper electrodes and one lower electrode using conductive epoxy.

Operation of the waveguide included coupling 780 nanometer light into the waveguide by means of a gadolinium gallium garnet GGS 30-60-90 prism. TM light was introduced into the TM0 mode of the waveguide.

A simple switching circuit was used to selectively apply a voltage to electrode 1 or electrode 2, (see FIG. 18 and Table 3). Amplitude modulated 6 KHz square-wave drive voltages were applied to the selected electrode to change the index of refraction of the region of the waveguide under the selected electrode. To measure the beam deflection change as a function of the applied voltage, a silicon CCD video camera was used to visually map the scattered propagation streak within the waveguide. The experimental results are shown in Table 3.

TABLE 3

| Voltage Electrode #1 (RMS Volts) | Voltage Electrode #2 (RMS Volts) | Deviation Angle (Deg) |
|---|---|---|
| 0 | 0 | 0 |
| 22 | 0 | 3.8 |
| 26 | 0 | 4.7 |
| 46 | 0 | 7 |
| 93 | 0 | 9.2 |
| 139 | 0 | 11.6 |
| 190 | 0 | 13 |
| 230 | 0 | 13.5 |
| 274 | 0 | 13.5 |
| 363 | 0 | 13.7 |
| 0 | 0 | 0 |
| 0 | 22 | −3.4 |
| 0 | 26 | −6.4 |
| 0 | 46 | −6.9 |
| 0 | 93 | −9.1 |
| 0 | 139 | −10 |
| 0 | 190 | −14.1 |
| 0 | 230 | −14.8 |
| 0 | 274 | −14.8 |
| 0 | 363 | −15 |

As shown in Table 3, approximately 28.7 total degrees of steering was achieved in this example with an applied voltage of 363 volts RMS. For a voltage of 22 volts RMS, 7.2 total degrees of steering were realized.

Embodiments of the present invention may experience swapping of energy between the fundamental TE and TM waveguide modes at a particular value of applied voltage. As stated previously, for liquid-crystal molecular alignment parallel to the propagation direction of light, the effective index for TM polarized light decreases as a voltage is applied and the effective index of TE polarized light is unchanged. It is possible, for certain waveguide designs, that at a particular value of the voltage the effective indices of TM and TE polarized light will become equal. In this case the two modes are phase matched and energy can swap from the TM mode into the TE mode and visa versa. For devices with molecules orthogonal to the light propagation vector, the TE index increases as the TM index decreases and phase matching at a particular voltage can also occur. In many applications it may be desired to avoid such TE and TM mode crossings.

In one example, TM/TE crossings may be avoided by increasing the index of the guide layer. For planar optical waveguides with isotropic claddings, the index for TE polarized light is preferably greater than the index for TM polarized light. Furthermore, an increase of the index of the guide layer increases the separation between the indices for TE and TM polarized light. When the separation between the indices for TE and TM polarized light becomes substantially large compared to index modulation of the LC waveguide $\Delta n$, then TE and TM crossings are avoided.

An example of an LC waveguide without TE and TM crossings is an LC waveguide with the guide layer replaced with a 0.58 micron layer of silicon nitride prepared by plasma-enhanced chemical vapor deposition. The refractive index of silicon nitride at a wavelength of 1.32 microns is about 2.0. Other suitable guide layers include stoichiometric silicon nitride prepared by low-pressure chemical vapor deposition and titanium pentoxide. A device of this design, with the LC molecules aligned perpendicular to the propagation vector, was shown to exhibit a tunable birefringence (the difference between the TE index and the TM index) of 0.035 at a wavelength of 1.32 microns, with no evidence of TE and TM crossings. The modulation indices of TM and TE polarized light were approximately 0.02 and 0.015, respectively.

In some examples, nematic liquid crystals may be driven with a voltage source with a very low DC component, such as an AC square wave. The fast response of the liquid-crystal molecules in proximity to the guide layer can lead to temporal transients in the modulation index of the LC waveguide during the finite transition times of the square wave. In some examples transients in the modulation index may not be desired. Since the fastest response times for the LC molecules can be associated with strong molecular restoring forces and high operational voltages, one example of how to reduce the transients is to reduce the operational voltage. In Table 2, the transients operate in time scales of several 10s of microseconds for operational voltages above 50 Vrms. For many applications it is also desirable to reduce the operational voltages in order to simplify the driving electronics.

One example that may reduce the operational voltage is to reduce the polar anchoring energy of the liquid-crystal molecules to the alignment layer. Alignment layers that produce homeotropic alignment have lower polar anchoring energies than for buffed polyimides that produce planar alignment. In the electrode example given above, approximately 70% of the total device stroke occurred below 50 Vrms. Other LC alignment methods known to have lower polar anchoring energies than buffed polyimide include photo-aligned polyimides and polymers, angle-deposited SiO and SiO2, non-polar polymers, and the use of surfactant-modified liquid crystals.

A second method to reduce transients in the modulation index may be to increase the frequency of the voltage source. The use of driving frequencies above 20 kHz at 50 Vrms often is aided by the use of liquid crystal materials with very low conductivity or a large voltage-holding ratio. The liquid crystal MBBA exhibits a low conductivity as do superfluorinated liquid-crystal materials.

By combining the effects of reduced polar anchoring energy with a high drive frequency, transients in the modulation index can generally be reduced to a desired or negligible level.

A way of achieving pure TE modulation is to use smectic A* liquid-crystal materials exhibiting the electroclinic effect. These materials rotate about an axis containing the electric field vector giving pure TE modulation and leaving TM polarized light unaffected. This configuration has the benefits of low DC voltages, and completely eliminates any possibility of transients in the modulation index. However, the modulation index may be less because the directors typically switch less than 90°. Smectic A materials also tend to have more restricted temperature ranges than nematic materials and their development is less mature.

Accordingly, it can be seen that embodiments of the present invention provide for dynamic electronic control of light as it propagates through the waveguide. Embodiments of the present invention could be replacements for widespread applications such as retail store barcode scanners, CD/DVD optical read/write heads, optical/holographic datastorage, telecommunications optical switches, bio-sensing (i.e., lab-on-a-chip) applications, optical computer backplanes, for example. In addition to the beam steerer applications, the tunable lens designs could permit electro-optic zoom lenses, selective detection for lab-on-a-chip biosensors, tunable collimation lenses for fiber to waveguide couplers, for example.

Embodiments of the present invention may be used in conjunction with conventional digital and analog circuitry, either separately or integrated on a single integrated circuit. For instance, the voltage applied to one or more patterned electrodes may be controlled by a microprocessor or other logic or programmable logic devices, and such logic may be included on the same integrated circuit with the waveguide.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

It should be appreciated that reference throughout this specification to "one embodiment" or "an embodiment" or "one example" or "an example" means that a particular feature, structure or characteristic described in connection with the embodiment may be included, if desired, in at least one embodiment of the present invention. Therefore, it should be appreciated that two or more references to "an embodiment" or "one embodiment" or "an alternative embodiment" or "one example" or "an example" in various portions of this specification are not necessarily all referring to the same embodiment. Furthermore, the particular features, structures or characteristics may be combined as desired in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed inventions require more features than are expressly recited in each claim. Rather, as the following claims reflect, inventive aspects lie in less than all features of a single foregoing disclosed embodiment, and each embodiment described herein may contain more than one inventive feature.

While the invention has been particularly shown and described with reference to various embodiments thereof, it will be understood by those skilled in the art that various other changes in the form and details may be made without departing from the spirit and scope of the invention.

The invention claimed is:

1. A waveguide, comprising:
   a substantially planar core for guiding a light beam through the waveguide, wherein said planar core has a thickness of less than one half a wavelength of the light beam, wherein the core has an index of refraction sized such that a TE index is not equal to a TM index for an operable voltage range of 0 to 100 V to avoid TE and TM crossings;
   at least one cladding having a liquid crystal material disposed therein; and
   means for controllably refracting the light beam in a direction parallel to said planar core as the light beam travels through the waveguide.

2. The waveguide of claim 1, wherein the means for controllably refracting includes:
   at least one electrode for receiving at least one voltage, said electrode defines at least one refractive shape;
   wherein the light beam is refracted by an amount that is controlled by the at least one voltage.

3. The waveguide of claim 1, wherein at least a portion of the liquid crystal material forms one or more refractive shapes having an index of refraction; and
   the means for controllably refracting includes at least one electrode;
   wherein as a voltage is applied to said electrode, the index of refraction of the one or more refractive shapes is altered to controllably refract the light beam as it travels through the waveguide.

4. The waveguide of claim 1, wherein said cladding has a first region characterized by a first index of refraction and a second region characterized by a second index of refraction; and
   wherein the means for controllably refracting includes at least one electrode;
   wherein at least the second index of refraction is controlled by a voltage applied to the electrode.

5. The waveguide of claim 1, wherein said cladding has at least a first region that includes at least a portion of the liquid crystal material having a first orientation; and
   the means for controllably refracting includes at least one electrode;
   wherein the first orientation of the first portion of the liquid crystal material in the at least first region selectively changes from a first state to a second state based on a voltage applied to said electrode.

6. The waveguide of claim 1, wherein the liquid crystal material is comprised of a superfluorinated liquid crystal.

7. The waveguide of claim 1, wherein the liquid crystal material has a birefringence greater than 0.1.

8. The waveguide of claim 1, wherein the thickness of the planar core is sized such that the index of refraction of the waveguide changes by at least 0.01 over a range of 0 to 50 V.

* * * * *